(12) United States Patent
McGuire

(10) Patent No.: US 8,999,154 B2
(45) Date of Patent: Apr. 7, 2015

(54) APPARATUS FOR TREATING LAKE OKEECHOBEE WATER

(71) Applicant: Ecosphere Technologies, Inc., Stuart, FL (US)

(72) Inventor: Dennis McGuire, Stuart, FL (US)

(73) Assignee: Ecosphere Technologies, Inc., Stuart, FL (US)

( * ) Notice: Subject to any disclaimer, the term of this patent is extended or adjusted under 35 U.S.C. 154(b) by 90 days.

(21) Appl. No.: 13/973,537

(22) Filed: Aug. 22, 2013

(65) Prior Publication Data

US 2014/0048466 A1 Feb. 20, 2014

Related U.S. Application Data

(63) Continuation-in-part of application No. 13/019,113, filed on Feb. 1, 2011, now Pat. No. 8,906,242, which is a continuation-in-part of application No. 12/765,971, filed on Apr. 23, 2010, now Pat. No. 8,721,898, which is a continuation-in-part of application No. 12/399,481, filed on Mar. 6, 2009, now Pat. No. 7,699,988, which is a continuation-in-part of application No. 12/184,716, filed on Aug. 1, 2008, now Pat. No. 7,699,994.

(60) Provisional application No. 60/953,584, filed on Aug. 2, 2007.

(51) Int. Cl.
| | |
|---|---|
| C02F 1/78 | (2006.01) |
| C02F 9/00 | (2006.01) |
| C02F 1/36 | (2006.01) |
| C02F 1/467 | (2006.01) |
| C02F 1/461 | (2006.01) |
| C02F 101/34 | (2006.01) |
| C02F 103/00 | (2006.01) |

(52) U.S. Cl.
CPC ... *C02F 9/00* (2013.01); *C02F 1/78* (2013.01); *C02F 1/36* (2013.01); *C02F 1/4672* (2013.01); *C02F 2001/46171* (2013.01); *C02F 2101/345* (2013.01); *C02F 2103/007* (2013.01); *C02F 2203/008* (2013.01); *C02F 2303/04* (2013.01)

(58) Field of Classification Search
USPC ............ 210/748.01, 638, 660, 205, 177, 190, 210/721, 665, 702, 748.02, 243; 422/20, 422/22, 127, 128, 186; 166/90.1, 267
See application file for complete search history.

(56) References Cited

U.S. PATENT DOCUMENTS

| | | |
|---|---|---|
| 3,523,891 A | 8/1970 | Mehl |
| 3,664,951 A | 5/1972 | Armstrong |

(Continued)

OTHER PUBLICATIONS

W. Kerfoot, "Gas and oil recovery in shale deposits", U.S. Appl. No. 60/908,453, filed Mar. 28, 2007.

(Continued)

*Primary Examiner* — Walter D Griffin
*Assistant Examiner* — Cameron J Allen
(74) *Attorney, Agent, or Firm* — McHale & Slavin, P.A.

(57) ABSTRACT

Disclosed is a water treatment apparatus for treating Lake Okeechobee water. The treatment apparatus operates on a continuous flow of water which is subjected to hydrodynamic waves, acoustic ultrasonic waves in combination with injected ozone and electrolysis. The treatment system provides a cost efficient and environmentally friendly process for cleaning contaminated water that is directed into estuaries, lagoons, intracoastal waterway, everglades, and the ocean. Treatment includes addressing various levels of contaminants such as aerobic bacteria, often called a green slime that produces a bio-film. The apparatus can be mounted on a vessel to permit targeting of algae blooms.

12 Claims, 58 Drawing Sheets

(56) References Cited

U.S. PATENT DOCUMENTS

| | | |
|---|---|---|
| 3,706,646 A | 12/1972 | Gibson, Jr. et al. |
| 3,989,608 A | 11/1976 | DeMonbrun et al. |
| 4,003,832 A | 1/1977 | Henderson et al. |
| 4,076,617 A | 2/1978 | Bybel et al. |
| 4,957,606 A | 9/1990 | Juvan |
| 5,679,257 A | 10/1997 | Coate et al. |
| 5,868,945 A | 2/1999 | Morrow et al. |
| 5,897,765 A | 4/1999 | Mercier |
| 6,182,453 B1 | 2/2001 | Forsberg |
| 6,221,260 B1 | 4/2001 | Chahine et al. |
| 6,299,761 B1 | 10/2001 | Wang |
| 6,436,285 B1 | 8/2002 | Kerfoot |
| 6,464,877 B1 | 10/2002 | Mori et al. |
| 6,555,011 B1 | 4/2003 | Tribelsky et al. |
| 6,582,611 B1 | 6/2003 | Kerfoot |
| 6,652,758 B2 | 11/2003 | Krulik |
| 6,814,876 B1 | 11/2004 | Neal |
| 6,818,128 B2 | 11/2004 | Minter |
| 6,902,678 B2 | 6/2005 | Tipton |
| 6,911,153 B2 | 6/2005 | Minter |
| 7,093,661 B2 | 8/2006 | Olsen |
| 7,131,638 B2 | 11/2006 | Kerfoot |
| 7,156,984 B2 | 1/2007 | Kerfoot |
| 7,247,244 B2 | 7/2007 | Kozyuk |
| 7,326,002 B2 | 2/2008 | Kerfoot |
| 7,354,556 B2 | 4/2008 | Perkins |
| 7,384,563 B2 | 6/2008 | Harmless et al. |
| 7,481,937 B2 | 1/2009 | Rice et al. |
| 7,595,003 B2 | 9/2009 | Maddox |
| 7,699,988 B2 | 4/2010 | McGuire et al. |
| 7,699,994 B2 | 4/2010 | McGuire et al. |
| 2007/0160493 A1 | 7/2007 | Ronholdt et al. |
| 2007/0240975 A1 | 10/2007 | Foret |
| 2008/0061006 A1 | 3/2008 | Kerfoot |
| 2008/0093284 A1 | 4/2008 | Slough et al. |
| 2008/0237141 A1 | 10/2008 | Kerfoot |
| 2008/0272065 A1* | 11/2008 | Johnson .................. 210/770 |
| 2010/0320147 A1 | 12/2010 | McGuire et al. |

OTHER PUBLICATIONS

Allegheny Ozone, "Treating frac water with ozone", Allegheny Ozone, Inc. (Dec. 11, 2009).

Y. Cong et al, "Hydroxyl radical electrochemically generated with water as the complete atom source and its environmental application", Chinese Science Bulletin, 52(10):1432-1435 (May 2007).

K. Klasson et al, "Ozone treatment of soluble organics in produced water (FEAC307)", Milestone Report: Letter Report with the Summarized Results from Continuous-flow Testing, pp. 1-18, Oak Ridge National Laboratory, Oak Ridge, Tennessee (Dec. 2000).

K. Klasson et al, "Ozone treatment of soluble organics in produced water", Petroleum Environmental Research Forum Project 98-04, pp. 1-85, Oak Ridge National Laboratory, Oak Ridge, Tennessee (Jan. 2002).

T. Klasson, "Treatment of water-soluble organics in produced water", pp. 1-2 (Dec. 11, 2009).

* cited by examiner

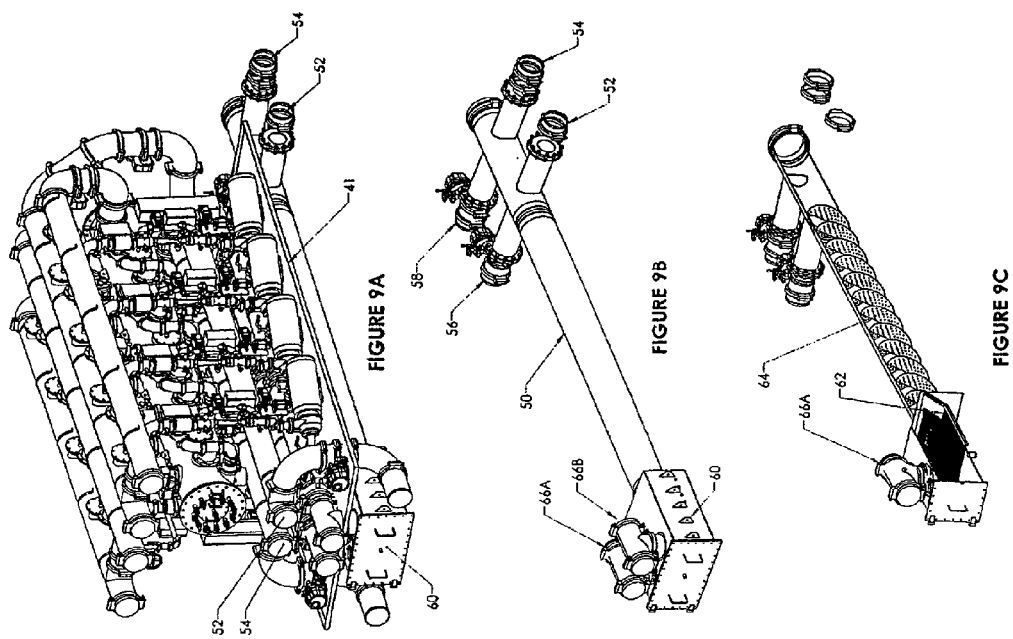

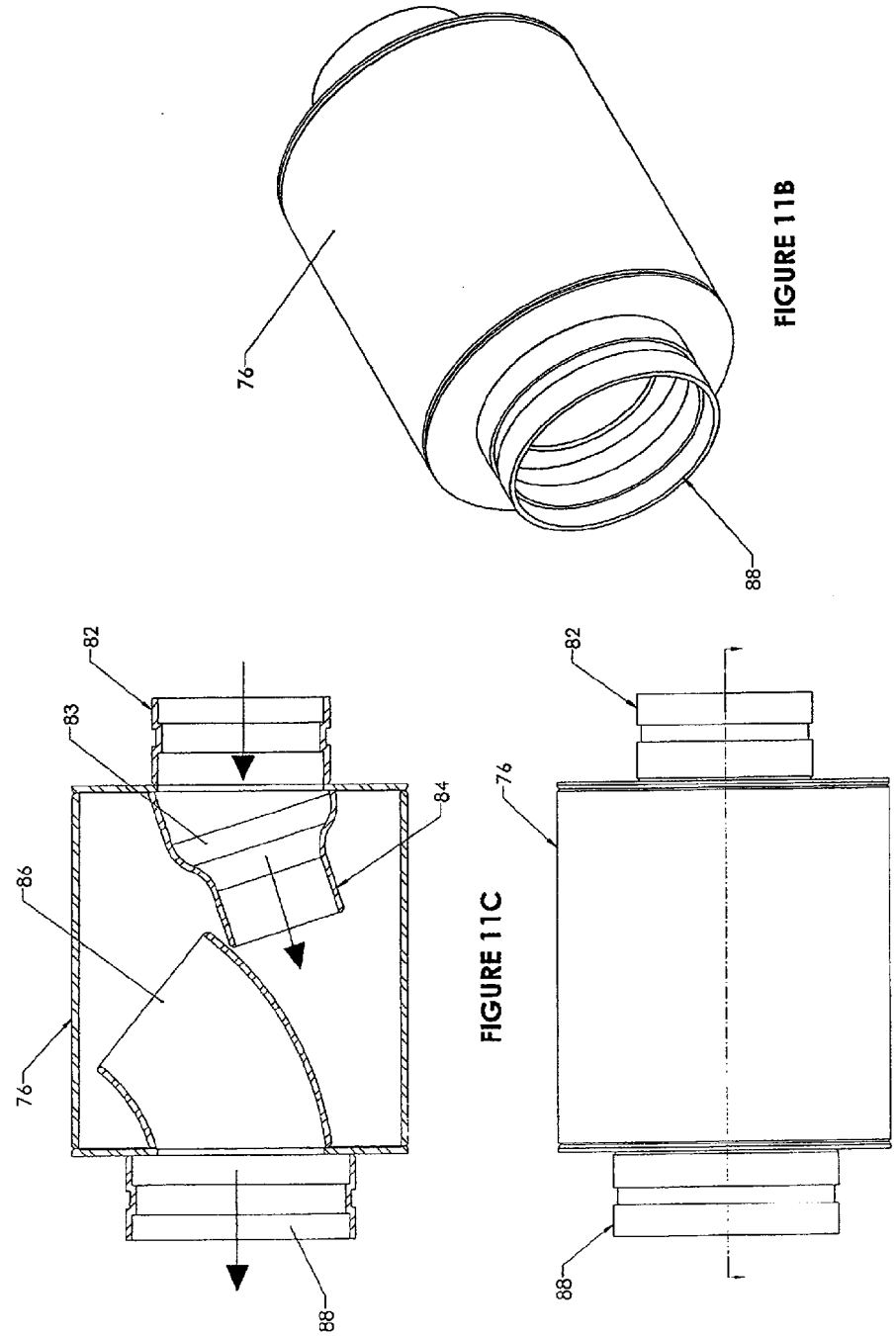

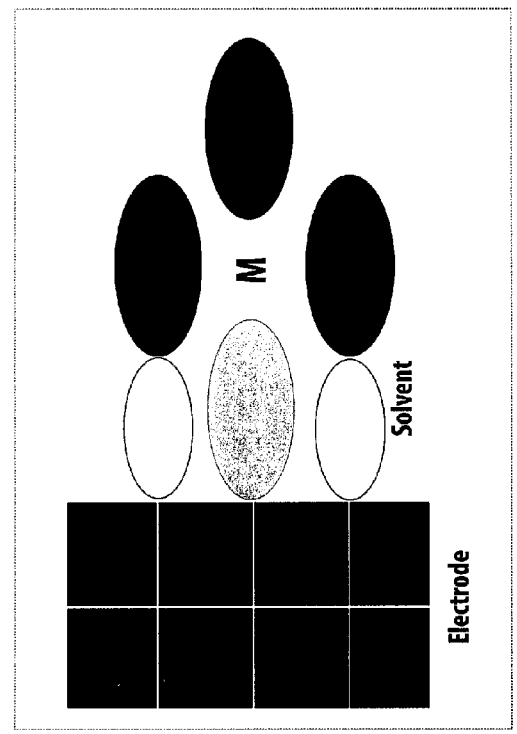
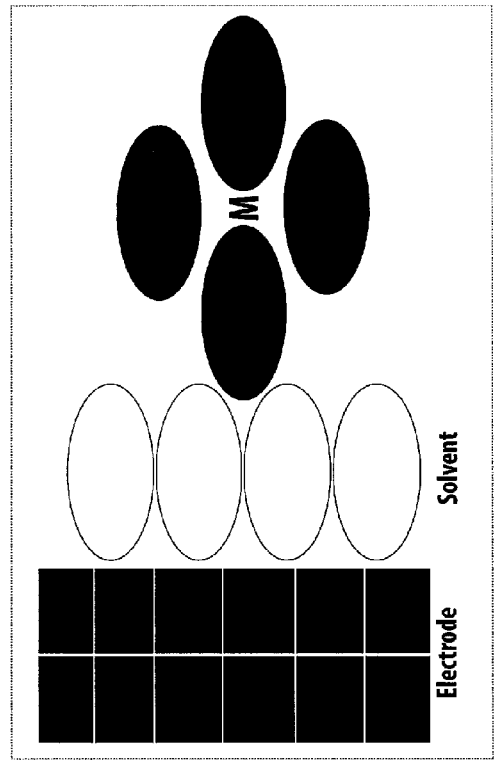
Figure 20

APPARATUS FOR TREATING LAKE OKEECHOBEE WATER

CROSS-REFERENCE TO RELATED APPLICATIONS

In accordance with 37 C.F.R. 1.76, a claim of priority is included in an Application Data Sheet filed concurrently herewith. Accordingly, the present invention claims priority as a continuation-in-part U.S. patent application Ser. No. 13/019,113 now U.S. Pat. No. 8,906,242 B2, entitled "Transportable Reactor Tank", filed Feb. 1, 2011, which is a continuation-in-part of U.S. patent application Ser. No. 12/765,971, entitled "Improved Reactor Tank", filed Apr. 23, 2010, which is a continuation-in-part of U.S. patent application Ser. No. 12/399,481, entitled "Enhanced Water Treatment for Reclamation of Waste Fluids and Increased Efficiency Treatment of Potable Waters", filed Mar. 6, 2009, now U.S. Pat. No. 7,699,988, issued Apr. 20, 2010, which is a continuation-in-part of U.S. patent application Ser. No. 12/184,716, entitled "Enhanced Water Treatment for Reclamation of Waste Fluids and Increased Efficiency Treatment of Potable Waters", filed Aug. 1, 2008, now U.S. Pat. No. 7,699,994, issued Apr. 20, 2010, which in turn is a continuation-in-part of U.S. Provisional Patent Application No. 60/953,584, entitled "Enhanced Water Treatment for Reclamation of Waste Fluids and Increased Efficiency Treatment of Potable Water", filed Aug. 2, 2007, the contents of which are hereby expressly incorporated by reference.

FIELD OF THE INVENTION

This invention related to the field of fluid treatment and, in particular, to a water treatment apparatus for destroying aerobic and anaerobic bacteria in Lake Okeechobee water based on the principle of degradation/disinfection using a combination of hydrodynamic cavitation, acoustic cavitation, ozone injection and electrolysis.

BACKGROUND OF THE INVENTION

Every year, billions of gallons of polluted water are pumped into Florida's Lake Okeechobee, one of the largest freshwater lakes in the United States. The Kissimmee River is the largest source of water input over 60% of the incoming flow. Other rivers such as Lake Istokpoga, Taylor Creek, Fisheating Creek, Nubbin Slough and Nicodemus Slough also feed in large quantities of water. The water passes nearby industrial agriculture operations and urban runoff, wherein the water becomes contaminated with nitrogen, phosphorous, and other pollutants. These feed toxic algae blooms lethal to fish and wildlife populations dependent upon the lake.

Historically, outflow from the lake was by sheet flow over the Everglades. The Herbert Hoover dike was built after the hurricane of 1928 and outflow is now directed to various canals such as the Caloosahatchee River and St. Lucie Waterway. When the lake depth is above 17 feet, the dike is at a significantly higher risk of a breach and the flood gates are opened which always prompts outrage in coastal communities where the water quality problems scare away tourists and scar marine habitat. Once the flood gates are opened, billions of gallons of foul nutrient-laced Lake Okeechobee water runoff is dumped into the receiving canals wherein outbreaks of toxic algae has occurred. The water contains toxins typical of urban runoff and agriculture operations which include nitrogen, phosphorous, and other pollutants creating a green slime. The polluted water has damaging environmental consequences on coastal waterways—fouling fishing grounds and in some areas making water unsafe for human contact. In August of 2013, a massive toxic algae outbreak covering southeast Florida's waters with fluorescent green slime covering water that was once crystal clear water and turning it a chocolate brown. The clusters of toxic green algae spread into the estuaries affecting fish spawning as well as affecting business, home ownership, property values, and people can't swim.

The Applicant has worked extensively with some of the foulest waters imaginable. In many such instances the treatment of such fluids is required primarily due to water contaminated with aerobic or anaerobic bacteria. Aerobic bacteria, often called a slime forming bacteria, is found to produce a polysaccharide bio-film that inhibits the flow of gasses. Anaerobic bacteria can be include an acid producing bacteria such as APB that grows on metal and secretes acid producing corrosion, or SRB which is a sulfate reducing bacteria that produces hydrogen sulfide and has the potential to harm the environment.

What is needed is a device capable of cleaning Lake Okeechobee water without the need for chemicals or altering the total dissolved solids of the water.

SUMMARY OF THE INVENTION

The present invention combines ozone, hydrodynamic cavitation, acoustic cavitation and electrolysis for enhanced water treatment. The treatment apparatus introduces high intensity acoustic energy and ozone into a conditioning container to provide a mechanical separation of materials by addressing the non-covalent forces of particles or van der Waals force. The invention further discloses hydrodynamic cavitation of the ozone and effluent prior to entry into the treatment apparatus to improve to improve the mixture of effluent with ozone. Ultrasound transducers used to provide the acoustic energy strategically are located within the treatment apparatus to accelerate mass transfer as well as electrodes to break down contaminants at a faster rate.

An objective of the invention is to provide a system having a electro coagulation, ozone saturation and flash mixed with hydrodynamic cavitation and ultrasonic transducers of varying frequencies to initiate the conversion of ozone to hydroxyl radicals for use in treating aerobic and anaerobic bacteria from Lake Okeechobee discharges or in stagnant areas.

Still another objective of the invention is to disclose a an improved cavitation system to treat water leaving Lake Okeechobee and address contaminating of the estuaries, lagoons, and intracoastal waters. The system can be trailer mounted for ease of relocation, permanently mounted to treat known problem areas, or mounted on a boat having pick-up and discharge capabilities for treating algae blooms.

Another objective of the invention is to provide an improved cavitation reactor for on-site process that will improve the quality of water within Lake Okeechobee and the water exiting Lake Okeechobee.

Another objective of the invention is a employ a system including nano-cavitation for imploding bubbles to provide the liquid gas interface that is instantaneously heated to approximately 900 degrees Fahrenheit and oxides organic compounds through sonoluminescence.

Still another objective of the instant invention is to teach the combination of ultrasonic and hydrodynamic agitation in conjunction with ozone introduction into a closed pressurized generally cylindrically shaped container whereby the cavitations cause disruption of the materials allowing the ozone to fully interact with contaminated water.

Still another objective is to teach a process of enhanced ozone injection wherein ozone levels can be made more effective.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 9A is a perspective view of the skid mounted treatment system including the suction intake manifold and associated inlets.

FIG. 9B is a perspective view of the suction intake manifold and associated inlets.

FIG. 9C is a sectional view of the suction intake manifold and associated inlets.

FIG. 11A is a side view of a one of the flash reactors.

FIG. 11B is a perspective view of one of the flash reactors.

FIG. 11C is a sectional view of one of the flash reactors taken along line A-A of FIG. 11A.

FIG. 20 is a diagrammatic representation if an outer sphere reaction and an inner sphere reaction.

DETAILED DESCRIPTION OF THE PREFERRED EMBODIMENT

Figure 1:
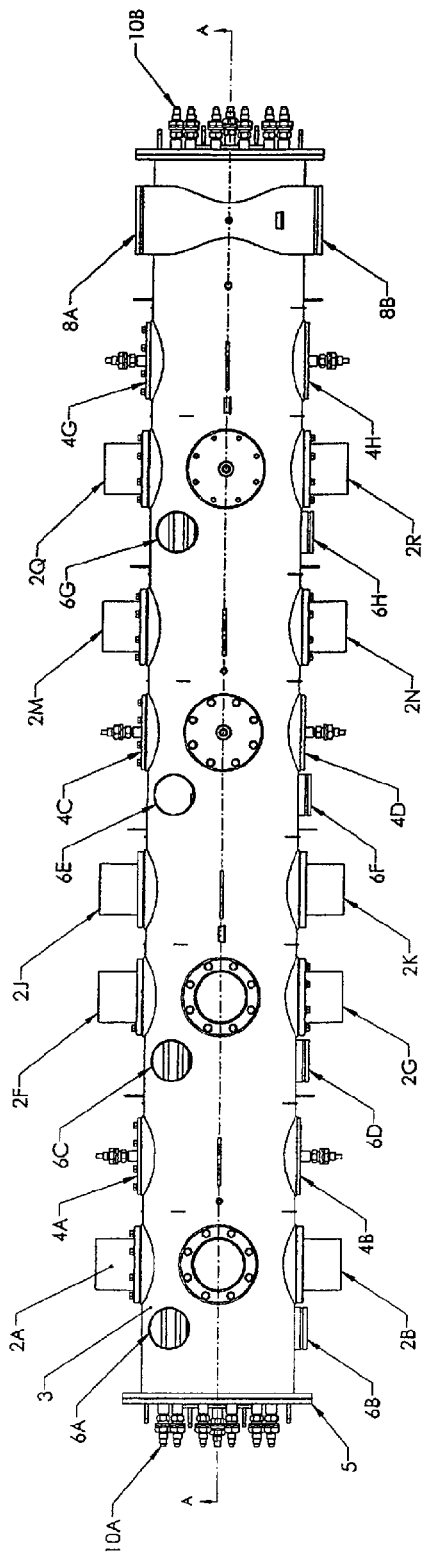
FIG. 1 is a top view of the main reactor of the treatment system.
Figure 2:
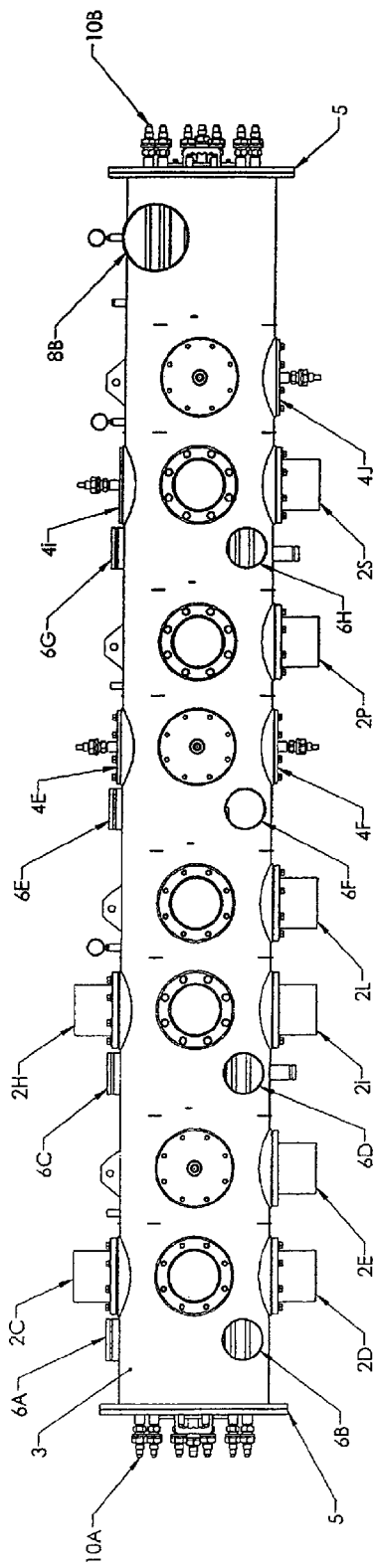
FIG. 2 is a side view of the main reactor of the treatment system.

FIG. 1 is a top view of the main reactor 1 of the treatment system and FIG. 2 is a side view of the main reactor 1. The main reactor 1 includes a cylindrical housing 3 which is, by way of example, approximately 16.5 feet long and 2 feet in diameter. A circular end plate 5 is mounted on each end of the cylindrical housing 3. Located along the length of the cylindrical housing are eighteen ultrasonic transducers 2A, 2B, 2C, 2D, 2E, 2F, 2G, 2H, 2J, 2K, 2L, 2M, 2N, 2P, 2Q, 2R and 2S. Each of the ultrasonic transducers is rated at 500 W capacity and is also equipped with a heated plate that is rated at 1000 W. At given flow rates it maintains a $\Delta T$ of 40 degrees which enhances the precipitation within the main reactor. Each transducer can produce an acoustic output in the range of 16 to 20 KHz and can be individually adjusted to the desired output frequency. Each transducer includes a diaphragm that is balanced with the help of a pressure compensation system so that a maximum amount of ultrasonic energy is released into the fluid. The transducer assemblies are installed around the periphery of the cylindrical housing 3 creating a uniform ultrasonic environment which helps to increase the mass transfer efficiency of the ozone. The acoustic cavitations generated by the ultrasonic generators also greatly enhance the oxidation rate of organic material with ozone bubbles and ensure uniform mixing of the oxidant with the fluid. Each transducer assembly includes mounting flange that is sized to mate with a flange on the cylindrical housing 3. A series of ten disc anodes 4A, 4B, 4C, 4D, 4E, 4F, 4G, 4H, 4I and 4J are positioned along the length of the cylindrical housing 3. Each of the disc anodes located in the main reactor 1 has a surface area of approximately 50.26 square inches. The current density for these set of disc anodes are 1.5 Amps/square inch. Each circular end plate 5 supports a series of twelve insulated anode electrodes 10A, and 10B. The twenty four anode rods within the two sets of twelve, 10A and 10B, are approximately seven feet in length and each have a surface area of approximately 197.92 square inches with a current density of 0.6315 amps per square inch. The main reactor tank has eight inlets 6A, 6B, 6C, 6D, 6E, 6F, 6G and 6H positioned along the length of the cylindrical housing 3. Also positioned at one end of the cylindrical housing 3 on the upper most side is a pair of outlets 8A and 8B.

Figure 3:
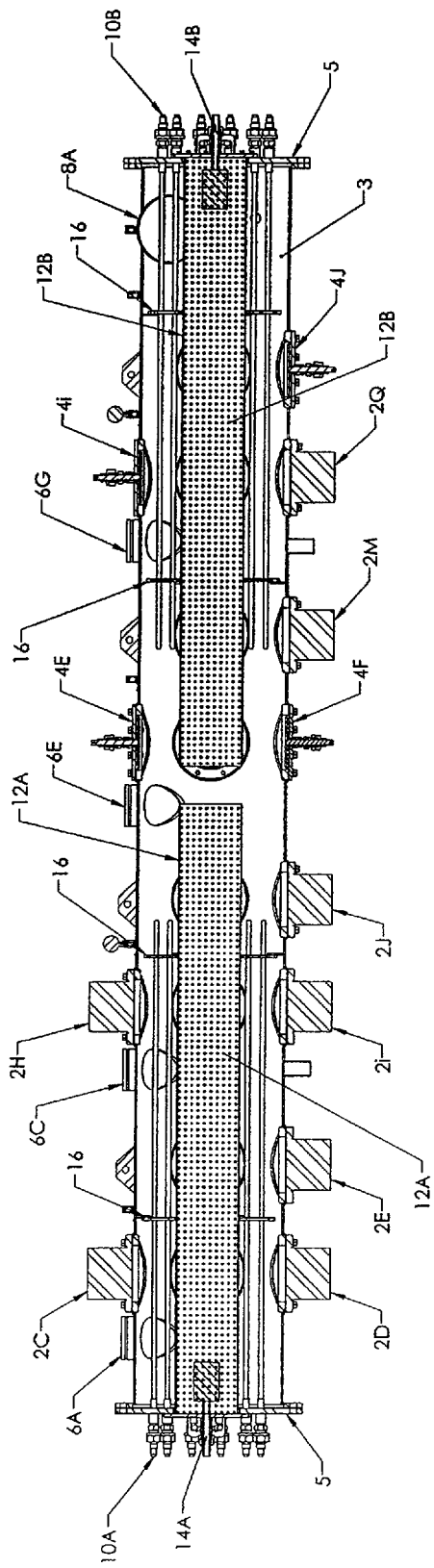
FIG. 3 is a sectional view of the main reactor taken along line A-A shown in FIG. 1A.

FIG. 3 is a cross sectional view of the main reactor 1 taken along line A-A as shown in FIG. 1A. As shown therein, cylindrical mono polar cathode screens 12A and 12B are each affixed to one of the circular end plates 5. These cylindrical cathode screens are approximately eight feet in length and promote efficient migration of electrons. The cylindrical screens 12A and 12B are negatively charged to facilitate the precipitation of crystals to adhere to the wall of the cylindrical screens 12A and 12B. Each series of anode rods 10A and 10B are supported within the main reactor 1 by a pair of supports 16 that are each attached to the inner cylindrical wall of the main reactor 1. Likewise, each cylindrical cathode screen, 12A and 12B, is support by one of the two pairs of supports 16. Cylindrical cathode screen 12A is electrically connected via connector 14A and cylindrical cathode screen 12B is electrically connected via electrical connector 14B. In addition to the provision of ultrasonic action, the system is also enabled to have electrochemical oxidation. Electrochemical oxidation offers a promising way to eliminate non-biodegradable and/or toxic organic pollutants and ammonia/nitrogen contained in the effluent. Also microorganisms can be inactivated electrochemically directly or via the generation of "killer" agents such as hydroxyl radicals. Multiple anodes and cathodes are installed with a possibility of temperature variation so as to give intensified effects. If the contaminants are present in substantially low concentrations (such as in the region of few μg/L), the achievement of high mass transfer rates in the electrochemical cell is of paramount importance and is usually one of the main issues that needs to be tackled before electrochemical oxidation can be applied successfully in this field. The combination approach of the current design is very important in these cases. The turbulence generated due to the acoustic cavitation events produced due to ultrasonic irradiations helps in eliminating the mass transfer resistances associated with electrochemical oxidation. Also the presence of electrochemical oxidation also enhances the oxidation capacity of the system due to the reactions of ozone leading to the production of the additional oxidizing species.

Figure 4:
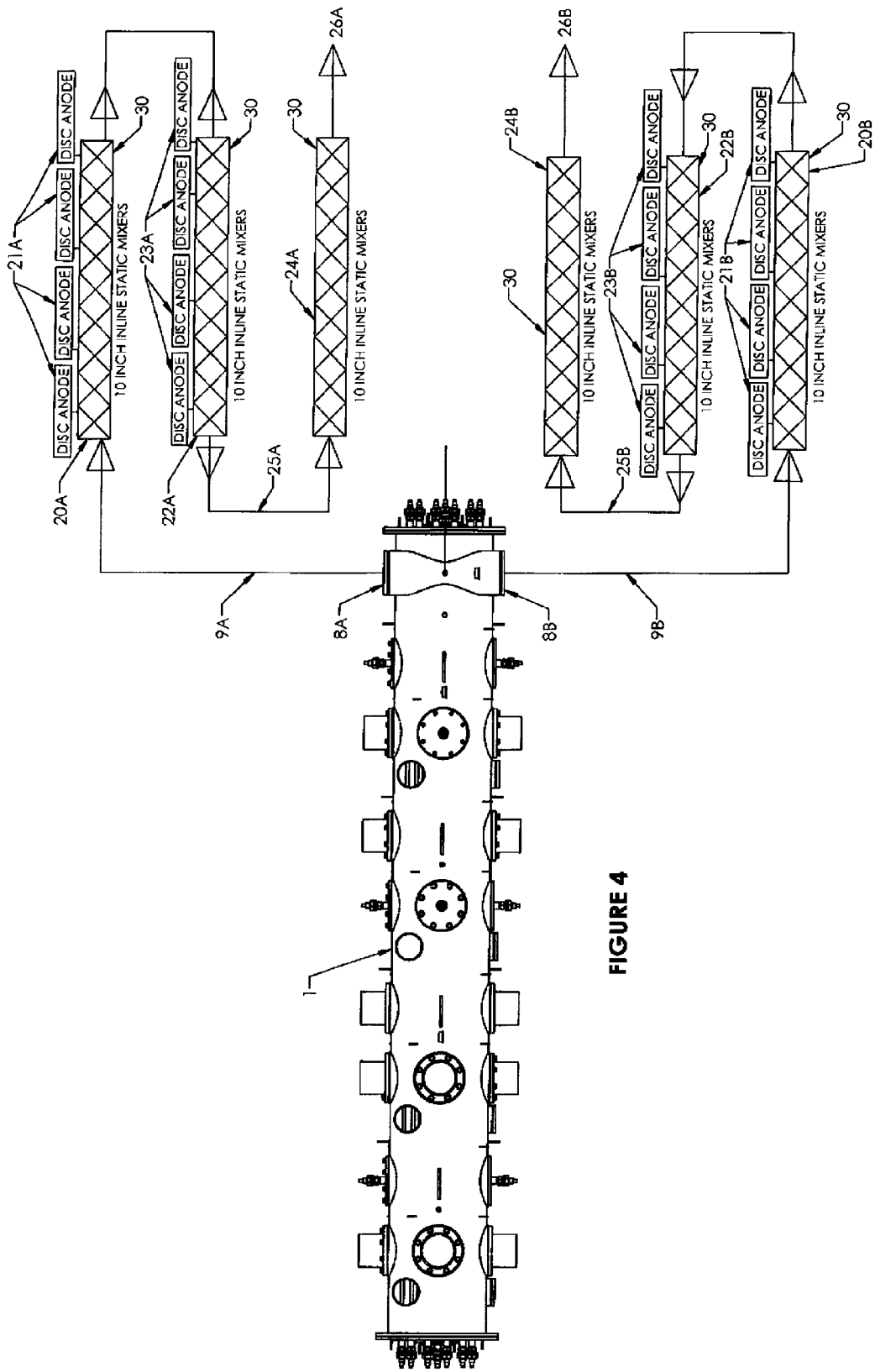
FIG. 4 is a pictorial view of the main reactor and a schematic view of the flow treatment downstream of the main reactor.

FIG. 4 is a pictorial view of the main reactor 1 and a schematic view of the flow treatment downstream of the main reactor. The output of main reactor 1 is directed via outlets 8A and 8B, via connecting flow conduits 9A and 9B, to first fluid treatment conduits 20A and 20B, respectively. Each first fluid treatment conduit 20A and 20B has an inner diameter of approximately ten inches and is approximately seventeen feet in length. Positioned within the first treatment conduits are a plurality of fixed static mixers that are positioned along the entire length of the conduits 20A and 20B. Static mixers 30 are a series of geometric mixing elements fixed within the conduit and create hydrodynamic cavitation within treatment conduits 20A and 20B. Each of the geometric mixing elements includes multiple orifices which uses the energy of the flow stream to create mixing between two or more fluids/gases. The optimized design of static mixers achieves the greatest amount of mixing with the lowest pressure loss possible. The static mixers 30 are described in more detailed in FIGS. 12A through 12C herein below. Each of the first fluid treatment conduits 20A and 20B includes four separate disc anodes 21A and 21B, respectively. The disc anodes 21A and 21B help to facilitate the production of hydroxyl radicals. The flow exiting first fluid treatment conduits 20A and 20B are then directed to second fluid treatment conduits 22A and 22B, respectively. Second fluid treatment conduits 22A and 22B have an internal diameter of approximately ten inches and are approximately seventeen feet in length. Similar to the first fluid treatment conduits, second fluid treatment conduits 22A and 22B each have static mixers 30, creating hydrodynamic cavitation, and four disc anodes 23A and 23B, respectively. As in the first treatment conduits, the disc anodes 23A and 23B help to facilitate the production of hydroxyl radicals. The flow exiting second treatment conduits 22A and 22B are directed into third treatment conduits 24A and 24B, respectively. The third treatment conduits 24A and 24B have an internal diameter of approximately ten inches and are approximately seventeen feet in length. The third treatment conduits 24A and 24B each have static mixers 30 throughout their length, thereby creating hydrodynamic cavitations. The flow exiting the third treatment conduits 24A and 24B is directed to outlets 26A and 26B, respectively.

Figure 5:
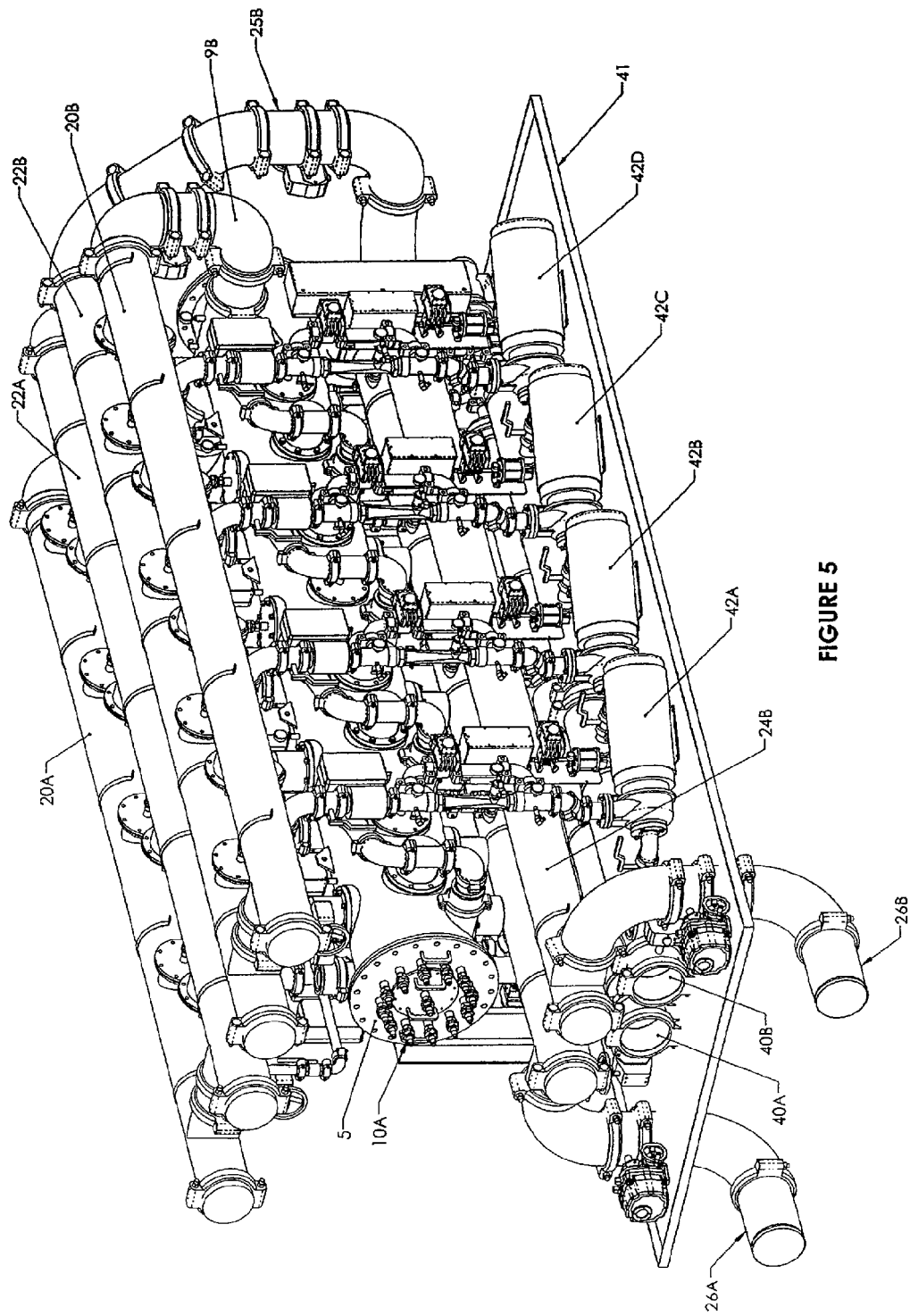
FIG. 5 is a perspective rear end view of the treatment system mounted on a skid that can be placed on a mobile trailer or on a boat.

FIG. 5 is a perspective rear end view of the treatment system mounted on a skid 41. By mounting the treatment system on a skid platform the equipment can be readily removed and repaired or replaced and then reinstalled into the mobile trailer unit as will be described later. As shown, the fluid treatment apparatus includes two inlets 40A and 40B. One side of the apparatus includes four suction pumps 42A, 42B, 42C and 42D. Each suction pump 42A, 42B, 42C and 42D fluidly connects the inlet pipe 40B to an ozone injection apparatus which is described and illustrated in FIGS. 10A and 10B. The treatment apparatus also includes two separate outlets 26A and 26B. As shown in this view, one end of the main reactor 1 has electrodes 10A mounted on a circular end plate 5. Connecting flow conduit 9B fluidly connecting main reactor 1 outlet 8B to first treatment conduit 20B. First fluid treatment conduit 20B is in turn fluidly connected to second fluid treatment conduit 22B. Second fluid treatment conduit 22B is fluidly connected via connecting flow conduit 25B to third fluid treatment conduit 24B. The fluid exits the third fluid treatment conduit 24B via an outlet 40B.

Figure 6:
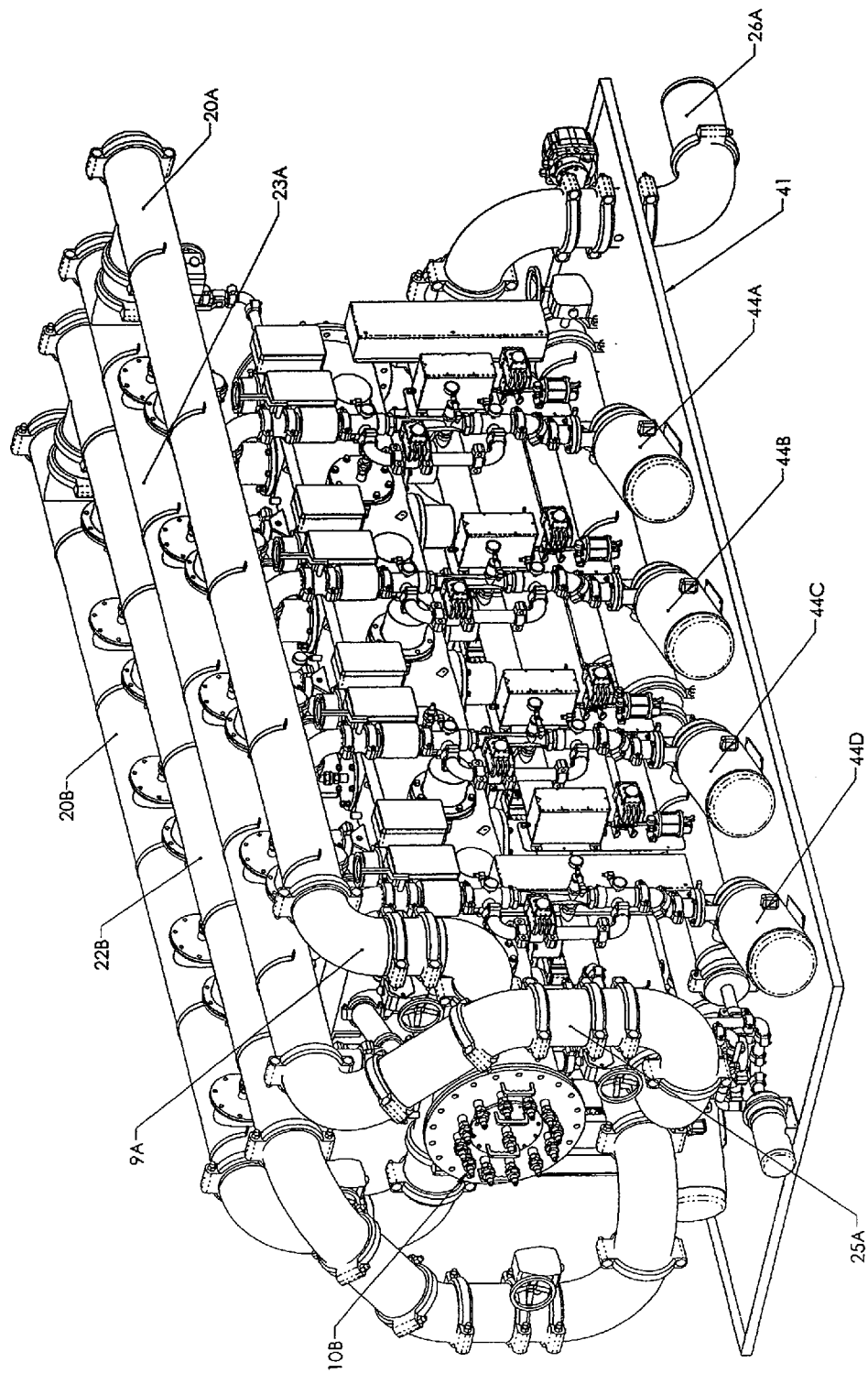
FIG. 6 is a perspective front end view of the treatment system mounted on a skid.

FIG. 6 is a perspective front end view of the treatment system mounted on a skid. This view is a side view opposite to that shown in FIG. 5. As illustrated, this side of the treatment apparatus shows four suction pumps 44A, 44B, 44C and 44D. The reactor is configured with eight inlets and associated pumps and ozone injectors. Each pump, four in number, fluidly communicates with intake pipe 40A on the intake side of each pump and an ozone injection apparatus on the outlet side of the pump. The flow leaving main reactor 1 passes through connecting flow conduit 9B and into first treatment flow conduit 20A which in turn is communicated to second fluid treatment conduit 22A. The flow leaving second fluid treatment conduit 22A then passes through connecting flow conduit 25B and into third fluid treatment conduit 24B. The fluid exits the third fluid treatment conduit 24A via an outlet 26A.

Figure 7:
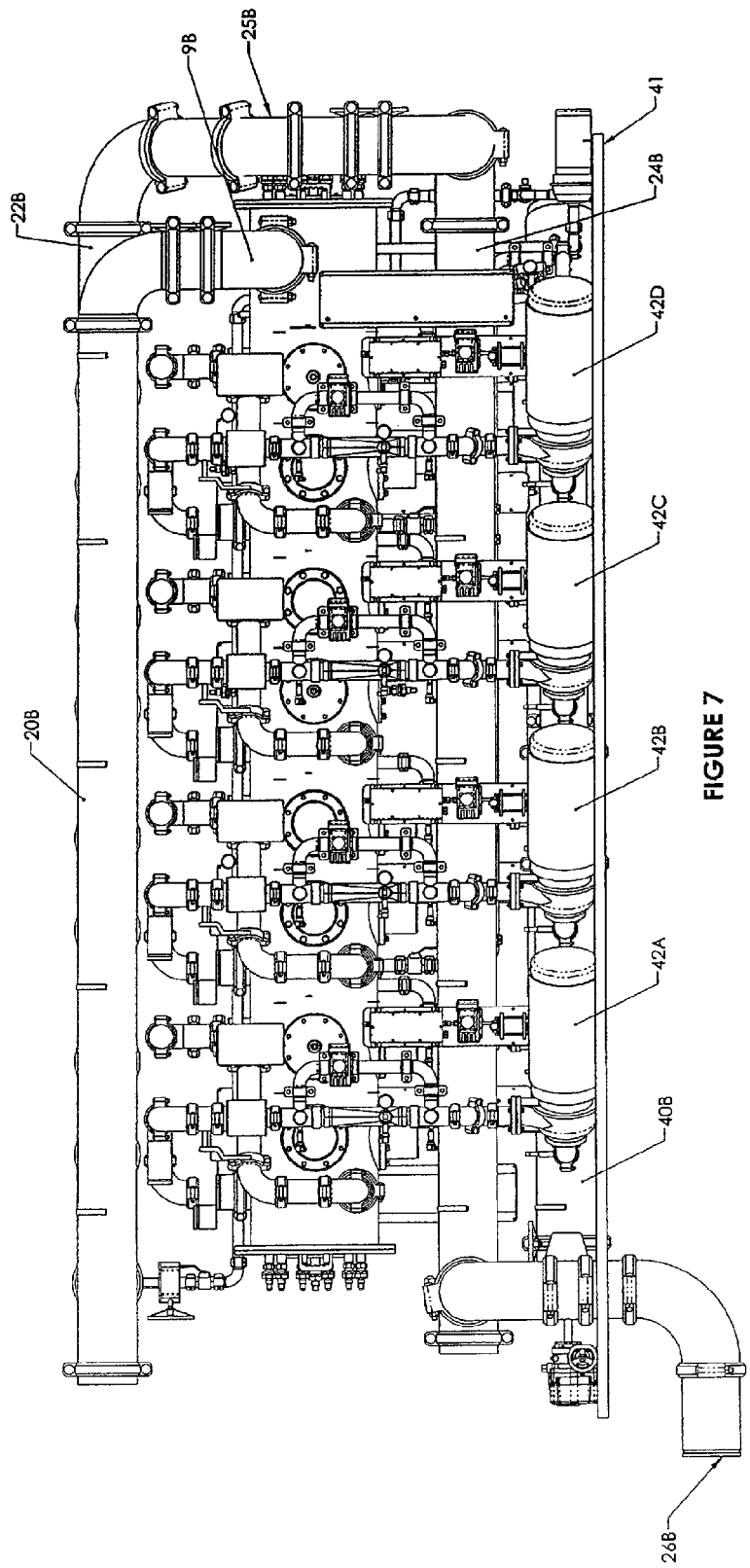
FIG. 7 is a left side view of the treatment system mounted on a skid.

FIG. 7 is a left side view of the treatment system mounted on a skid 41. This view shows suction pumps 42A, 42B, 42C and 42D each drawing fluid from intake conduit 40B and outputting the flow to an ozone injection apparatus which in turn conveys the fluid to the main reactor housing 1. Also shown in this view is connecting flow conduit 9B that connects outlet 8B with first fluid treatment conduit 20B. Also shown in this view is second fluid treatment conduit 22B that is fluidly connected to the third fluid treatment conduit 24B via connecting flow conduit 25B. The third fluid treatment conduit is connected to outlet 26B.

Figure 8:
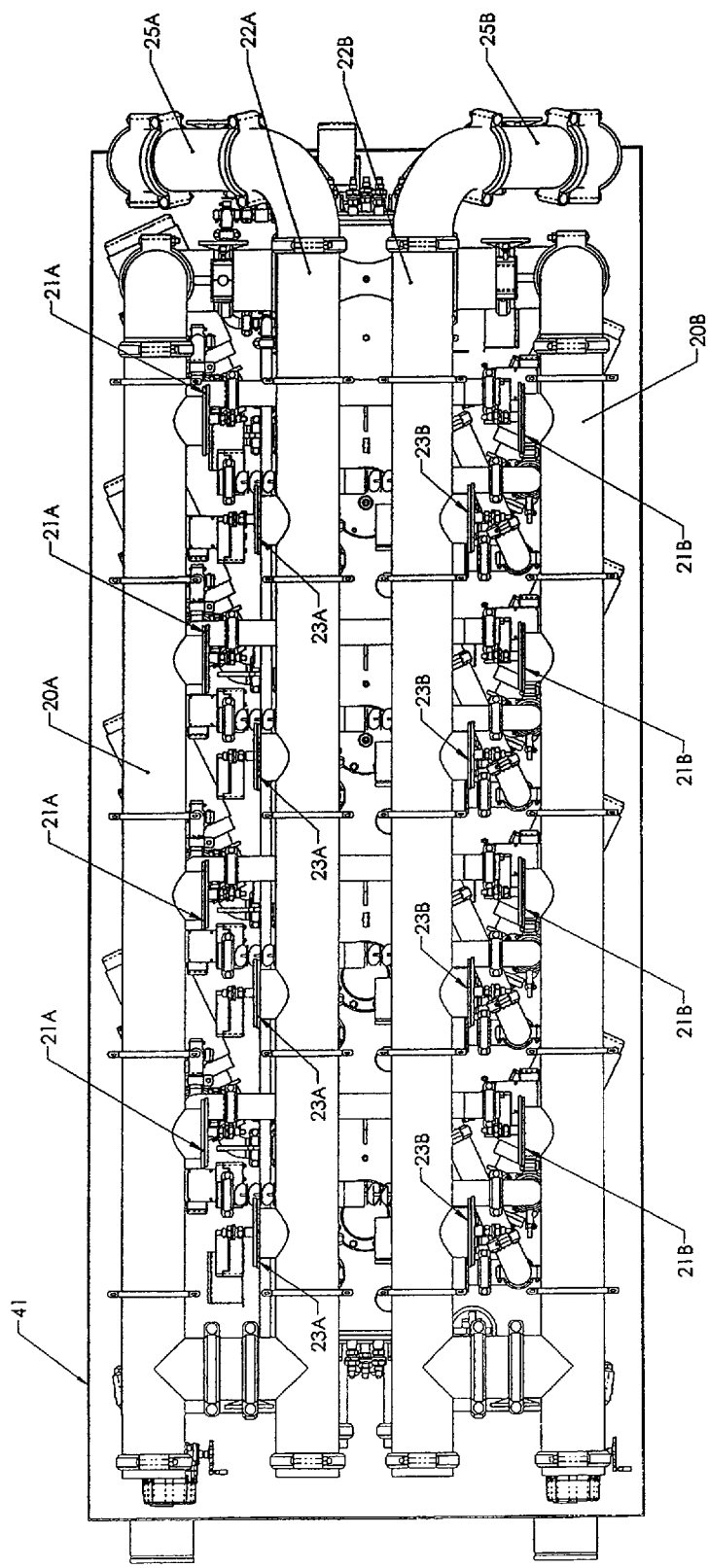
FIG. 8 is a top view of the treatment system mounted on a skid.

FIG. 8 is a top view of the treatment system mounted on the skid 41. As seen in the figure the first treatment conduit 20A contains four disc anodes 21A and first treatment conduit 20B also contains four disc anodes 21B. In a similar fashion the second treatment conduit 22A contains four disc anodes 23A and the other second treatment conduit 22B contains four disc anodes 23B. Connecting flow conduit 25A fluidly connects second treatment conduit 22A to the third treatment conduit 24A and the other connecting flow conduit 25B connects the second treatment conduit 22B to the third treatment conduit.

FIG. 9A is a perspective view of the skid mounted treatment system including the suction intake manifold and associated inlets. The suction intake manifold in mounted below the skid 41. As shown in FIG. 9B the suction manifold 50 includes four inlets 52, 54, 56, and 58. At the end of the suction manifold 50 is a suction box 60. As shown in FIG. 9C the suction box 60 includes a mesh screen 62 with 0.5 inch apertures to arrest debris and particulates grater than 0.5 inches in size. The suction box 60 and mesh screen 62 can be accessed from the rear end of the box 60. The suction manifold 50 is constructed with hydrodynamic static mixer vanes 64 positioned within the manifold between the inlets 52 and 56 and the suction box 60. The construction of these static mixing devices is described in FIGS. 12A through 12C to follow. Static mixer vanes encourage the homogeneous mixing of the fluid before entering the main reactor 1. As will be described, the holes formed within the mixing vanes act as orifices and allow varying pressure at multiple locations. The local pressure drops in flow through the manifold produces cavitations bubbles. These cavitation bubbles collapse as the pressure is again raised. The collapse of the cavitation bubbles produces oxidation of organic substances in the fluid. The suction manifold 50 has two outlets 66A and 66B. Outlets 66A and 66B are sized and configured to mate up with inlet conduits 40A and 40B, respectively. Different streams of influent can be homogenized in the suction manifold 50. The holes provided on the mixing vanes also acts as an orifice and allow generation of conditions of varying pressure at multiple locations in the manifold, which can generate cavitating conditions. If the throttling is sufficient to cause the pressure around the holes to fall below the threshold pressure for cavitation (usually vapor pressure of the medium at the operating temperature), cavities are generated. Subsequently, as the liquid jet expands reducing the average velocity, the pressure increases, resulting in the collapse of the cavities. During the passage of the liquid through the constriction, boundary layer separation occurs and a substantial amount of energy is lost in the form of a permanent pressure drop due to local turbulence. Very high intensity fluid turbulence is also generated downstream of the constriction; its intensity depends on the magnitude of the pressure drop and the rate of pressure recovery, which, in turn, depend on the geometry of the constriction and the flow conditions of the liquid, i.e., the scale of turbulence. The intensity of turbulence has a profound effect on cavitation intensity and the extent of water treatment which can be obtained using hydrodynamically generated cavitation events. The final cavitational intensity decides the extent of oxidation capacity in terms of the generation of free radicals. It should be noted here that the generation of free radicals is of paramount importance to oxidize the chemical species present in the effluent streams.

Figure 10B:
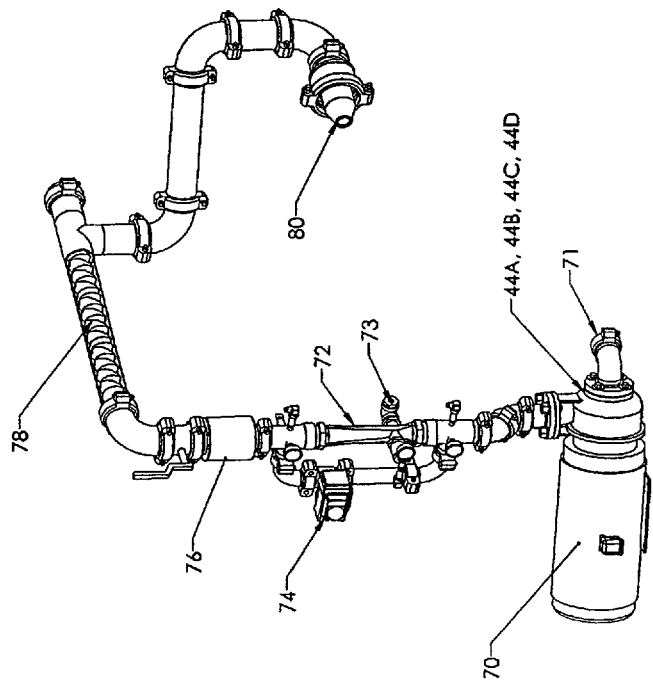
FIG. 10B is a perspective view of one of the ozone mixing arrangements including a fluid inlet pump, ozone injection device, a flash reactor, a static mixer and a discharge nozzle on the right side of the main reactor as viewed from the front.
Figure 10A:
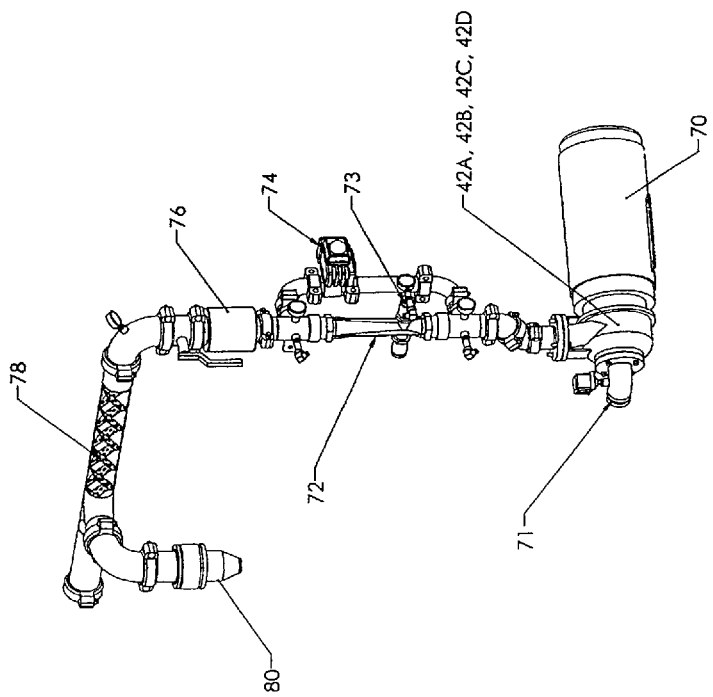
FIG. 10A is a perspective view of one of the ozone mixing arrangements including a fluid inlet pump, ozone injection device, a flash reactor, a static mixer and a discharge nozzle on the left side of the main reactor as viewed from the front.

FIG. 10A is a perspective view of one of the ozone mixing arrangements on the left side of the main reactor as viewed from the front and FIG. 10B is a perspective view of one of the ozone mixing arrangements on the right side of the main reactor as viewed from the front. FIG. 10A shows one of the pumps 42A, 42B, 42C or 42D mechanically connected to an electric motor 70. The pump has an inlet 71 that draws in fluid from the inlet conduit 40B. FIG. 10B shows one of the pumps 44A, 44B, 14C or 44D mechanically connected to an electric motor 70. Downstream of the pump is a venturi type mixing device 72 to inject ozone into the fluid flow. The venturi type injector has an ozone inlet 73. An air compressor feeds an oxygen generator which in turn feeds an ozone generator. The output of the ozone generator is then automatically metered into each of the venturi type mixing devices as is shown in FIGS. 17A through 17I. The instrumentation across the ozone injection system ensures that the vacuum in the venturi is maintained by the bypass line with an automated actuated ball, which in turn ensures optimum amount of gas is fed to the incoming water. The total Ozone production is about 220 lbs/day (approx. 3,030 g/hour). The pressure drop across the venturi is controlled by an automated bypass valve 74 using a PID control loop. The venturi injector is used to increase the velocity of the water entering into the main reactor. The higher entry velocity means higher Reynolds Number and hence higher turbulence energy dissipation. The dynamic mixing under pressure yields a grater mass transfer and provides a desired pressure to the venturi injector. The venturi injector also allows treatment of gases to any depth and permits larger does of treatment gas, such as ozone.

Downstream of the venturi type injector is a flash reactor 76. The flash reactor 76 uses pressure velocity to create turbulence. Higher cavitation energy dissipation is observed in the flash reactor 76. The turbulence in the reactor 76 creates high shear making the ozone gas bubbles smaller thereby creating a higher mass transfer efficiency. The flash reactor is described in FIGS. 11A-11C described below. Downstream of the flash reactor 76 is an inline static mixer 78 formed from a series of static blades with apertures, as will be described in FIGS. 12A through 12C, positioned within a 4 inch conduit. The static mixer 78 creates hydrodynamic cavitation and produces cavitation bubbles locally at the orifices of the vanes. As these cavitation bubbles implode within the high pressure area, energy is released in the fluid in the form of heat, light, and mechanical vibration thereby destroying/degrading the organic contaminants. Located downstream of the in line static mixer 78 is a converging discharge nozzle 80. The conduit supporting the discharge nozzle 80 is fluidly sealed to the main reactor 1 and the nozzle itself is positioned within the main reactor. By way of example only, the converging discharge nozzle can be a Mazzie® nozzle N45. The discharge nozzle is used to increase the velocity of the fluid entering the main reactor which means a higher Reynolds Number and hence higher turbulence energy dissipation. The converging nozzle 80 enhances the systems performance with the venturi type injector 72. The converging discharge nozzle 80 provides a desired back pressure on the venturi type injector 72 and, the dynamic mixing under pressure results in greater mass transfer of the ozone into the fluid and permits a larger dosage of ozone to enter the fluid. With 8 discharge nozzles 80 the total treatment flow capacity is approximately 3,300 gpm. The flow through each of the eight injection manifolds, including venturi injector 72, flash reactor 76 and line static mixer 78, is approximately 420 gpm which includes an ozone injection rate of 505 g/hour and ozone gas flow rate of 75 SLPM. The gas to liquid ration would be approximately 0.047:1, with an estimated MTE of approximately 92 to 94 percent and the estimated applied ozone dose of 4.98 mg/L.

FIG. 11A is a side view of a one of the flash reactors, FIG. 11B is a perspective view of one of the flash reactors and FIG. 11C is a sectional view of one of the flash reactors taken along line A-A of FIG. 11A. Flash reactor 76 is formed as a generally cylindrical housing and has in inlet conduit 82 that is smaller in diameter than outlet conduit 88. Within the flash reactor housing 76 the inlet conduit 82 is fluidly connected to a slightly curved section of conduit 83 having a reduced portion 84. Also within the flash reactor 76 is a curved section of conduit 86 that is fluidly connected to outlet conduit 88. The direction of curvature of conduit section 83 is opposite to that of curved conduit 86. As the flow of fluid that has been mixed with ozone is passed through the flash reactor 76 the sizes of gas bubbles are reduced to nano size by high shear. The uni-directional and shearing design of the gas/liquid water mixture allows for a rapid dissolution and attainment of gas/liquid equilibrium which results in high mass transfer efficiency with a minimal time. Due to the configuration of the flow paths within the flash reactor 76 there are different areas within the flash reactor where severe velocity and pressure changes take place. These drastic velocity and pressure changes create high shear which reduces the size of the ozone/oxygen bubbles to nano size and also dissolving more gas into the fluid which is under pressure.

Figure 12A:
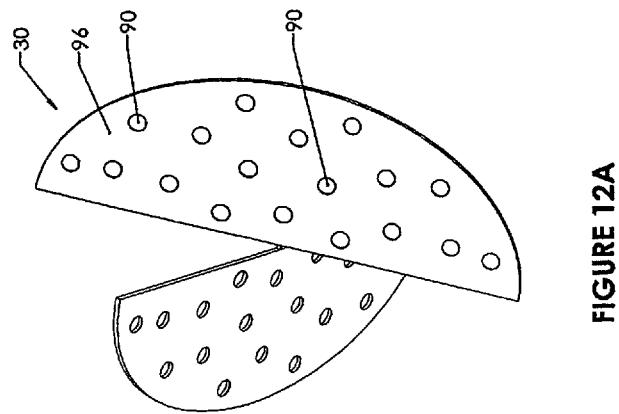
FIG. 12A is a perspective view of one of the inline static mixers.
Figure 12C:
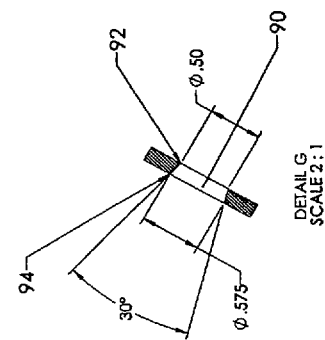
FIG. 12C is a detailed view of one of the holes in the inline static mixer shown in FIG. 12A.
Figure 12B:
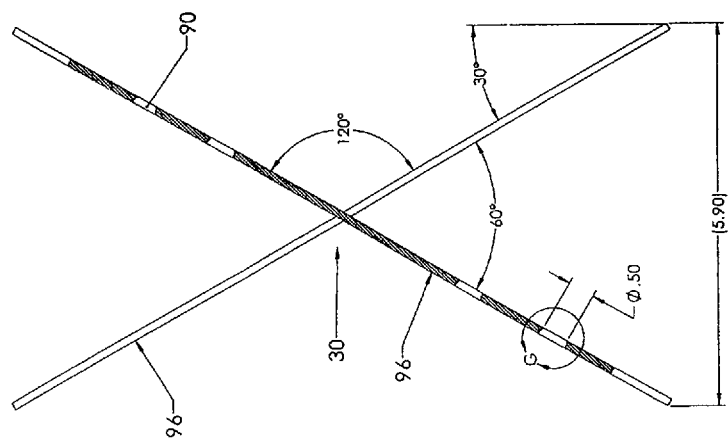
FIG. 12B is a cross sectional view of one of the static inline mixers.

FIG. 12A is a perspective view and FIG. 12B is a cross sectional view of one of the static inline mixers. FIG. 12C is a detailed view of one of the holes in the inline static mixer shown in FIG. 12A. The inline static mixers 30 in FIG. 4 are approximately 10 inches in diameter and are positioned adjacent to one another within the fluid treatment conduits 20A, 22A, 24A, 20B, 22B and 24B. The inline static mixers 64 are positioned adjacent one another within intake manifold 50, as shown in FIG. 9C, and are approximately 16 inches in diameter. The incline static mixers 78 are positioned adjacent one another as shown in FIGS. 10A and 10B and are approximately 4 inches in diameter. The views shown in FIGS. 12A through 12C are illustrative of the inline mixers 30, being approximately ten inches diameter. The inline static mixers 64 and 78 are of similar construction to mixer 30 except that the four inch mixer 78 has fewer holes per baffle 96 than mixer 30 and the 16 inch inline mixer 78 has more holes per baffle 96 than the mixer 30. The holes 90 formed on each of the baffles 96 of the inline static mixers 30, 64 and 78 are formed as diverging nozzles having an inlet aperture 92 on the upstream side having a diameter that is smaller than the diameter of the outlet aperture 94 on the downstream side of the blade. The inlet aperture and outlet aperture are connected by a conically shaped bore 94, as shown in FIG. 12C. Static mixers 30, 64 and 78 are each formed as a series of geometric elements fixed within a conduit wherein each of the baffles 96 of the static mixing elements contains a plurality of holes 90 are formed as diverging nozzles. The static mixers use the energy of the flow stream to create mixing between two or more fluids. The static mixers are designed to achieve the greatest amount of mixing with the lowest possible pressure loss.

The multiple holes in each of the baffles of the static mixers act as localized orifices, dropping the pressure of the fluid locally allowing the formation of cavitation bubbles. As these cavitation bubbles are carried away with the flow, these bubbles collapse or implode in the zone of higher pressure. The collapse of the cavitation bubbles at multiple locations within the treatment system produces localized high energy conditions such as shear, high pressure, heat light, mechanical vibration, etc. These localized high energy conditions facilitate the breakdown of organic substances. The baffles are arranged so that when the fluid is discharged from one baffle, it discharges with a swirling action and then strikes the downstream baffle. The baffles provide a local contraction of the flow as the fluid flow confronts the baffle element thus increasing the fluid flow pressure. As the fluid flow passes the baffle, the fluid flow enters a zone of decreased pressure downstream of the baffle element thereby creating a hydrodynamic cavitation field. Hydrodynamic cavitation typically takes place by the flow of a liquid under controlled conditions through various geometries. The phenomenon consists in the formation of hollow spaces which are filled with a vapor gas mixture in the interior of a fast flowing liquid or at peripheral regions of a fixed body which is difficult for the fluid to flow around and the result is a local pressure drop caused by the liquid movement. At a particular velocity the pressure may fall below the vapor pressure of the liquid being pumped, thus causing partial vaporization of the cavitating fluid. With the reduction of pressure there is liberation of the gases which are dissolved in the cavitating liquid. These gas bubbles also oscillate and then give rise to the pressure and temperature pulses. The mixing action is based on a large number of forces originating from the collapsing or implosions of cavitation bubbles. If during the process of movement of the fluid the pressure at some point decreases to a magnitude under which the fluid reaches a boiling point for this pressure, then a great number of vapor filled cavities and bubbles are formed. Insofar as the vapor filled bubbles and cavities move together with the fluid flow, these bubbles move into an elevated pressure zone. Where these bubbles and cavities enter a zone having increased pressure, vapor condensation takes place within the cavities and bubbles, almost instantaneously, causing the cavities and bubbles to collapse, creating very large pressure impulses. The magnitude of the pressure impulses with the collapsing cavities and bubbles may reach ultra high pressure implosions leading to the formation of shock waves that emanate form the point of each collapsed bubble.

Figure 16:
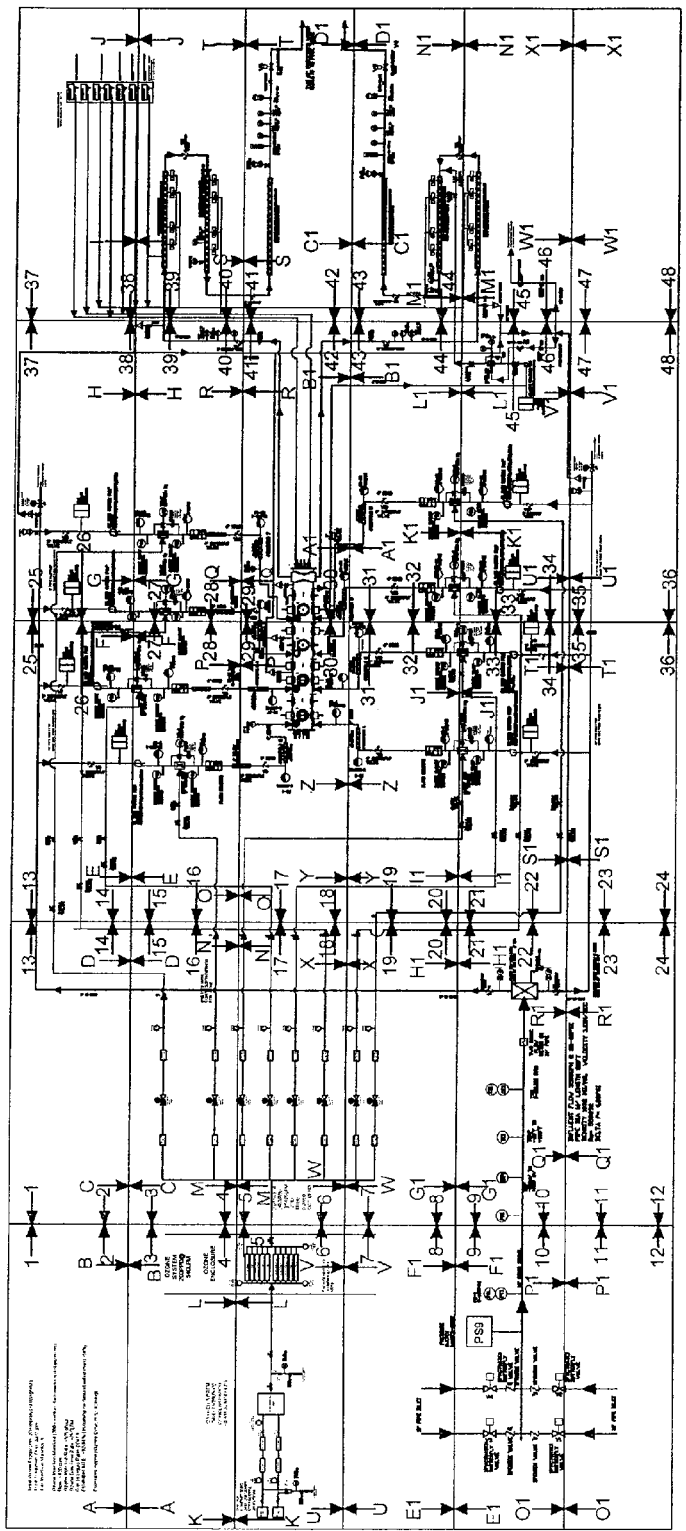
FIG. 16 is a complete P&ID (piping and instrument diagram) of the treatment system annotated with partition lines for FIGS. 17A through 17DD which are enlarged views for purpose of clarity.
Figure 17A:
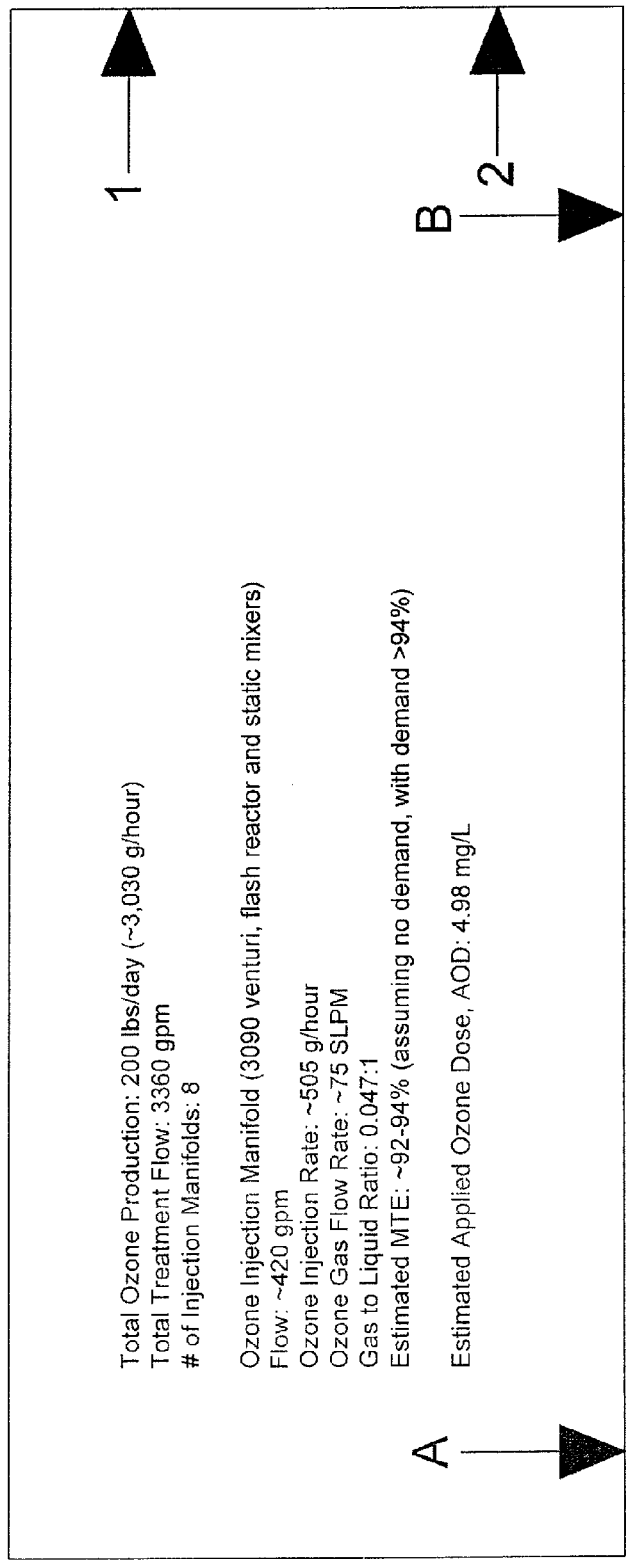
FIGS. 17A, 17B, 17C, 17D, 17E, 17F, 17G, 17H, 17I, 17J, 17K, 17L, 17M, 17N, 17O, 17P, 17Q, 17R, 17S, 17T, 17U, 17V, 17W, 17X, 17Y, 17Z, 17AA, 17BB, 17CC, 17DD are enlarged views of various sections of the treatment as partitioned in FIG. 16.
Figure 17B:
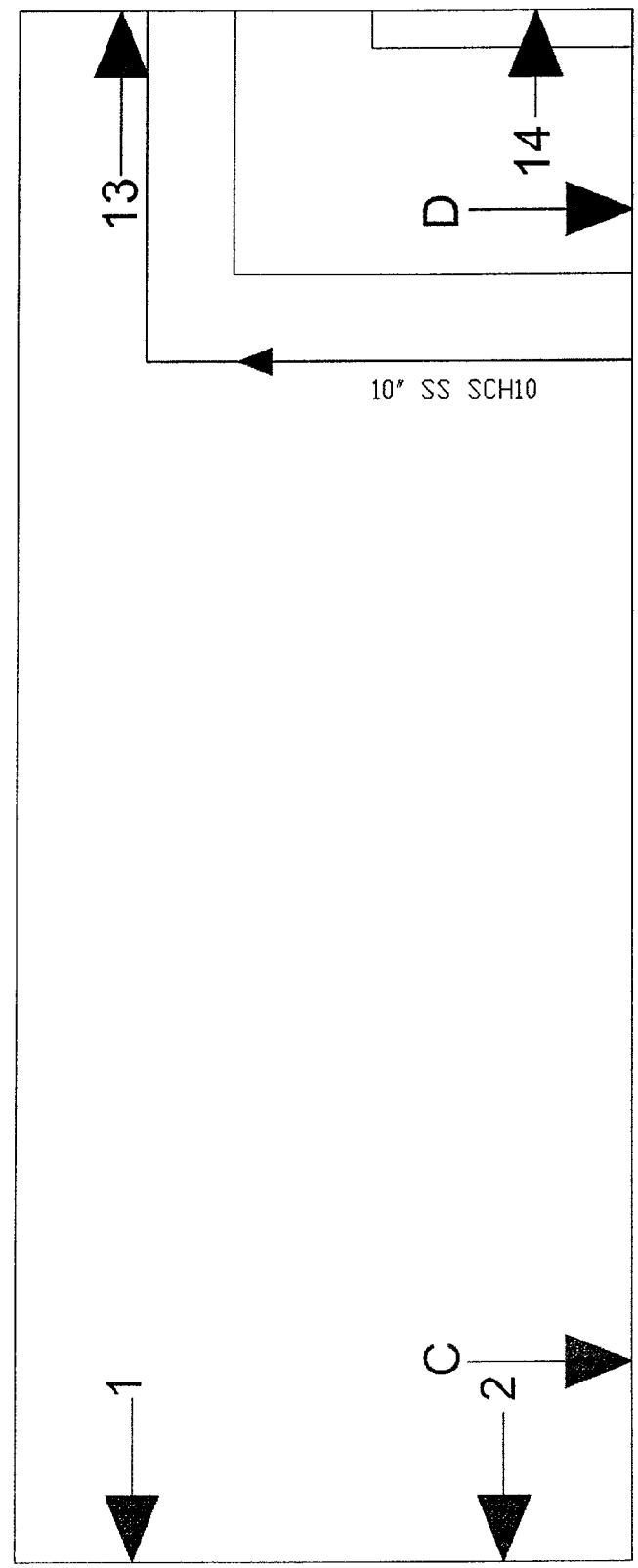
Figure 17C:
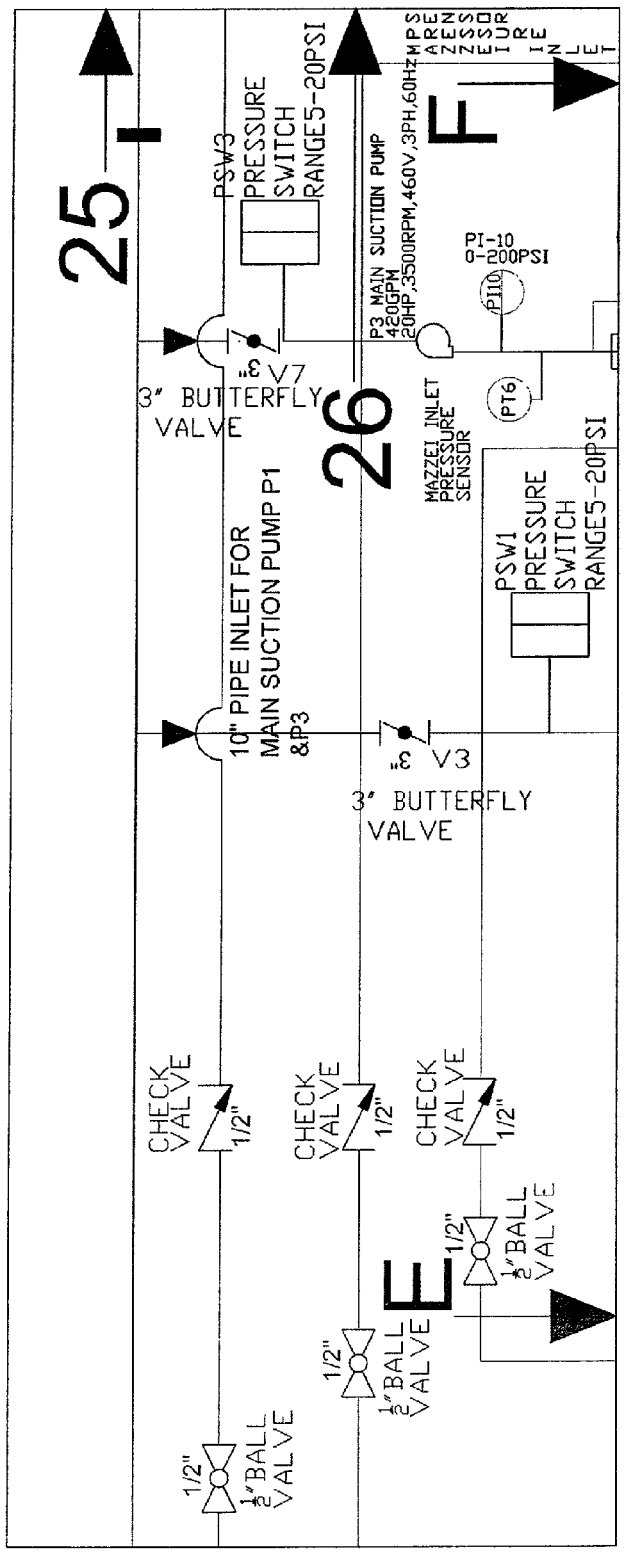
Figure 17D:
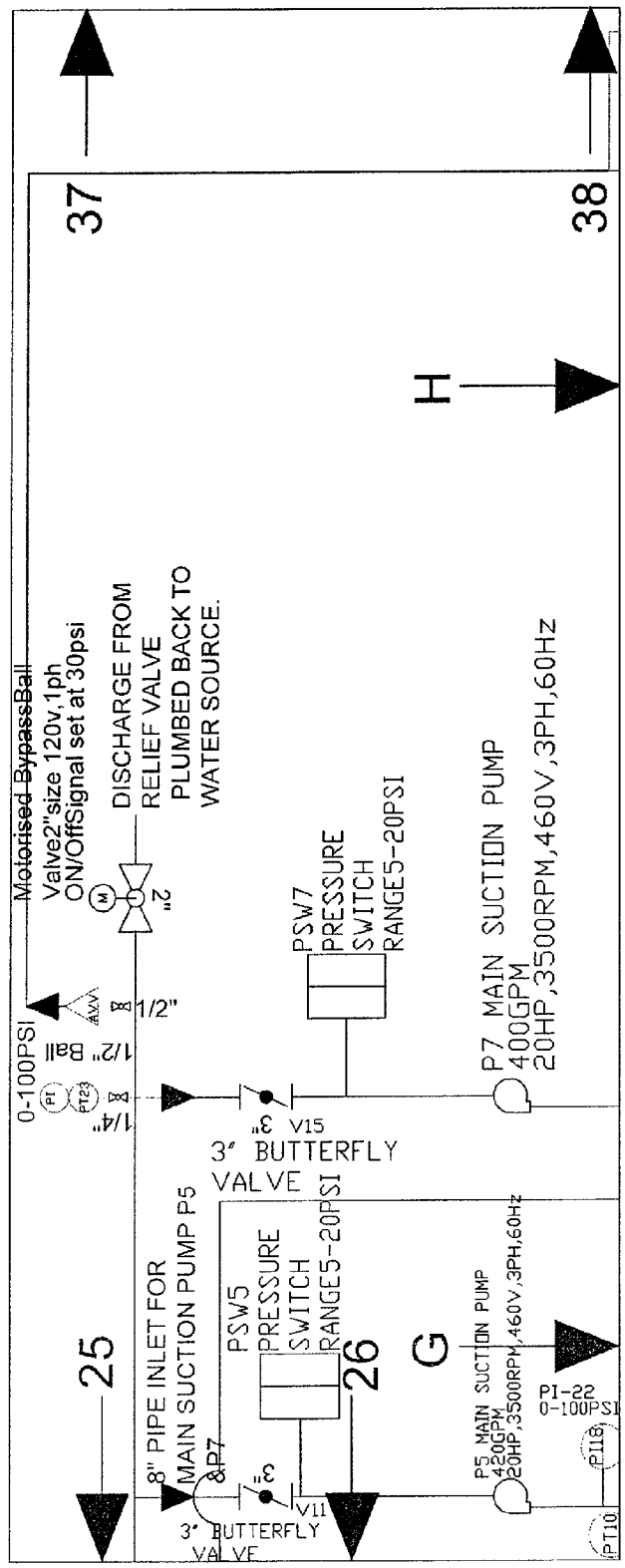
Figure 17E:
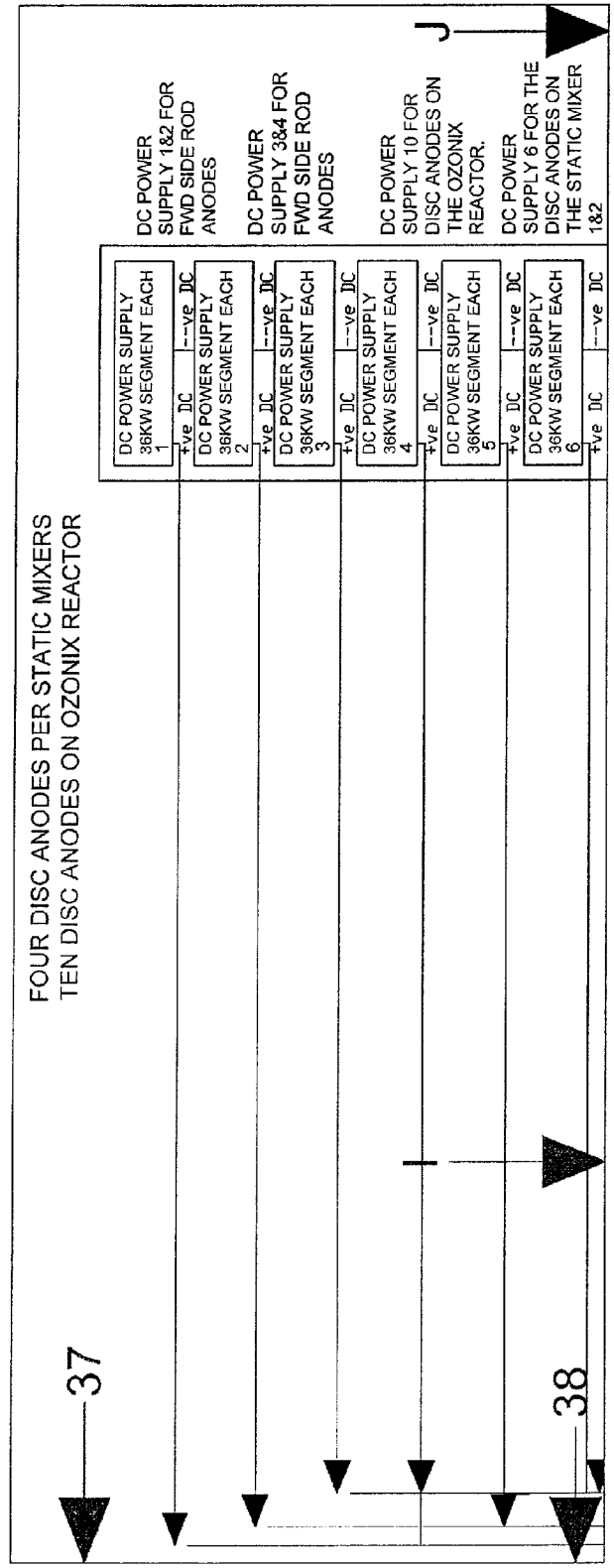
Figure 17F:
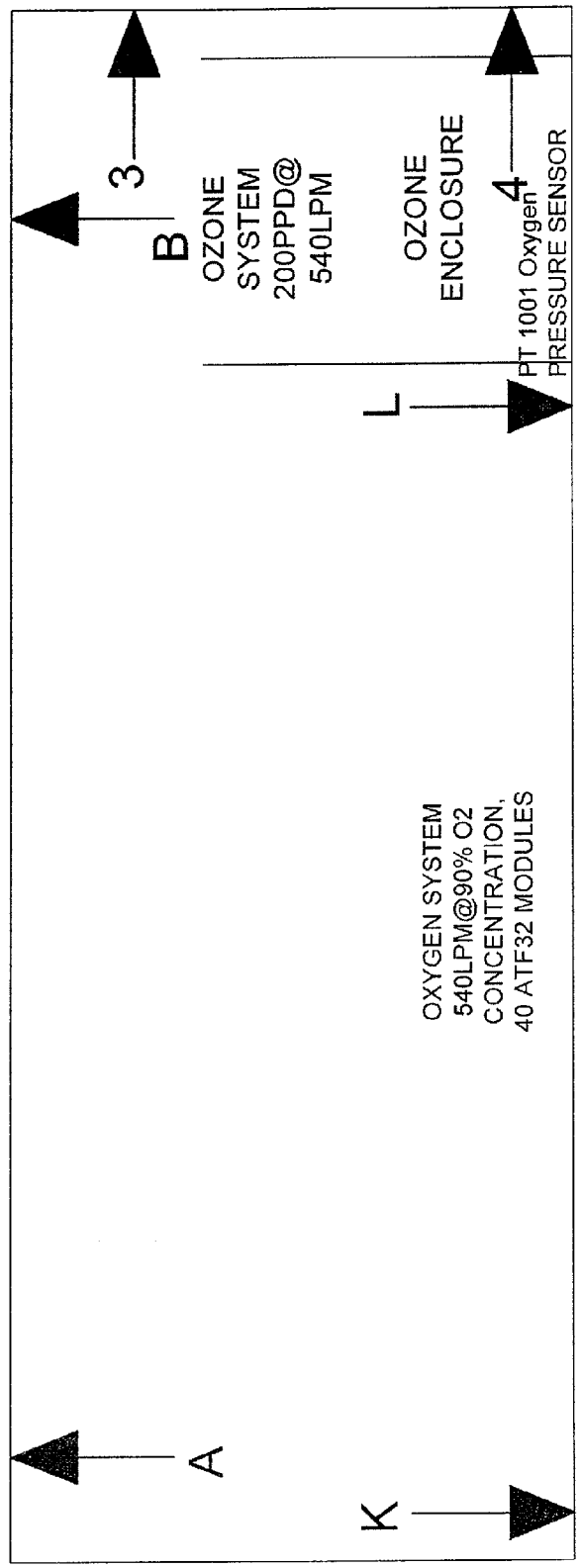
Figure 17G:
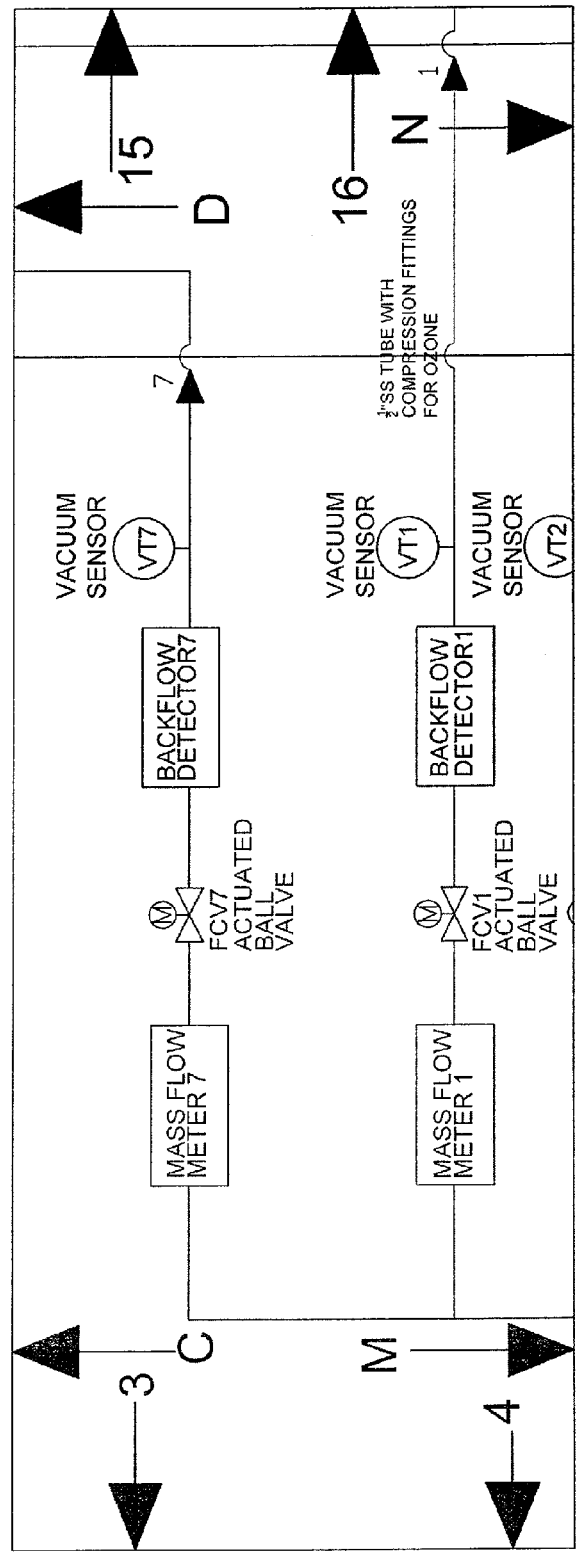
Figure 17H:
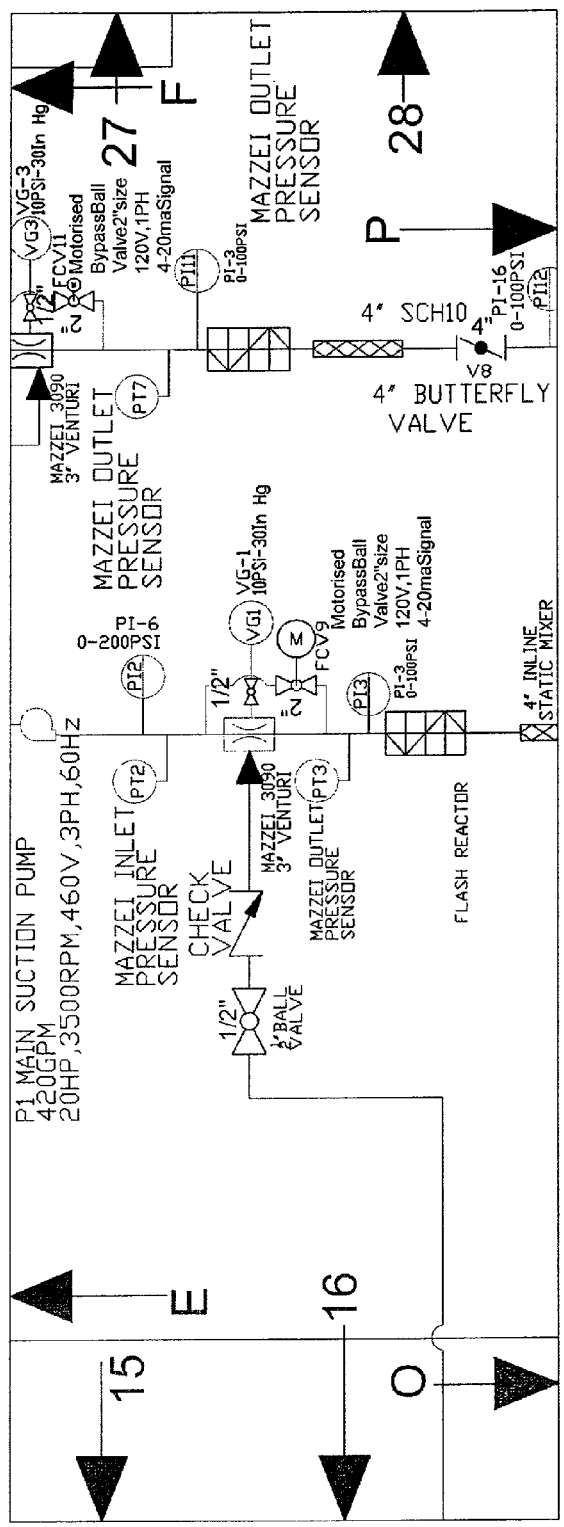
Figure 17I:
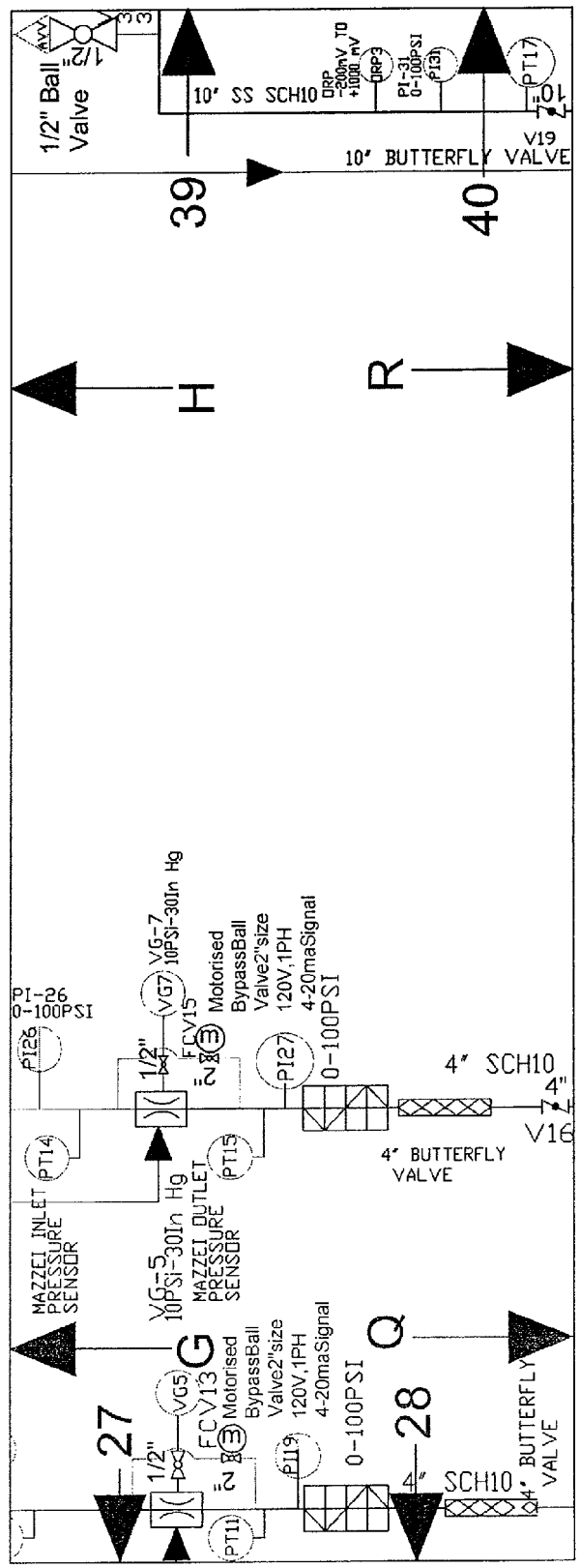
Figure 17J:
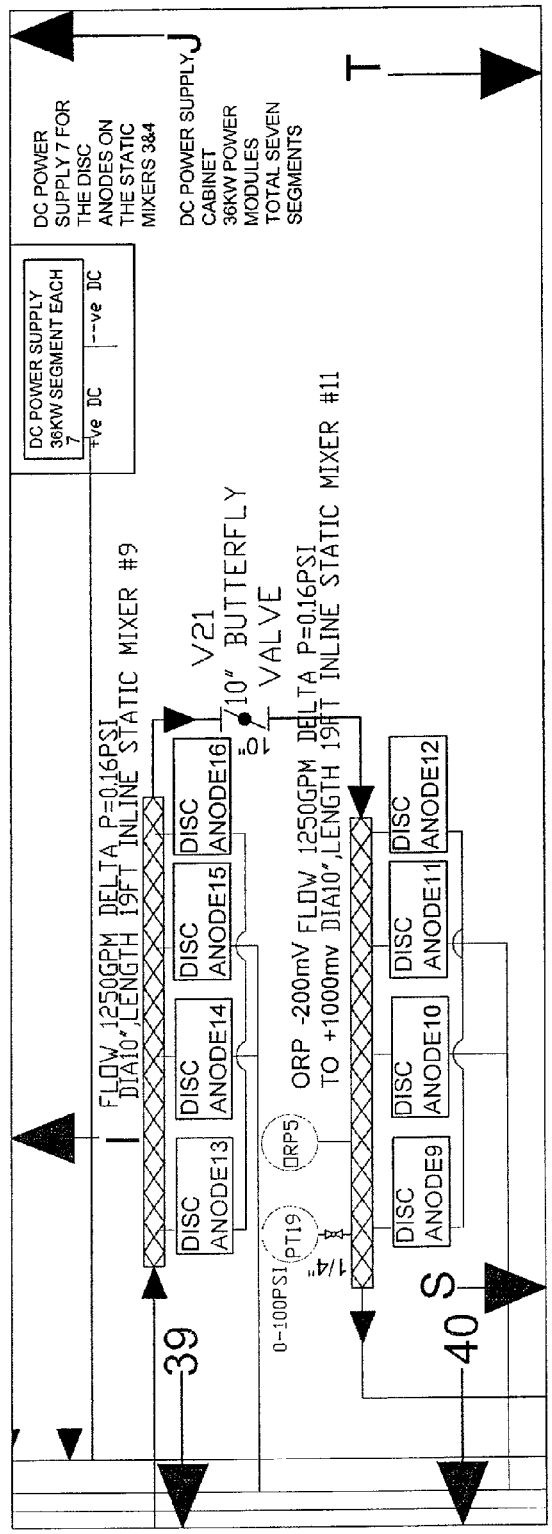
Figure 17K:
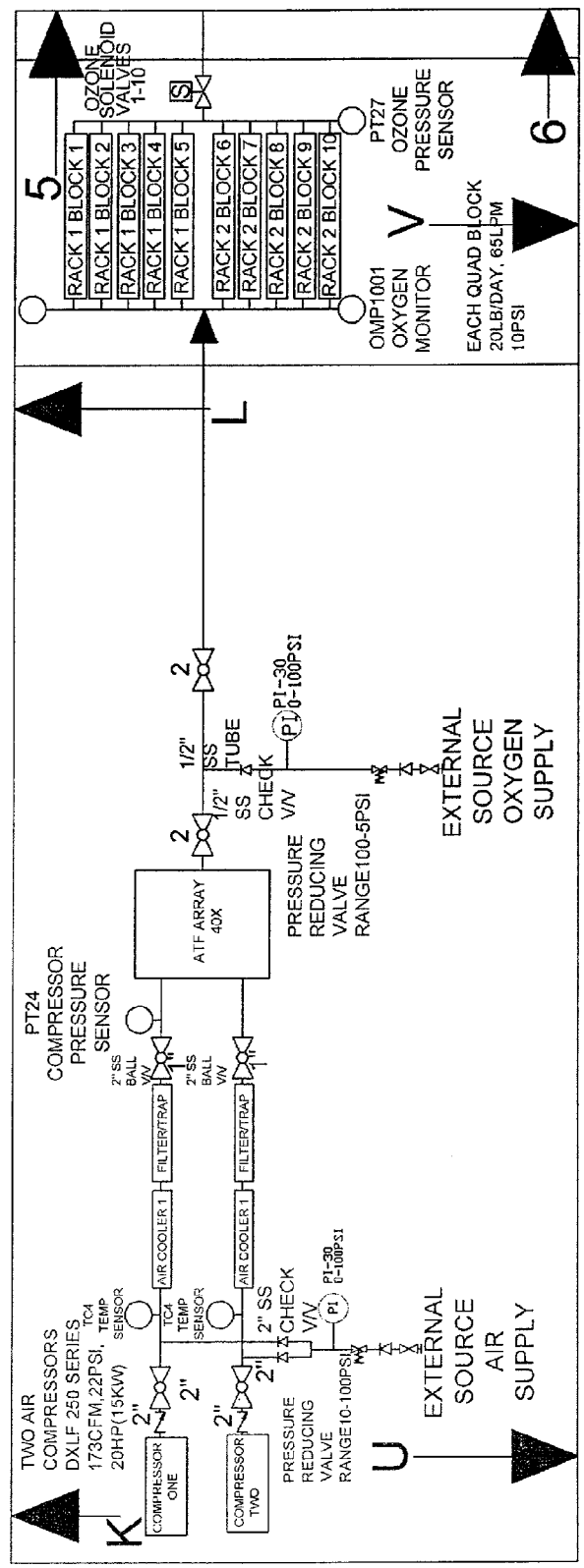
Figure 17L:
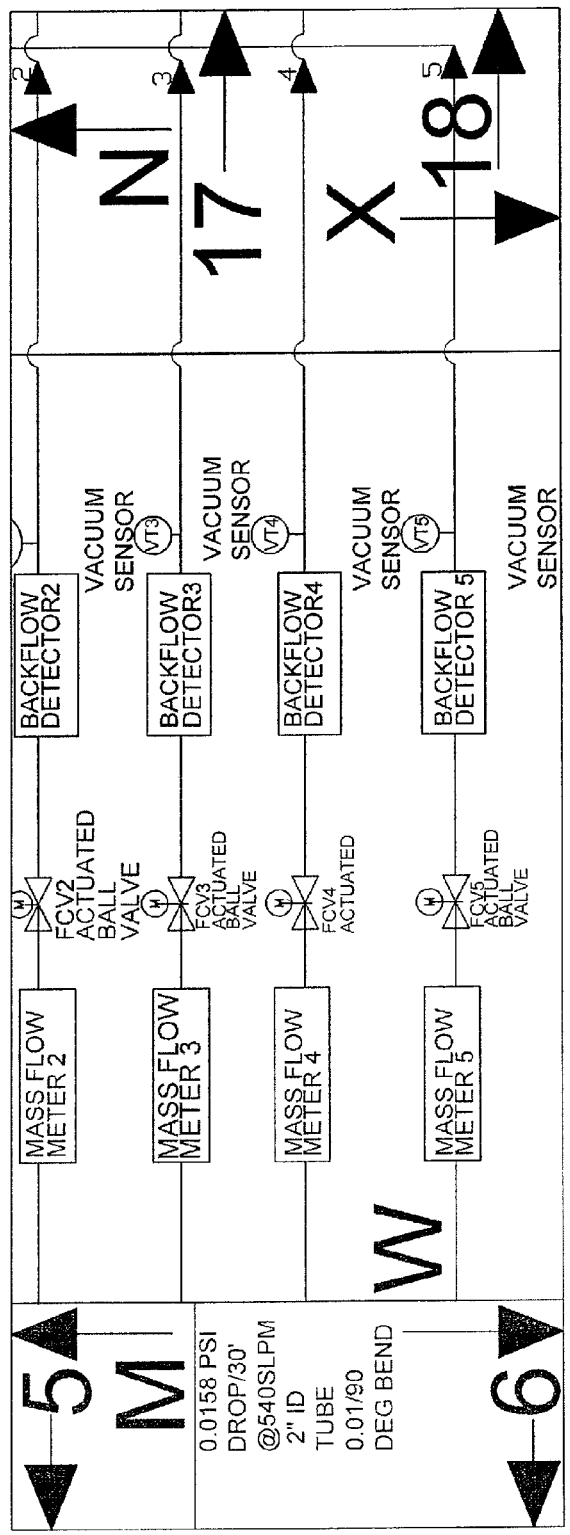
Figure 17M:
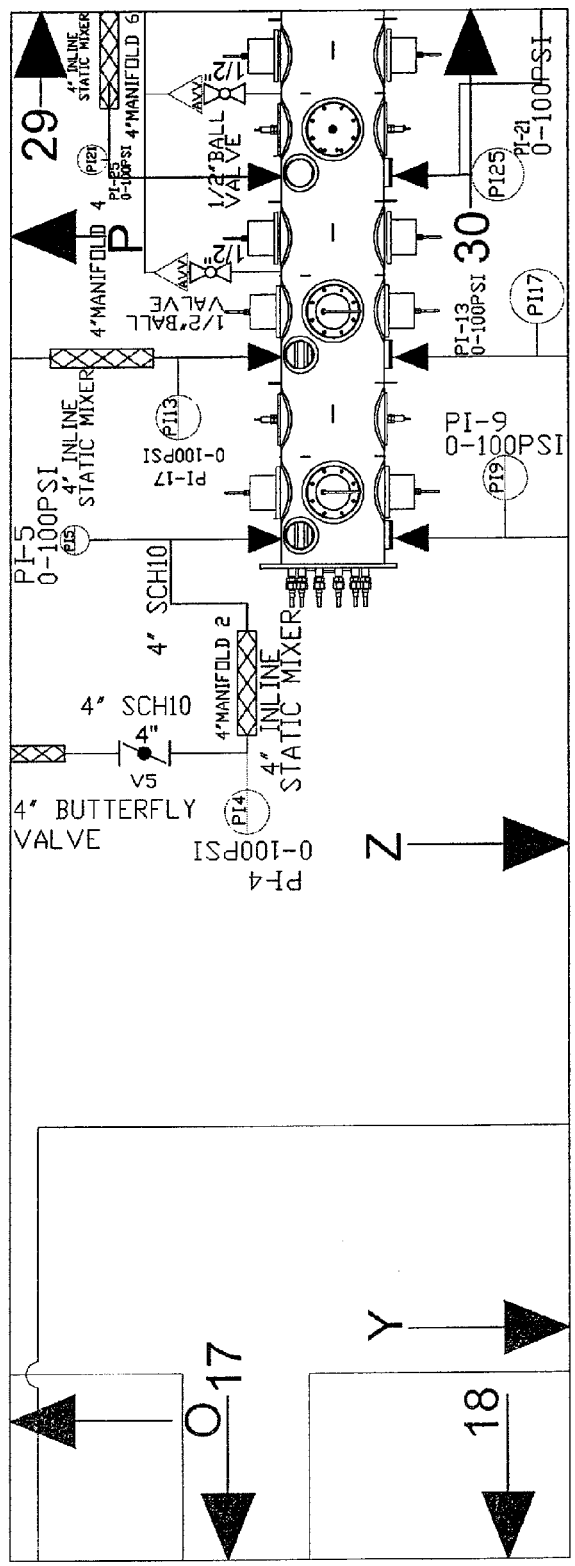
Figure 17N:
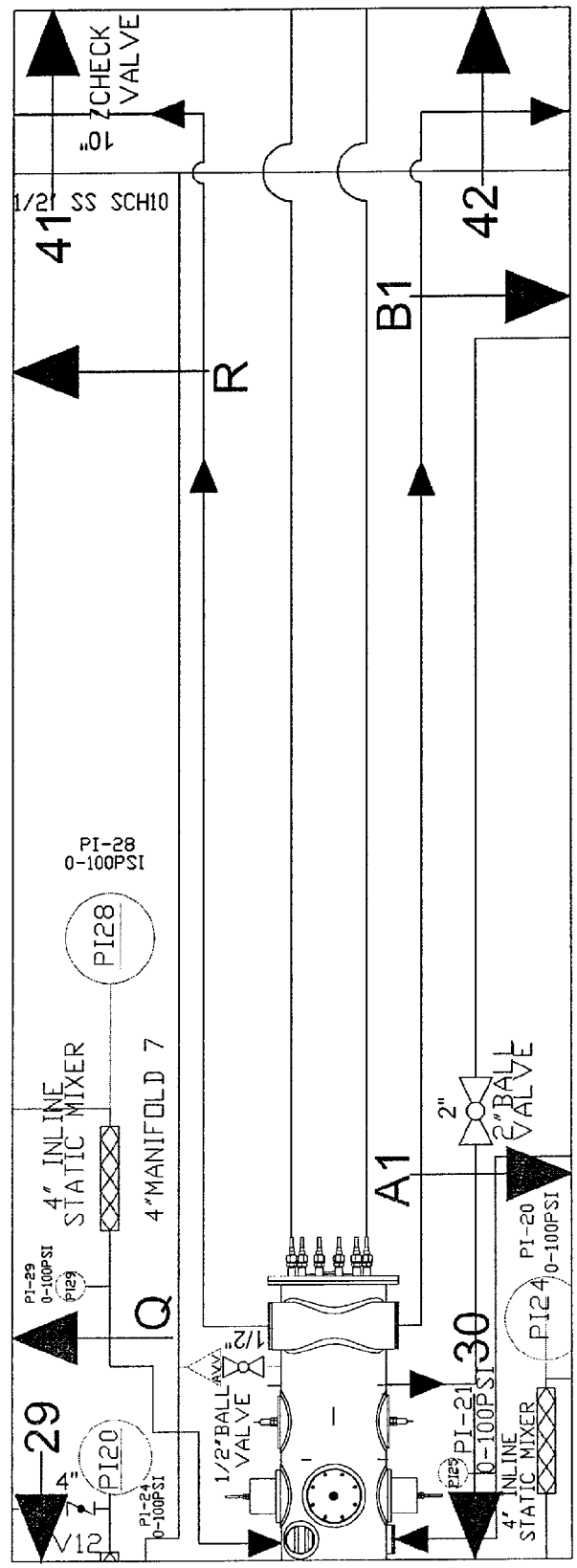
Figure 17O:
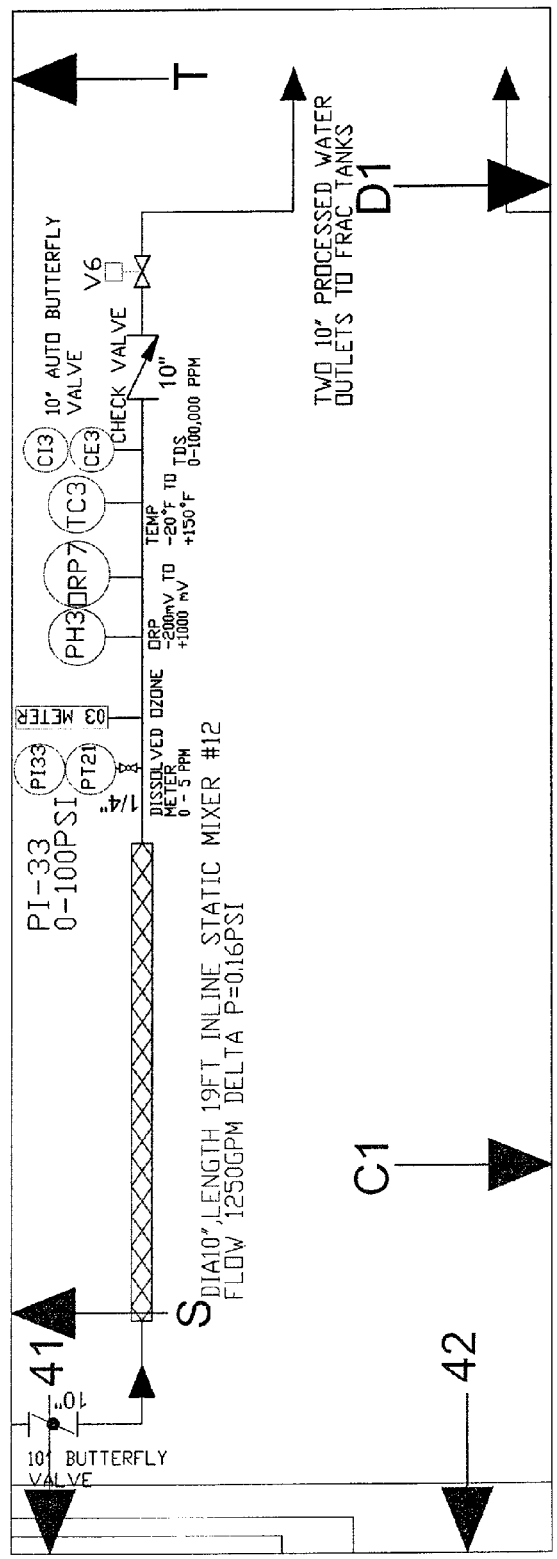
Figure 17P:
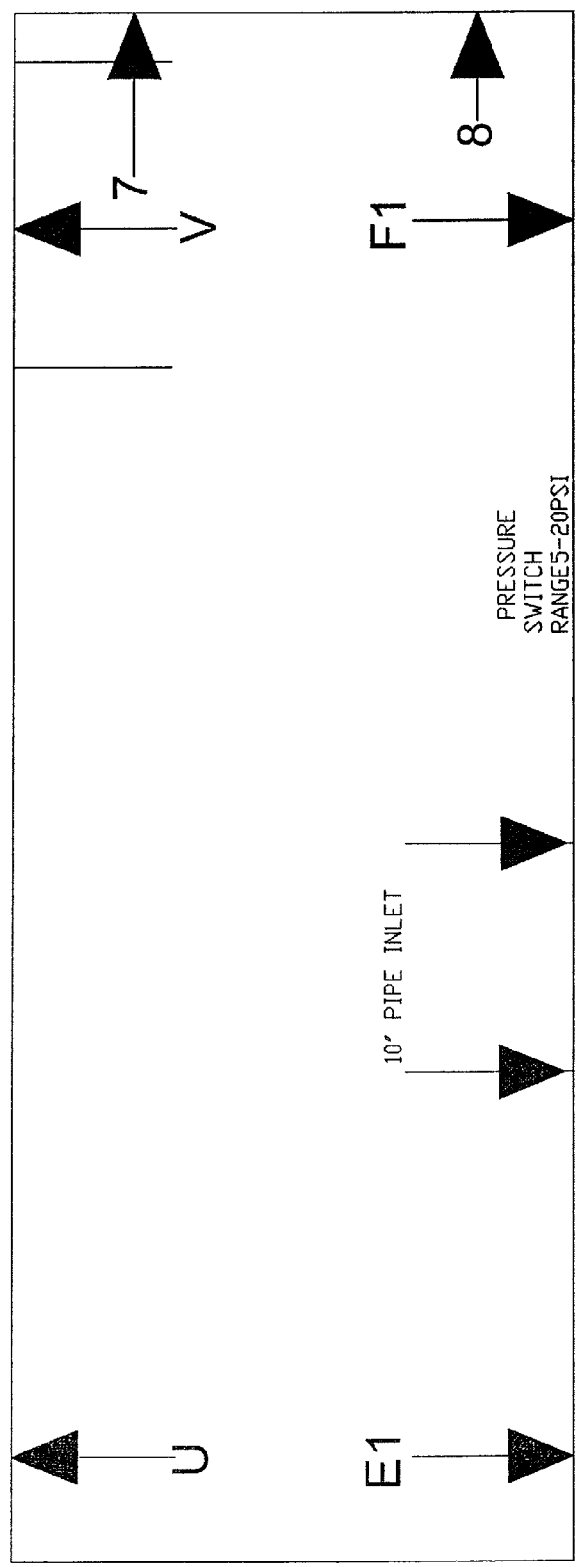
Figure 17Q:
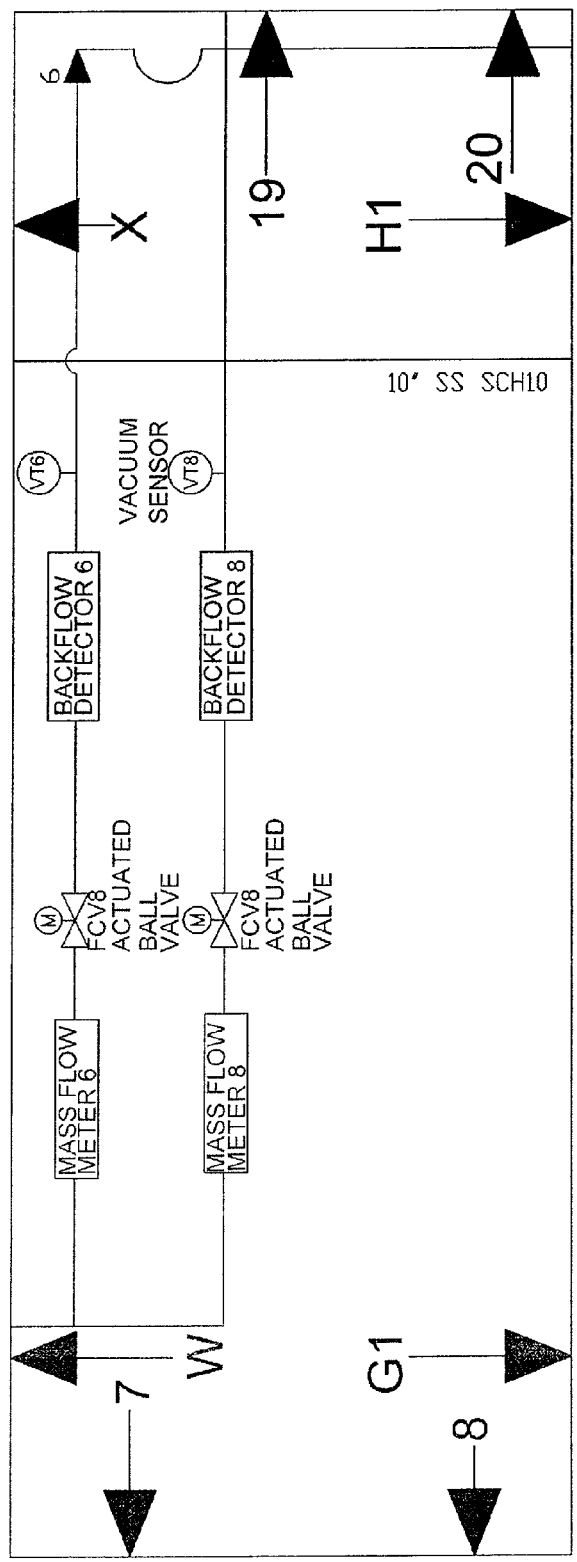
Figure 17R:
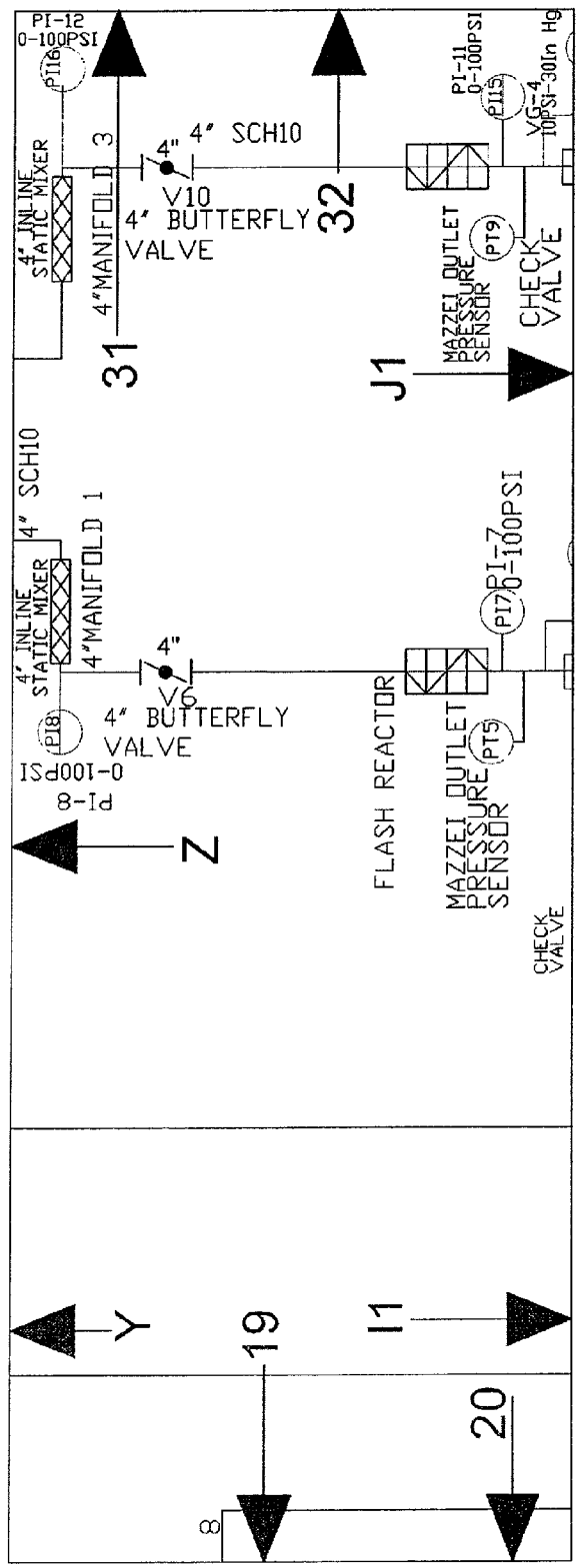
Figure 17S:
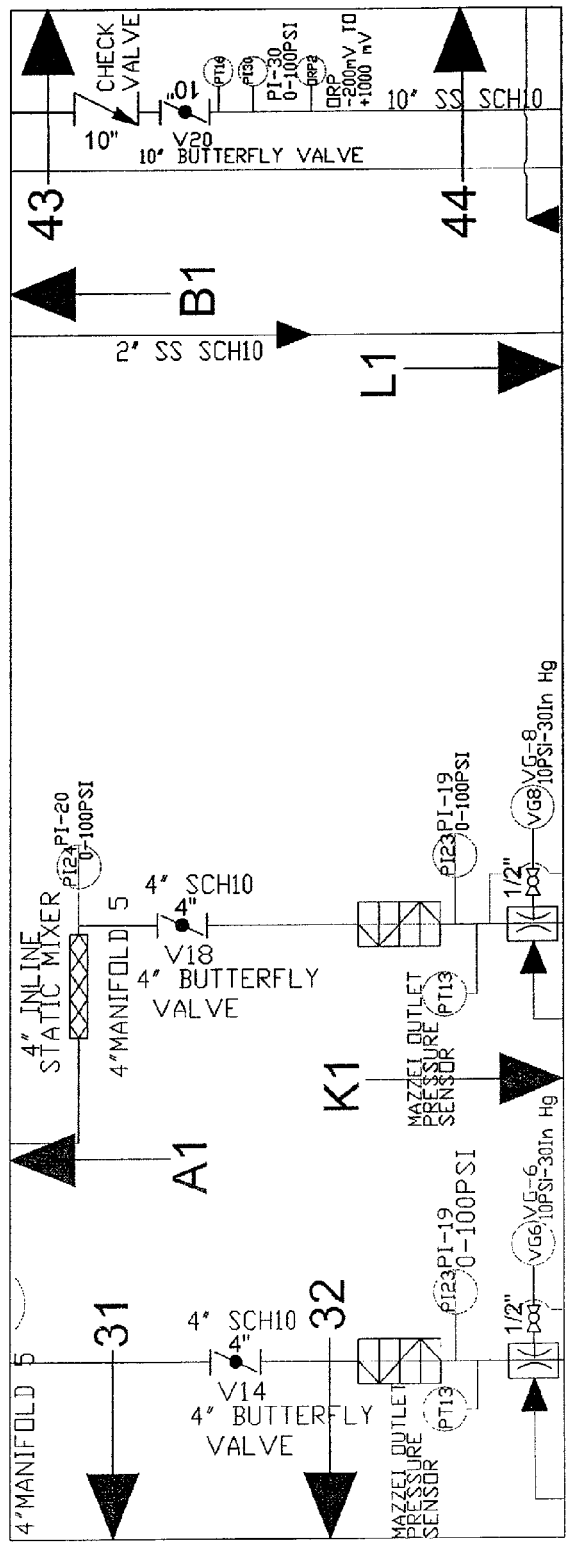
Figure 17T:
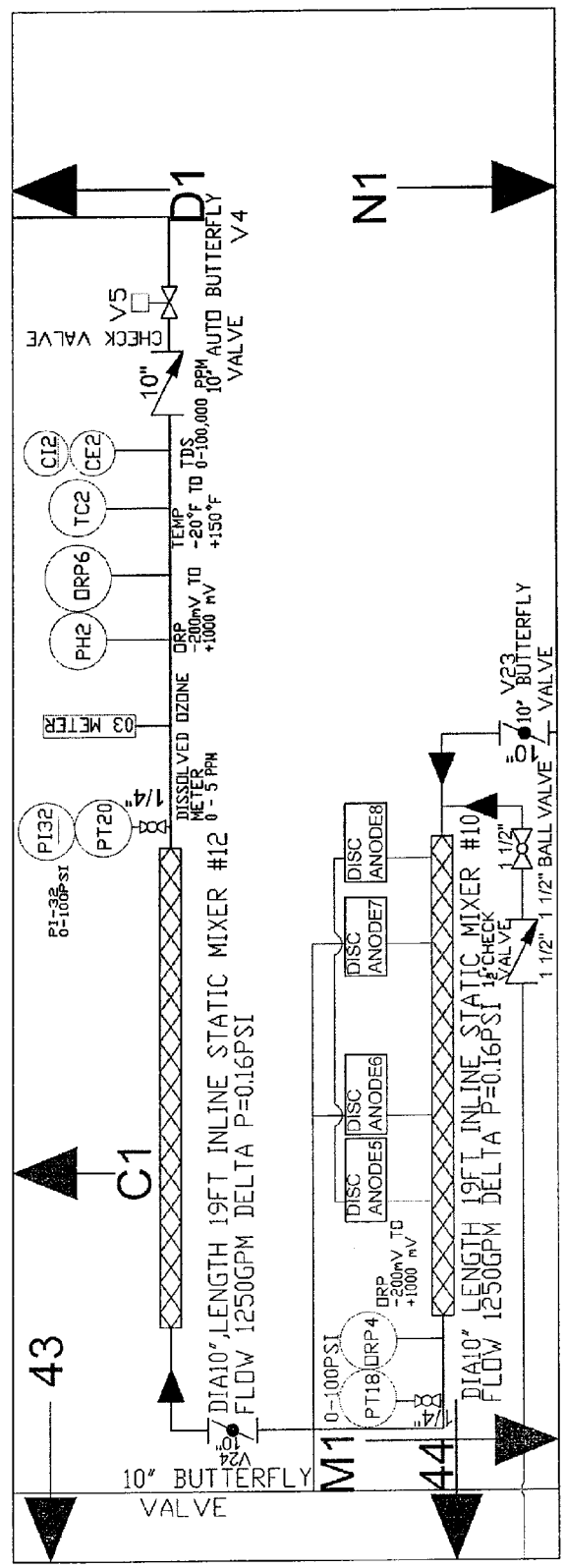
Figure 17U:
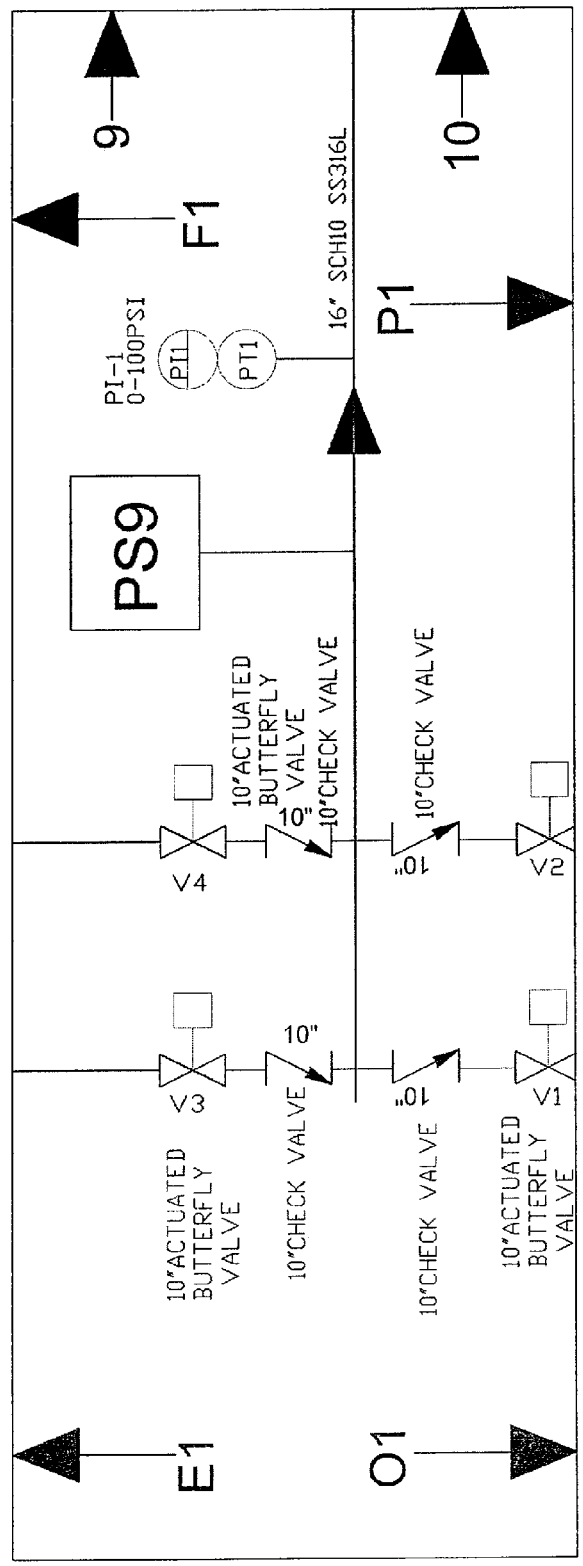
Figure 17V:
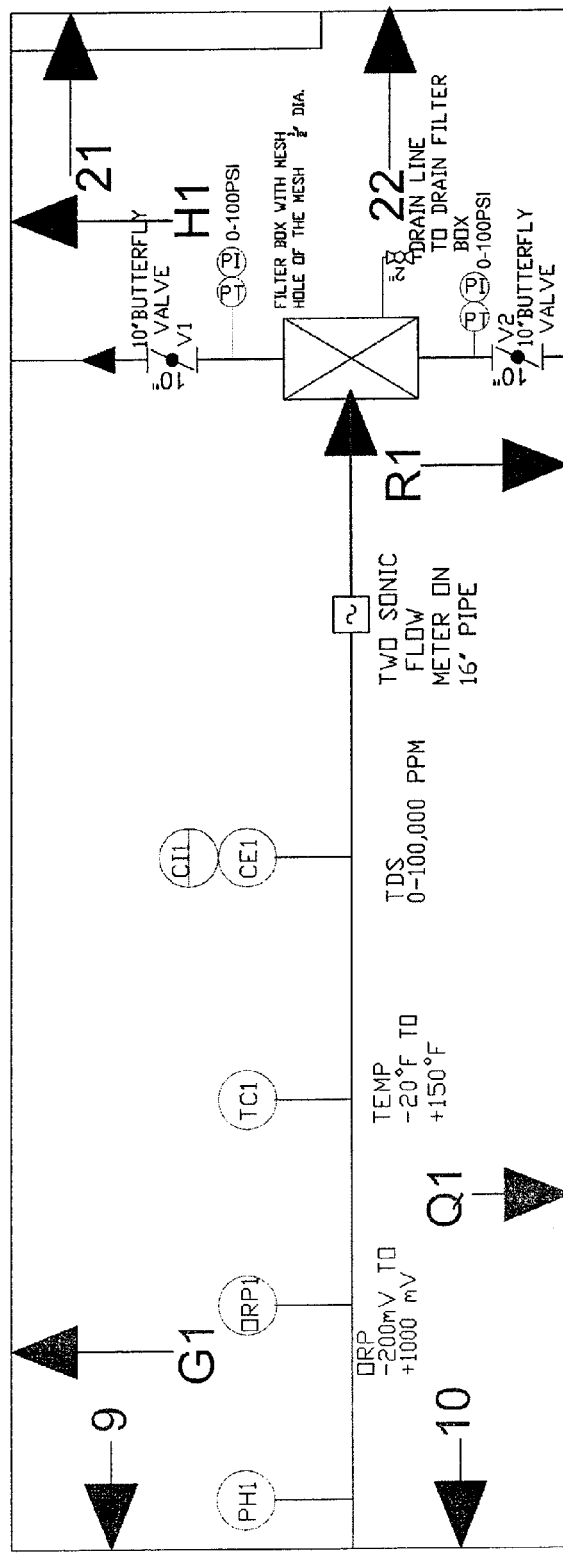
Figure 17W:
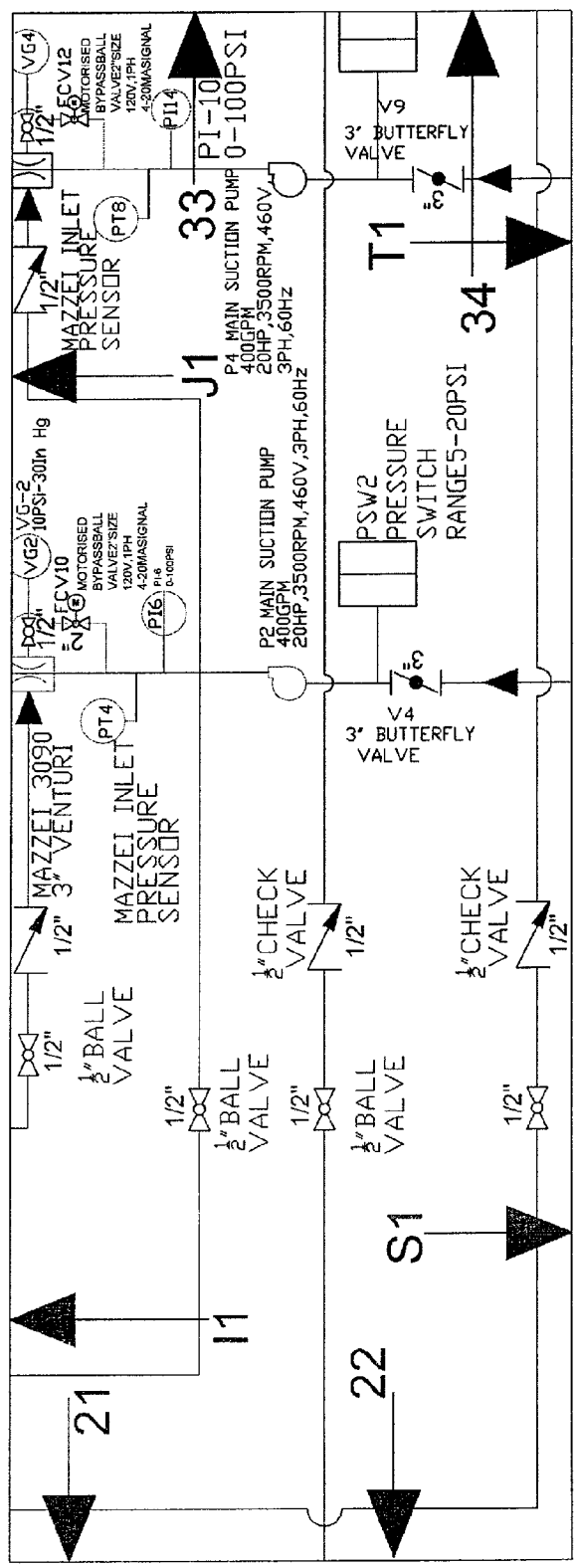
Figure 17X:
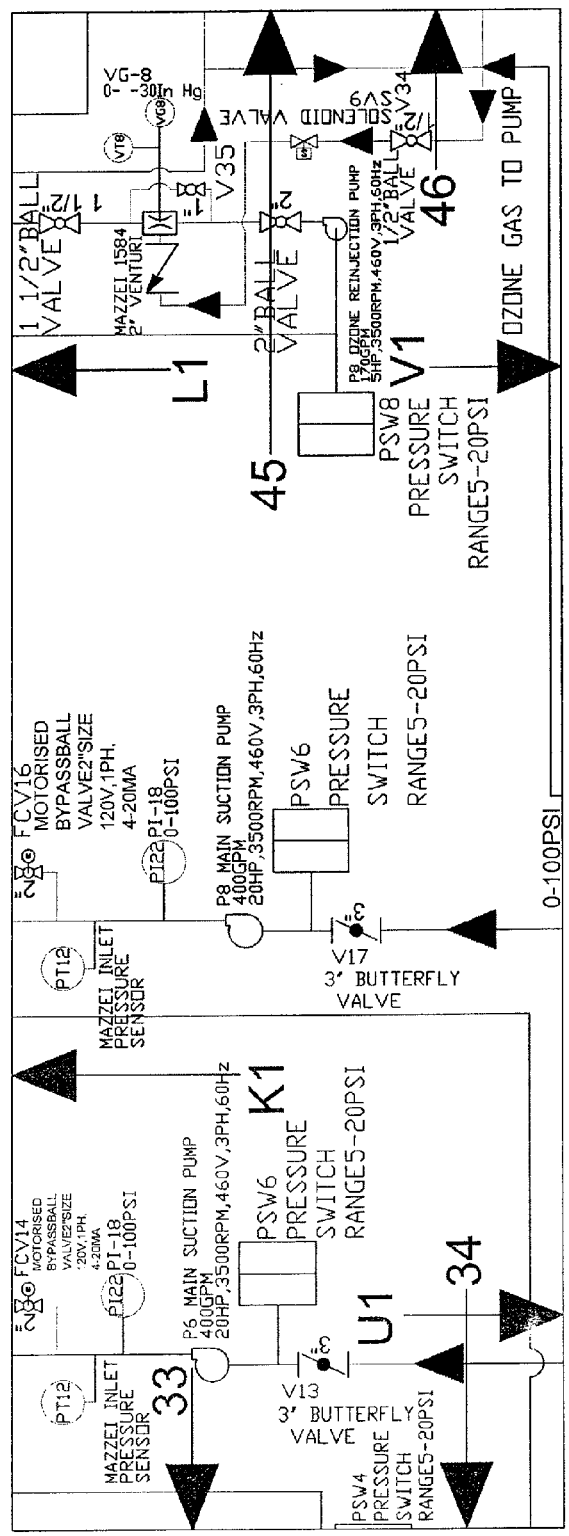
Figure 17Y:
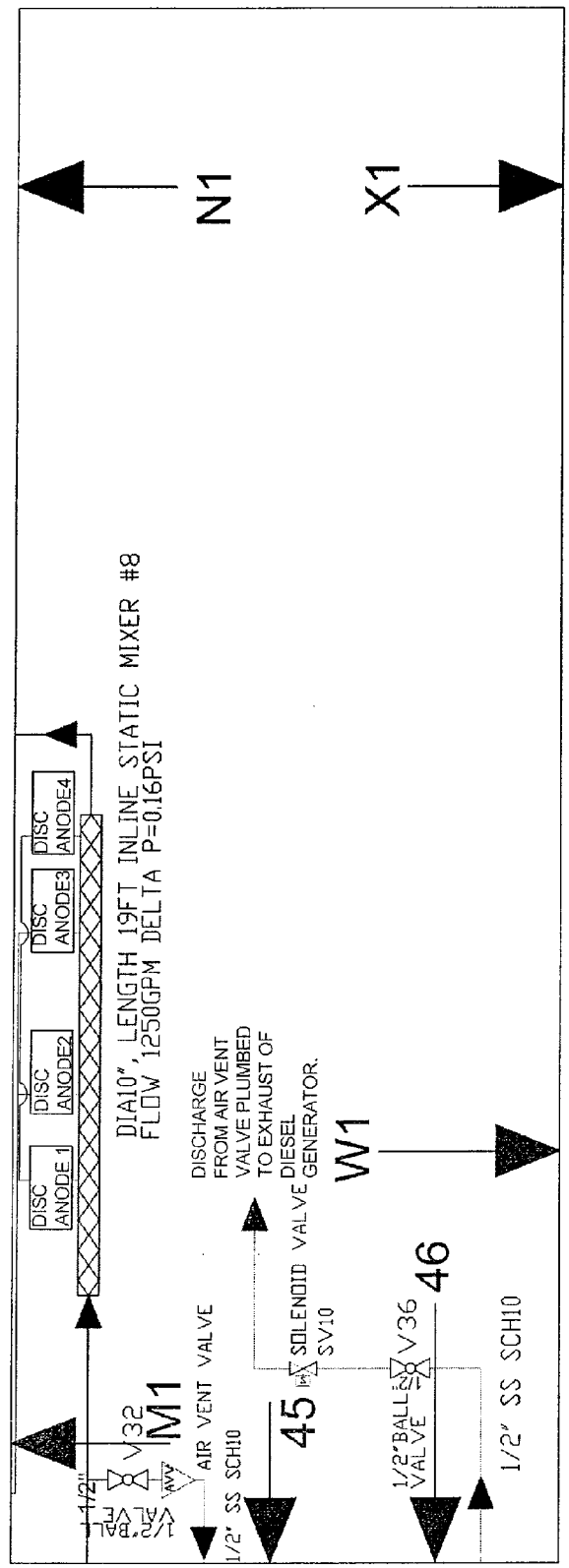
Figure 17Z:
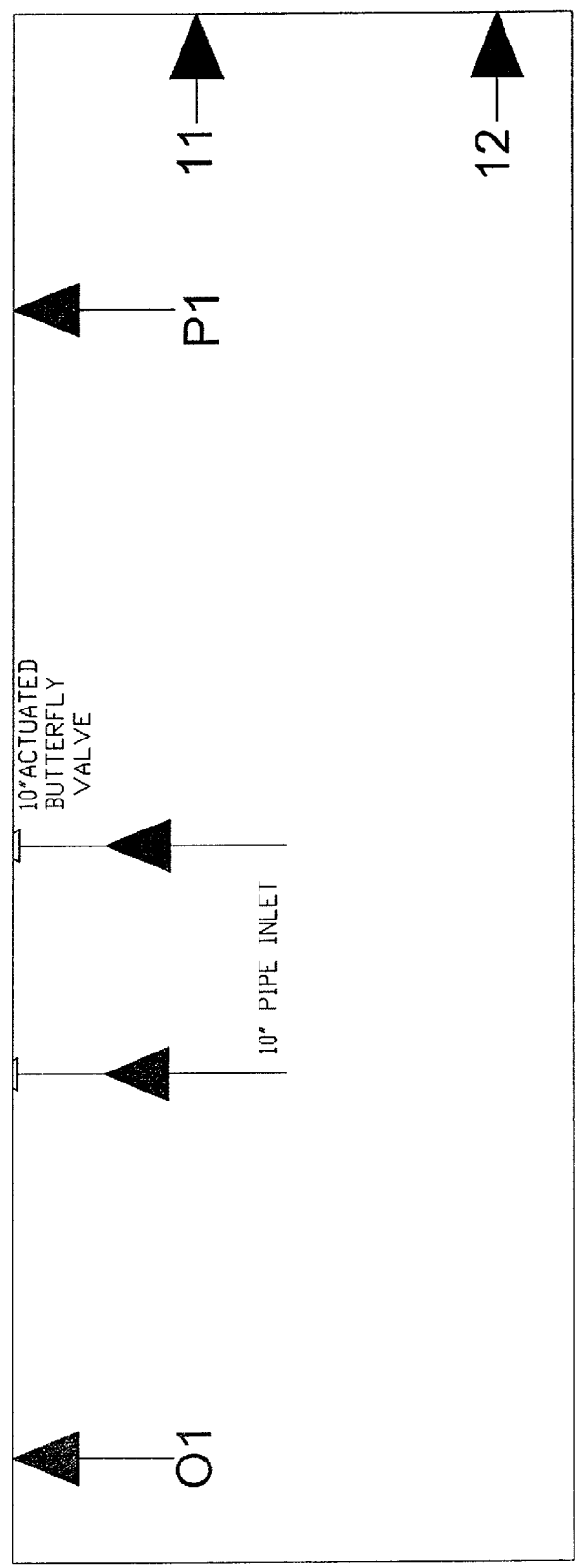
Figure 17A:
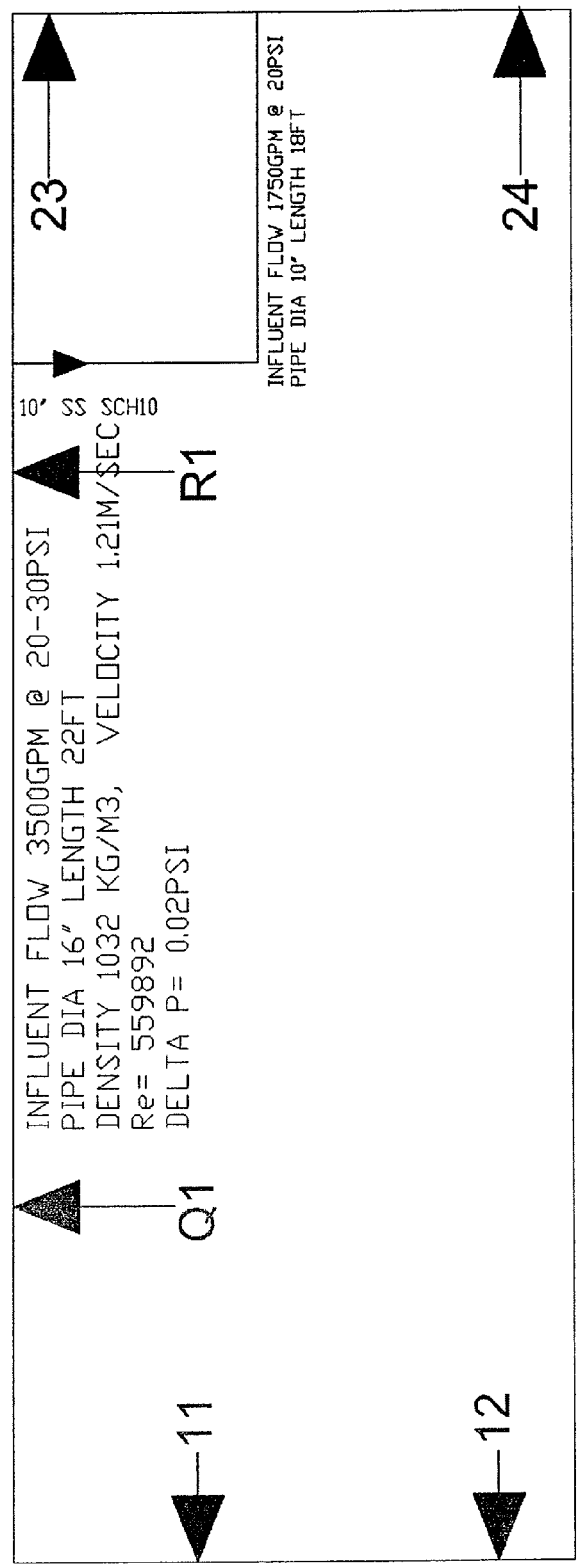
Figure 17B:
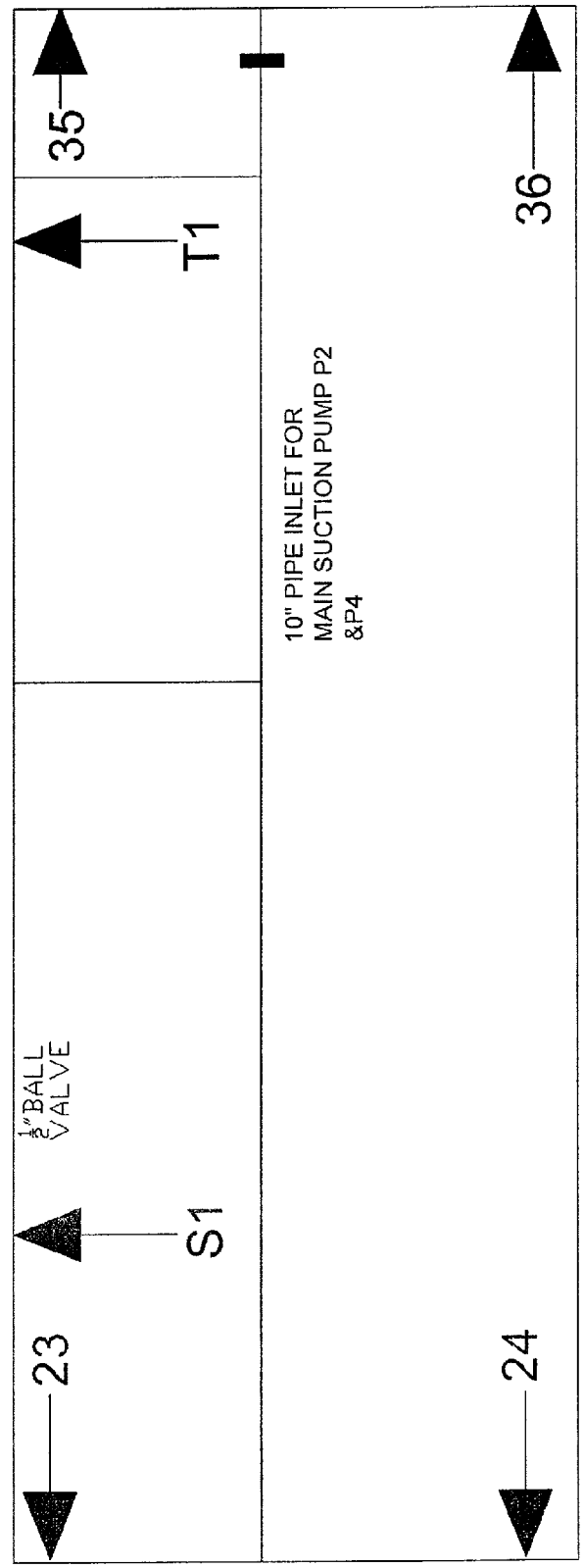
Figure 17C:
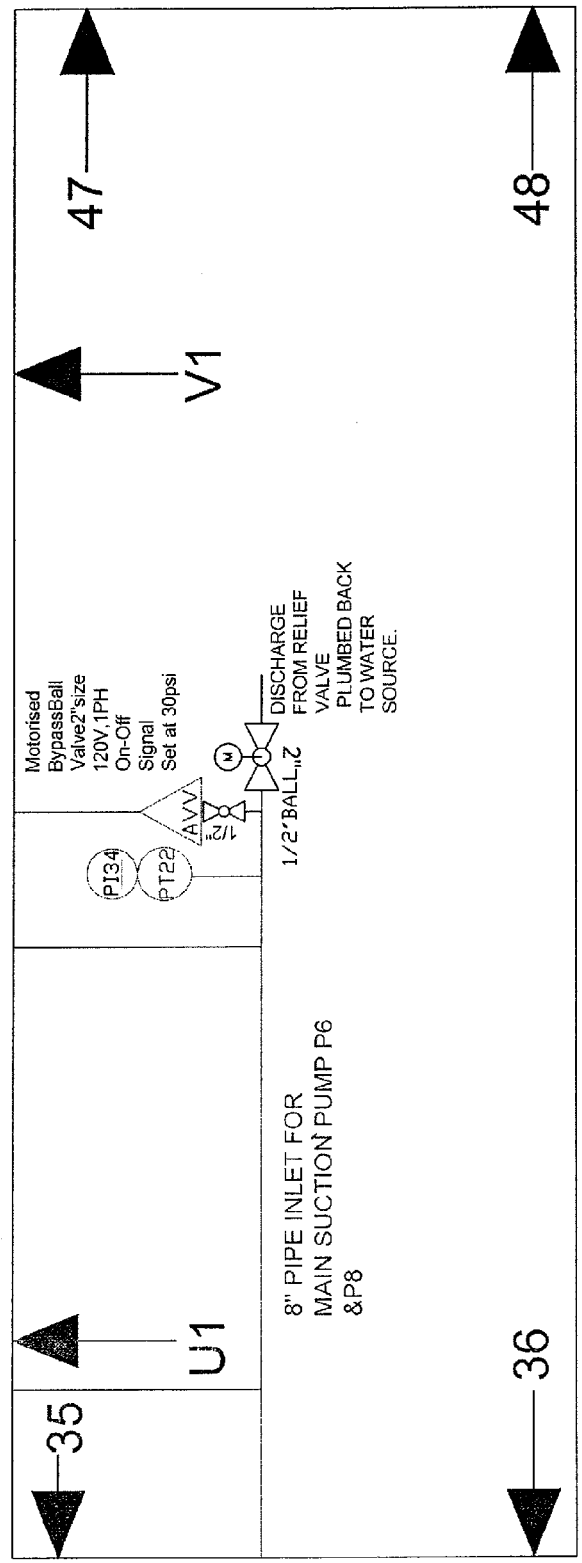
Figure 17D:
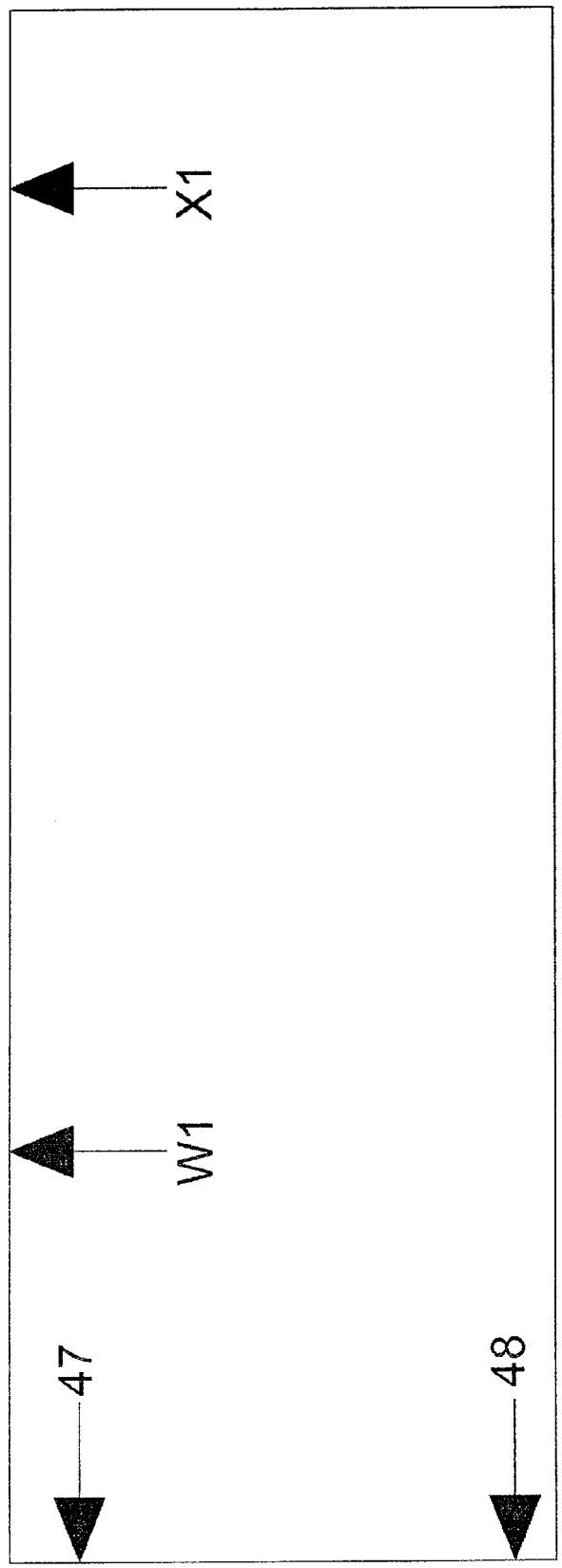

FIG. 16 is a complete P&ID (piping and instrument diagram) of the treatment system annotated with partition lines for FIGS. 17A through 17DD which are enlarged views to provide clarity. FIGS. 17A, 17B, 17C, 17D, 17E, 17F, 17G, 17H, 17I, 17J, 17K, 17L, 17M, 17N, 17O, 17P, 17Q, 17R, 17S, 17T, 17U, 17V, 17W, 17X, 17Y, 17Z, 17AA, 17BB, 17CC, and 17DD are the enlarged views of various sections of the treatment as partitioned in FIG. 16. FIG. 17D shows the ozone production and metering system for the treatment system including two air compressors 110, oxygen concentration modules 104, ozone generators 106 and metering valves 107. FIG. 17E shows the main reactor 1 and associated components. FIGS. 17C, 17F and 17L show first treatment conduits 20A and 20B, second treatment conduits 22A and 22B, and third treatment conduits 24A and 24B.

The apparatus can be place upon a floating vessel such as a boat, not shown. The floating vessel is constructed and arranged to provide a vessel having an intake positioned to pull water from around an algae bloom and a directional outlet for placement of treated fluid. The directional outlet assimilates a conventional fire boat having a water cannon used to battle fires. This mounting allows the vessel to target algae blooms wherein water drawn from around the bloom is treated and discharged by the water cannon. The discharged treated water is high ORP and still active wherein discharge onto the bloom further treating the bloom.

The mass transfer of ozone in the water is achieved by hydrodynamic and acoustic cavitations. In the pressurized reactor tank 1, water that has been ozonated is introduced into through eight separate discharge nozzles 80. Initially the water to be treated is pressurized by each of the eight pumps providing a treatment flow of over 3000 gallons per minute. Each of the pumps feeds an ozone injector 72. The ozonated fluid is then introduced into a flash reactor 76 which is used to reduce the size of the ozone bubbles to enhance the gas mass transfer efficiency. The ozonated fluid is then introduced into a hydrodynamic mixing manifold 78. The discharge nozzles 80 direct the flow against the inner wall of cylindrical housing 3 of the main reactor 1. The phenomenon of hydrodynamic cavitations is created as the pressurized water leaves the small orifices within the hydro dynamic mixing manifold 78. The dissolved ozone forms into micro bubbles which are mixed and reacted with the incoming water. As the water flows through the main reactor 1 the ultrasonic transducers located around the periphery of the main reactor emit ultrasonic waves in the range of 16 KHz and 20 KHz into the flow of water. The main reactor 1 also includes a plurality of anodes, 10 in number by way of example, located about the circumference of the main reactor 1. In addition, there are two groups of anode electrodes 10A and 10B that extend longitudinally into the main reactor 1 from the end plates 5 of the main reactor. Each group of the anode electrodes 10A and 10B consists of twelve rods approximately seven feet in length. The main reactor 1 also includes a pair of cylindrical cathode screens 12A and 12B that likewise extend longitudinally into the main reactor 1 from the end plates 5 to treat the fluid with the main reactor.

A sonoluminescence effect is observed due to acoustic cavitation as these ultrasonic waves propagate in the water and catch the micro bubbles in the valley of the wave. Sonoluminescence occurs whenever a sound wave of sufficient intensity induces a gaseous cavity within a liquid to quickly collapse. This cavity may take the form of a pre-existing bubble, or may be generated through hydrodynamic and acoustic cavitation. Sonoluminescence can be made to be stable, so that a single bubble will expand and collapse over and over again in a periodic fashion, emitting a burst of light each time it collapses. The frequencies of resonance depend on the shape and size of the container in which the bubble is contained. The light flashes from the bubbles are extremely short, between 35 and few hundred picoseconds long, with peak intensities of the order of 1-10 mW. The bubbles are very small when they emit light, about 1 micrometer in diameter depending on the ambient fluid, such as water, and the gas content of the bubble. Single bubble sonoluminescence pulses can have very stable periods and positions. In fact, the frequency of light flashes can be more stable than the rated frequency stability of the oscillator making the sound waves driving them. However, the stability analysis of the bubble shows that the bubble itself undergoes significant geometric instabilities, due to, for example, the Bjerknes forces and the Rayleigh-Taylor instabilities. The wavelength of emitted light is very short; the spectrum can reach into the ultraviolet. Light of shorter wavelength has higher energy, and the measured spectrum of emitted light seems to indicate a temperature in the bubble of at least 20,000 Kelvin, up to a possible temperature in excess of one mega Kelvin. The veracity of these estimates is hindered by the fact that water, for example, absorbs nearly all wavelengths below 200 nm. This has led to differing estimates on the temperature in the bubble, since they are extrapolated from the emission spectra taken during collapse, or estimated using a modified Rayleigh-Plesset equation. During bubble collapse, the inertia of the surrounding water causes high speed and high pressure, reaching around 10,000 K in the interior of the bubble, causing ionization of a small fraction of the noble gas present. The amount ionized is small enough fir the bubble to remain transparent, allowing volume emission; surface emission would produce more intense light of longer duration, dependent on wavelength, contradicting experimental results. Electrons from ionized atoms interact mainly with neutral atoms causing thermal bremsstrahlung radiation. As the ultrasonic waves hit a low energy trough, the pressure drops, allowing electrons to recombine with atoms, and light emission to cease due to this lack of free electrons. This makes for a 160 picosecond light pulse for argon, as even a small drop in temperature causes a large drop in ionization, due to the large ionization energy relative to the photon energy.

The main reactor 1 is a tubular reactor with 18 transducers attached to the wall of the reactor. The use of multiple transducers on the wall of the reactor gives a uniform cavitational activity distribution throughout the reactor and hence is expected to enhance the extent of degradation/disinfection in the reactor. The combined operation of ozone and ultrasonic irradiations also means that in addition to direct attack by ozone, hydroxyl radicals formed in the system attack the contaminants present in the effluent yielding more efficacy for the treatment of effluent streams. The release of free radicals due to the presence of ozone along with ultrasonic irradiation is a two-step process (Hart and Henglein, 1985, 1986), taking place in the cavitating bubble due to conditions of very high temperatures and can be represented as follows:

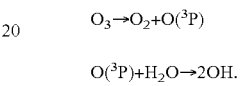

$$O(^3P)+H_2O \rightarrow 2OH.$$

The reaction products migrate to the interfacial sheath of the bubble where they subsequently react in the aqueous phase. Credence to the production of hydroxyl radicals from dissociation of ozone in the presence of ultrasound can be given based on the literature illustrations. Olson and Barbier (1994) have shown that the ozone degradation rate was significantly enhanced by the application of ultrasound and the rate constant for the degradation increased with an increase in the power dissipation. Hart and Henglein (1986) have also reported that the disappearance of ozone was rapid in the presence of ultrasound; ozone concentration decreased from an initial value of 620 µM to 40 µM in total irradiation time of 3 minutes (approximately at an average reaction rate of 0.2 mM/min).

Due to the cavitating action in the main reactor (ultrasound induced cavitation) and also in the upstream sections (hydrodynamic cavitation induced by the presence of orifice holes in the static mixing vanes), it is possible that hydrogen peroxide is formed in situ in the reaction which can also react with ozone. The presence of hydrogen peroxide simultaneously may also further enhance the contribution of ozone in the overall generation of free radicals by following mechanism

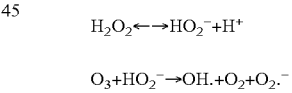

$$O_3+HO_2^- \rightarrow OH.+O_2+O_2.^-$$

The turbulence created by the acoustic streaming induced by ultrasound is bound to eliminate the mass transfer limitations. Due to this fact and production of two free radicals per molecule of ozone consumed, even for compounds that react fairly quickly with ozone, the rate of degradation will be enhanced in the combined operation of ozone and sonication. Further the absorption of ozone in the solution and hence its utilization will also be enhanced due to the elimination of mass transfer resistance by the action of ultrasound. In addition to the provision of ultrasonic action, the system is also enabled to have electrochemical oxidation. Electrochemical oxidation offers a promising way to eliminate non-biodegradable and/or toxic organic pollutants and ammonia/nitrogen contained in the effluent. Also microorganisms can be inactivated electrochemically directly or via the generation of "killer" agents such as hydroxyl radicals.

Multiple anodes and cathodes are installed with a possibility of temperature variation so as to give intensified effects. If the contaminants are present in substantially low concentrations (such as in the region of few µg/L), the achievement of high mass transfer rates in the electrochemical cell is of paramount importance and is usually one of the main issues that needs to be tackled before electrochemical oxidation can be applied successfully in this field. The combination approach of the current design is very important in these cases. The turbulence generated due to the acoustic cavitation events produced due to ultrasonic irradiations helps in eliminating the mass transfer resistances associated with electrochemical oxidation. Also the presence of electrochemical oxidation also enhances the oxidation capacity of the system due to the reactions of ozone leading to the production of the additional oxidizing species.

Eighteen such ultrasonic transducers are installed on the main reactor 1. Each transducer is rated for 500 W capacity. It is also equipped with heated plate cathode of 1000 W. At given flow rate it maintains ΔT of 40 Deg. to enhance the precipitation. Ten disc anodes 4A through 4J (as shown in FIG. 1-3) are also installed on the main reactor 1 each having a surface area of 50.26 sq. in. The current density for these set of disc anodes are 1.5 Amp/sq.in. There are total 16 disc anodes on four 10" static mixers with current density of 1.875 A/sq.in. Also there are 24 rod anodes with each surface area of 197.92 sq. in. with current density of 0.6315 A/sq.in.

FIG. 3 shows the representation of two mono-polar cathode screens 12A and 12B, 8 ft long installed in the core of the reactor 1 aiding efficient migration of electrons. Being negatively charged it allows to precipitated crystals to adhere to the wall.

FIGS. 3 and 4, give a complete view of the reactor with ultrasonic transducers attached at the wall and the electrochemical oxidation components i.e. the multiple sets of cathodes and anodes for reaction as well as for separation.

Figure 13:
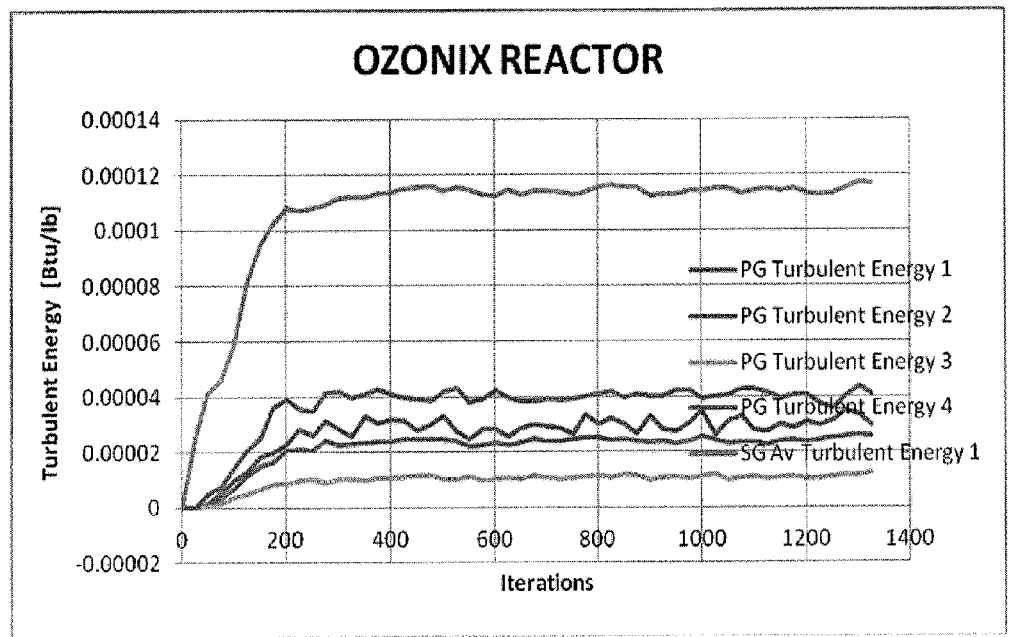
FIG. 13 shows the turbulent energy pattern in the flow wherein the variation in the turbulent energy indicates the high turbulence in the reactor.

FIG. 13 shows the turbulent energy pattern in the flow. The variation in the turbulent energy indicates the high turbulence in the reactor.

Figure 14:
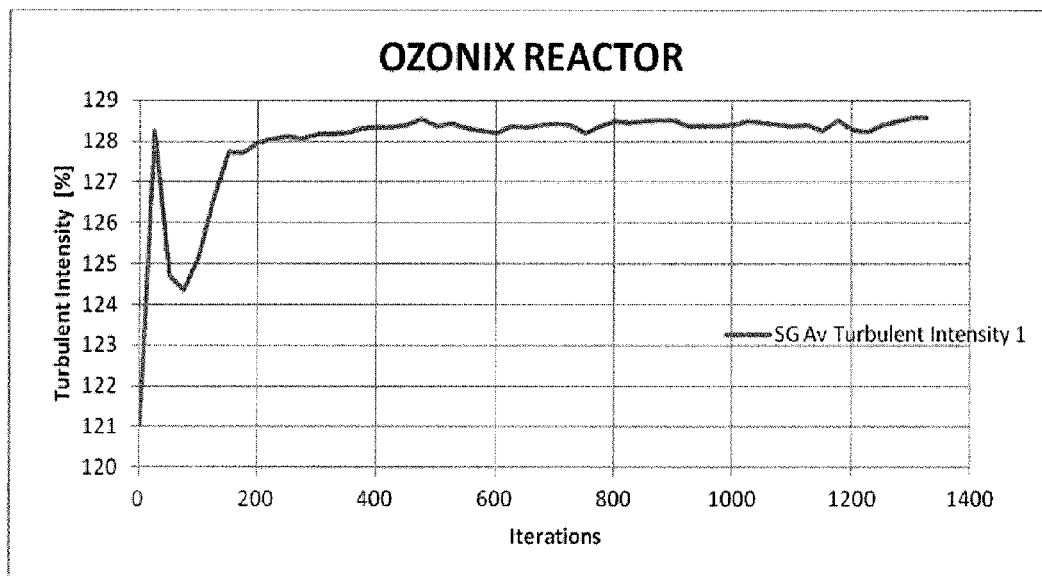
FIG. 14 shows the percentage changes in turbulence intensity in the flow wherein the variation above five percent and above is considered high turbulence.

FIG. 14 shows the % changes in turbulent intensity in the flow. The variation above 5% and above is considered high turbulence and FIG. 20 shows the turbulent dissipation.

Figure 15:
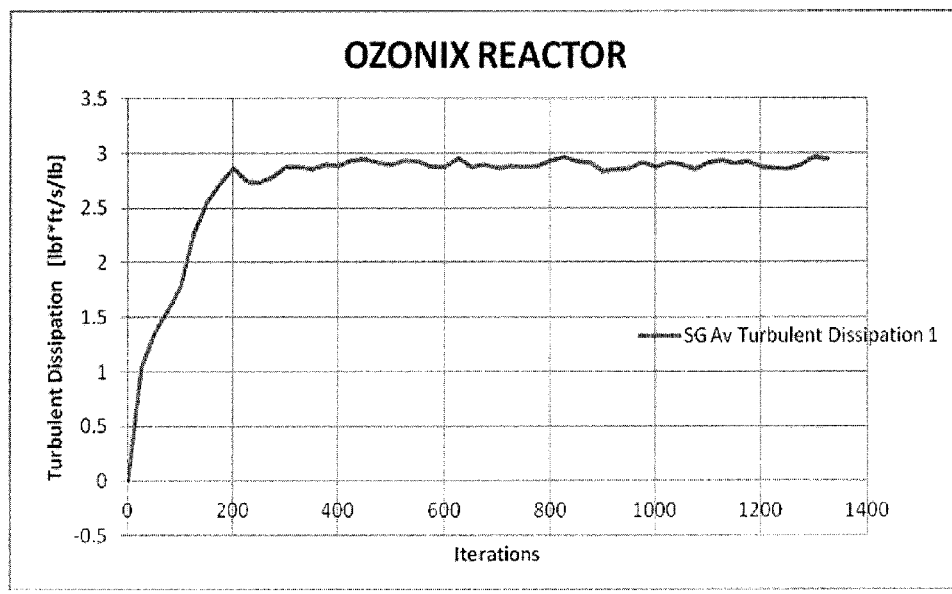
FIG. 15 shows the turbulent dissipation.

FIG. 15 shows the turbulent dissipation.

Olson and Barbier (1994) studied the efficacy of "Sonozone" process in a 450 ml glass water-jacketed reactor irradiated with Braun model 2000 U ultrasonic generator with variable power input in the range 0-330 W. The initial organic carbon concentration in the fulvic acid solution (model pollutant used in the study) was 10 mg/lit and the net ozone sparging rate was maintained at 3.2 mg/min (Ozone is present as 2.1% $O_3/O_2$ mixture). Ultrasound alone was reported to be ineffective in the color removal, but combination of ultrasound (83 W power dissipation) with ozone resulted in 60% degradation of natural organic matter in about 2 minutes time. The total organic carbon removal was also increased from about 35% for ozone alone, mere 2% for ultrasound alone, to more than 95% for the combination technique in one hour of treatment time.

Joyce et al. (2003) investigated the effect of electrolysis and power ultrasound as a disinfection treatment for *Klebsiella pneumonia*. Individual operation of sonication resulted in about 40% disinfection in 60 min of treatment whereas individual electrolysis operation at 150 mA supplied current resulted in complete disinfection in only 15 min of treatment. Among the different types of electrodes investigated, it has been shown that carbon felt is a suitable material for the anode in that it provides efficient kill and does not appear to suffer from surface pitting or erosion. A combination of ultrasound and electrolysis reduced the current requirement from 150 mA to 100 mA and also the treatment time to less than 10 min for total disinfection (only 2 minutes were required for the optimum electrode material as carbon felt). The beneficial effects for the combination technique can be attributed to enhanced mixing of bacterial suspensions in the vicinity of the electrode surface where the hypochlorite is being generated. The mechanical action of cavitation on the bacterial cells can render them more susceptible to attack by hypochlorite either through direct damage or a weakening of the cell wall. The cleaning action of ultrasound on the electrode surface also prevents the build up of fouling and thus maintains more efficient electrolysis. Kraft et al. (2002) have confirmed the role of ultrasound in continuous cleaning of the cathode surface.

Overall, it can be said use of cavitation in combination with conventional ozone treatment is far more suitable as compared to individual ozone treatment. It not only results in substantially lower treatment times but also reduces the requirement of the ozone under optimized conditions. To give a quantitative idea, Dahi and Lund (1980) have reported that inactivation of 3 and 4 decades is obtained, at 10-95% lower ozone concentrations, and by 57-96% lower gaseous ozone dosage by the sonozonation process as compared to ozonation alone in similar treatment times. Dahi (1976) also reported that ultrasonic treatment of effluent from biological sewage plant resulted in a reduction in the required sterilization dose of ozone by 50%.

Acoustic cavitation is as a result of the passage of ultrasound through the medium, while hydrodynamic cavitation occurs as the result of the velocity variation in the flow due to the changing geometry of the path of fluid flow. In spite of this difference in the mechanisms of generation of two types of cavitation, bubble dynamics shows similar trends indicating that similar effects in terms of high temperature/pressure pulse and intense turbulence will also be generated in the case of hydrodynamic cavitation. The two main aspects of bubble behavior in cavitation phenomena are:

1) The amplitude of oscillation of cavity/bubble radius, which is reflected in the magnitude of the resultant pressure pulses of the cavity collapse and 2) The lifetime of the bubble, which is reflected in the distance traveled and hence the extension of the zone of cavitational influence from point of its inception.

The important design parameters in the case of hydrodynamic cavitation are the recovery pressure, time of recovery and its magnitude and these parameters provide operational ability, to the design engineers to control the bubble dynamics and hence the cavitational intensity in the reactor, just similar to that provided by the frequency and intensity of irradiation in the case of acoustic cavitation reactors. Theoretical investigations have revealed that the increase in the frequency of irradiation and reduction in the time of the pressure recovery result in an increment in the lifetime of the cavity, whereas amplitude of cavity oscillations increases with an increase in the intensity of ultrasonic irradiation and the recovery pressure and the rate of pressure recovery. Thus, it can be said that the intensity of ultrasound in the case of acoustic cavitation and the recovery pressure in the case of hydrodynamic cavitation are analogous to each other. Similarly, the frequency of the ultrasound and the time or rate of pressure recovery, are analogous to each other. Thus, it is clear that hydrodynamic cavitation can also be used for carrying out so called sonochemical transformations and the desired/sufficient cavitation intensities can be obtained using proper geometric and operating conditions.

In hydrodynamic cavitation reactors, cavitation is produced at the fluid shear layer. The liquid vaporized at vena contracta downstream of the orifice/hole is proportional to the area or annual volume occupied by this shear layer. This fact enables a designer to control bubble population in the flow. Bubble behavior similar to acoustic cavitation can be obtained in the hydrodynamic cavitation reactor by simple modifications in the orifice design and subsequent pressure recovery. If multiple orifices are installed one after the other in the chamber, then the bubbles that are generated experience a highly fluctuating pressure field and collapse is more violent giving rise to higher temperatures and pressure pulses, of magnitudes comparable to those under acoustic cavitation. It is also possible that the cavities generated at the upstream of the orifice or their fragments can act as nuclei for orifices downstream of the first orifice.

In the present case, cavitation has been generated with the help of static mixing elements which have small orifice or holes which can generate hydrodynamic cavitation in the system. Static mixers are a series of geometric mixing elements fixed within a pipe (tube) with multiple orifices, which uses the energy of the flow stream to create mixing between two or more fluids/gases types. The optimized design of static mixers achieves the greatest amount of mixing with the lowest pressure loss possible. The multiple holes in the static mixers acts as a localize orifices, dropping the pressure of the fluid locally allowing the formation of cavitation bubbles. As these cavitation bubbles are carried away with the flow, these bubbles collapses or implodes in the zone of higher pressure. The collapse of these cavitation bubbles at multiple locations produces localized high energy conditions such as shear, high pressure, heat, light, mechanical vibration etc. These localized high energy conditions results in the formation of highly reactive free radicals facilitating the breakdown of the organic substances and can also result in the disinfection of microorganisms present in the effluent stream.

The following analysis is done on various pipe sections of the apparatus to gauge the generation and dissipation of turbulence energy which indirectly indicated the production of hydroxyl radicals. The analysis also indicates the extent of mixing and turbulence achieved in the static mixers which is very important in deciding the efficacy of the ozone induced degradation as it is usually controlled by the gas-liquid mass transfer resistance. Also the hydrogen peroxide generated in situ in the system due to the hydrodynamic cavitating conditions, would also benefit the overall treatment scheme by way of enhanced oxidation capacity.

Figure 21:
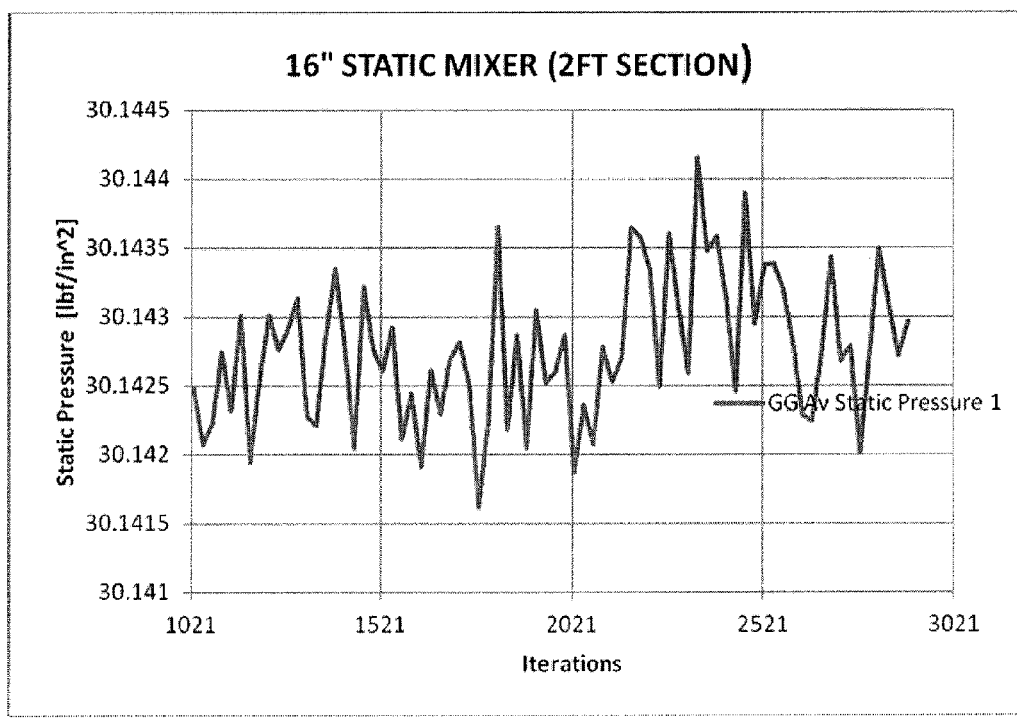
FIG. 21 shows the variation in the static pressure.

FIG. 21 shows the variation in the static pressure.

Figure 22:
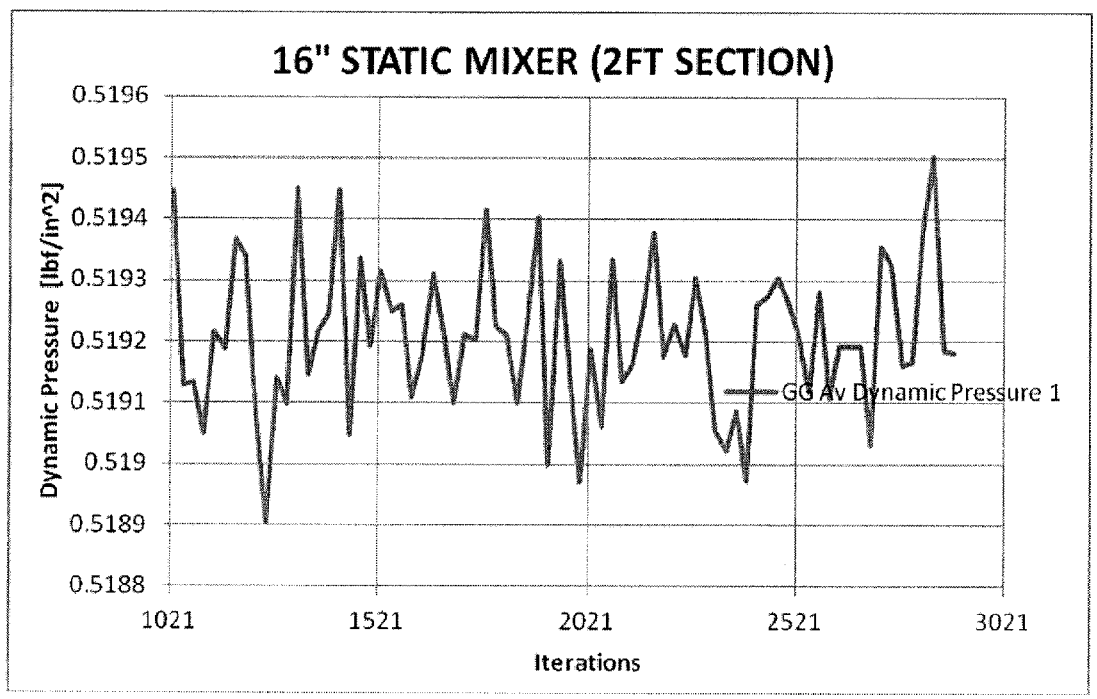
FIG. 22 shows the fluctuation in dynamic head pressure in the sixteen inch static mixer.

FIG. 22 shows the fluctuation in dynamic head pressure in 16" static mixer. These fluctuations are typically indication of the extent of turbulence in the flow and these variations in the dynamic pressure drive the different stages of cavity growth and intense collapse.

Figure 23:
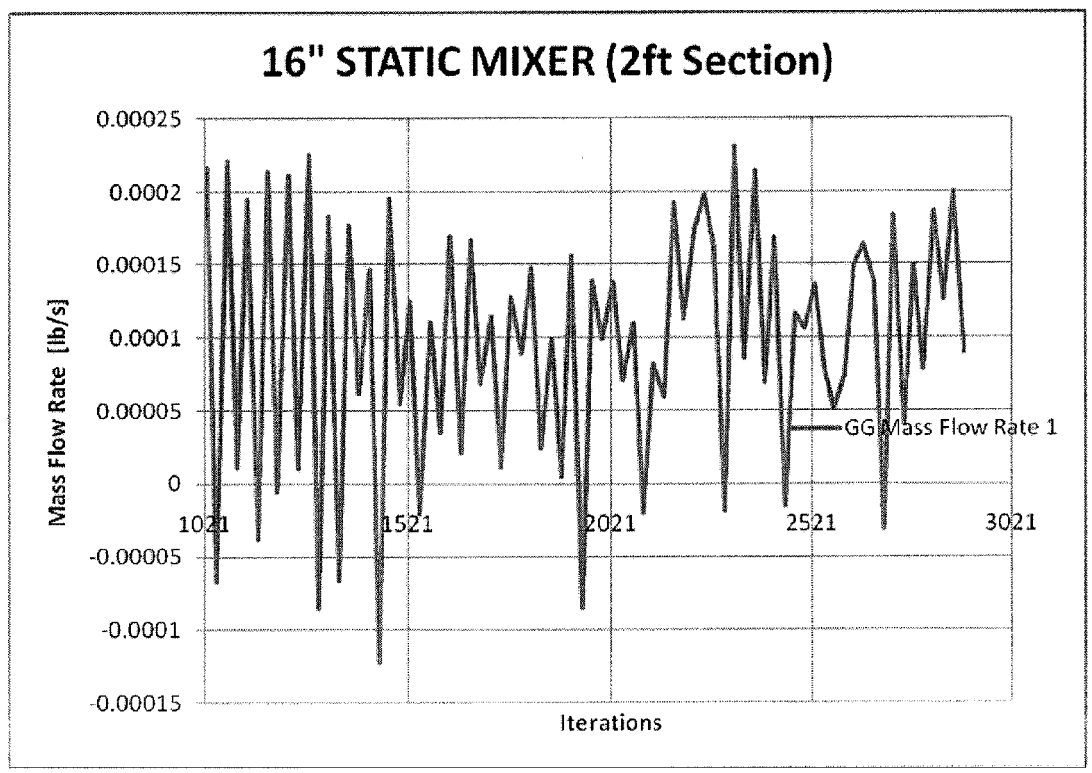
FIG. 23 shows the variation in the mass flow rate.

FIG. 23 shows the variation in the mass flow rate.

Figure 24A:
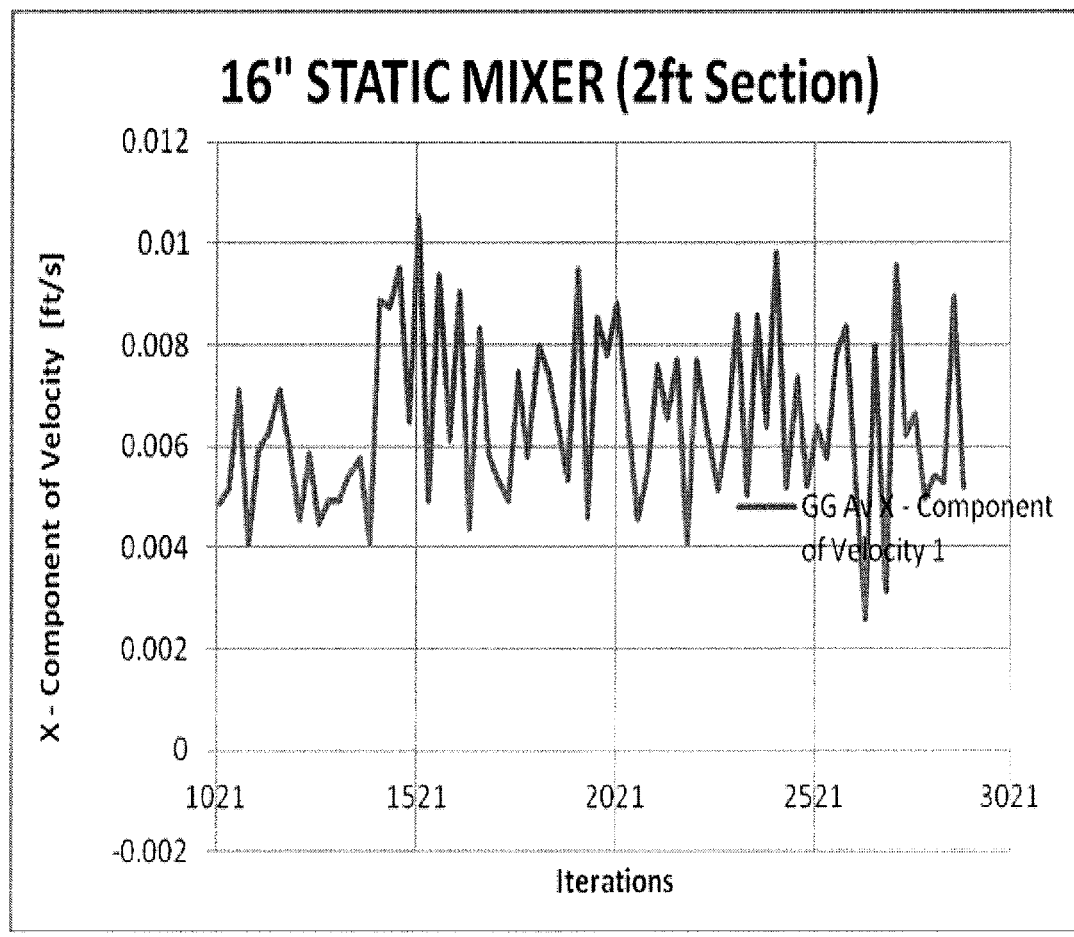
FIGS. 24A, 24B and 24C are numerical simulations of the velocity fluctuations in the X, Y and Z directions respectively.
Figure 24B:
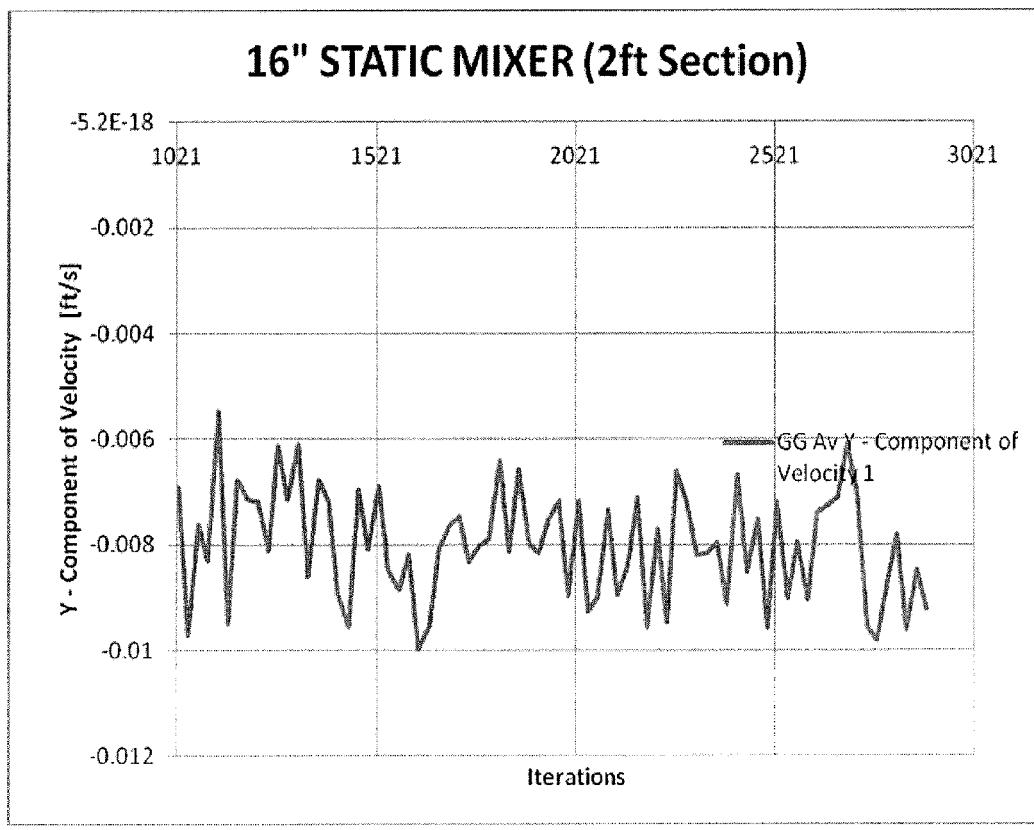
Figure 24C:
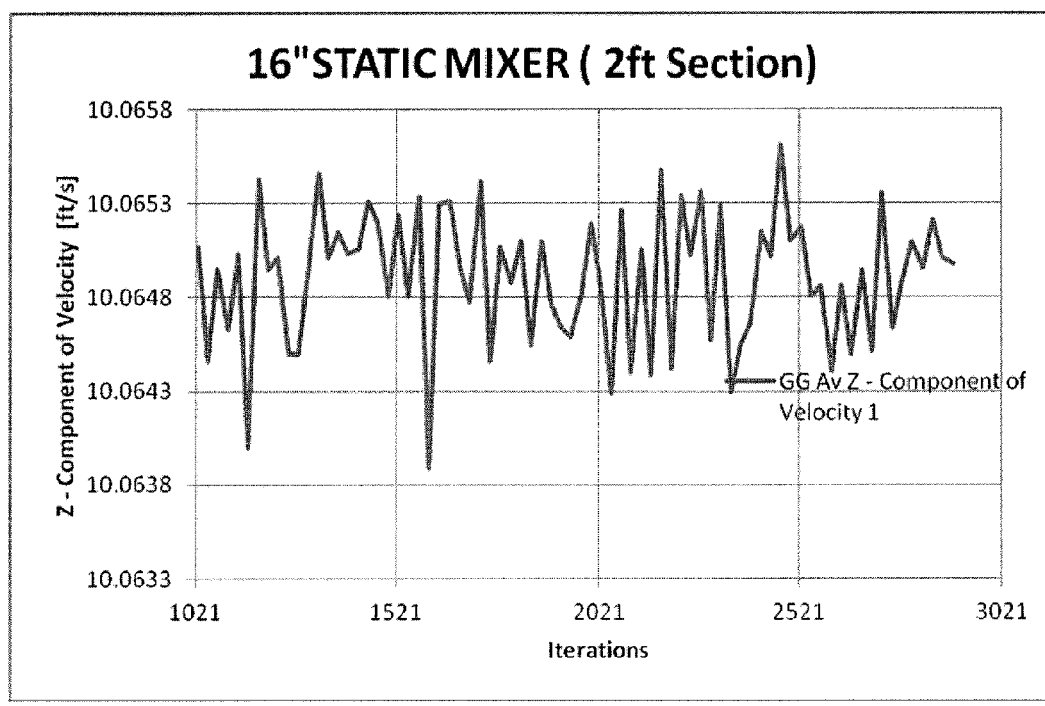

The numerical simulations also revealed that the velocity fluctuations are obtained in all the directions (X, Y and Z) of the pipe flow as indicated in following FIGS. 24A, 24B and 24C. The variation in the flow velocities are caused by eddies formed at the multiple orifices on the static mixer vanes.

Figure 25:
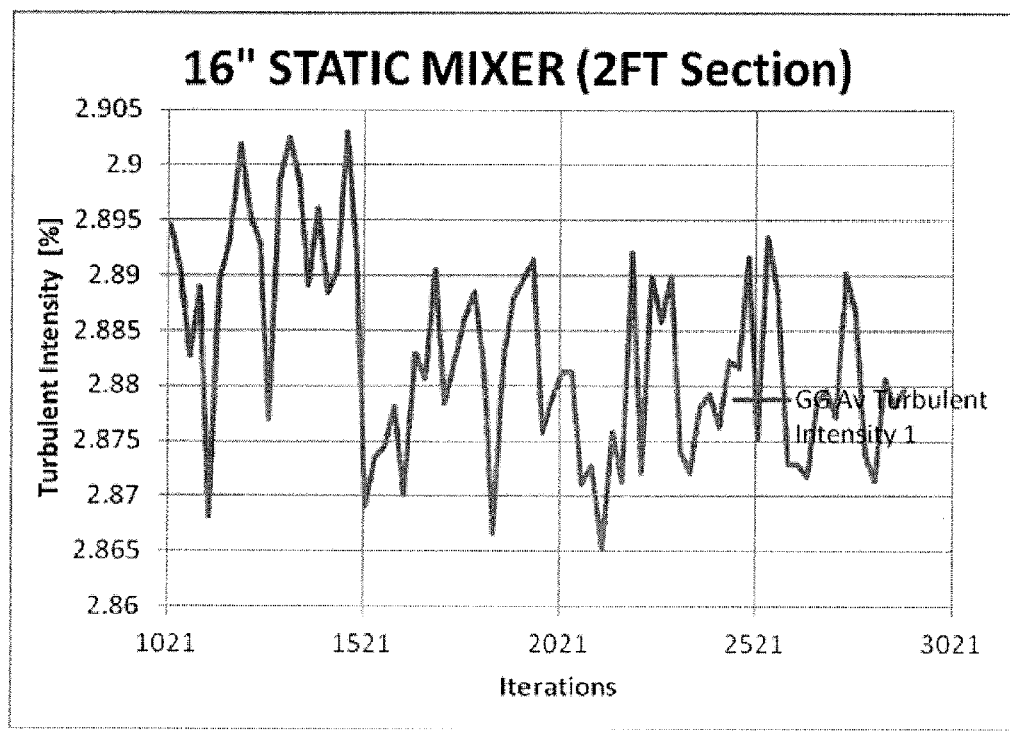
FIG. 25 is a graphical representation of the turbulent intensity of the flow within the sixteen inch static mixer.
Figure 26:
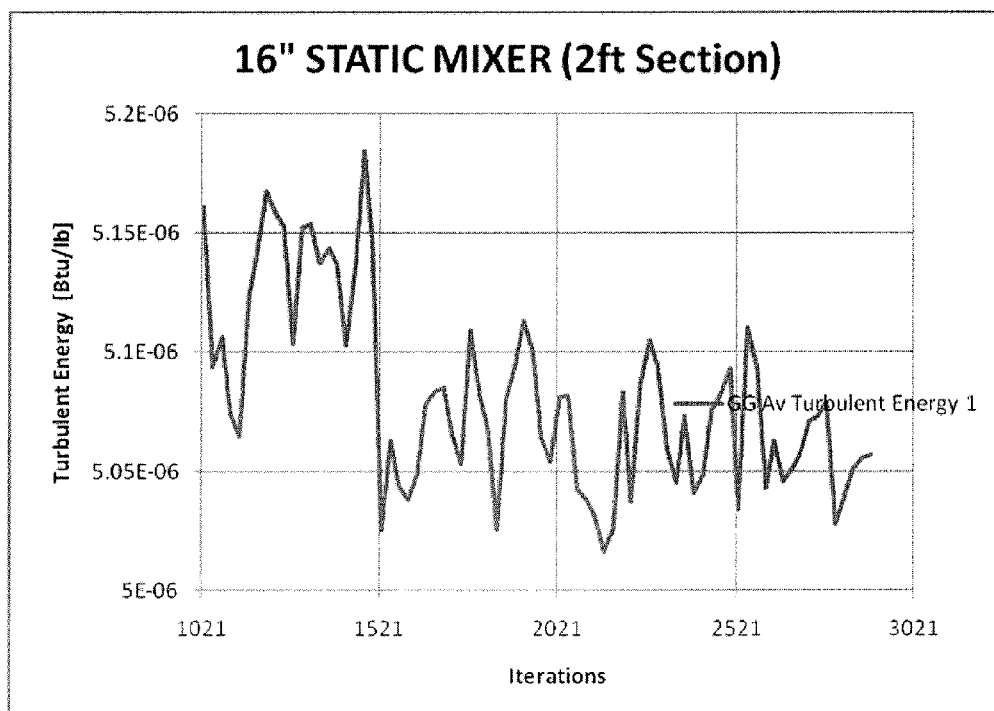
FIG. 26 is a graphical representation of the turbulent energy within the sixteen inch static mixer.
Figure 27:
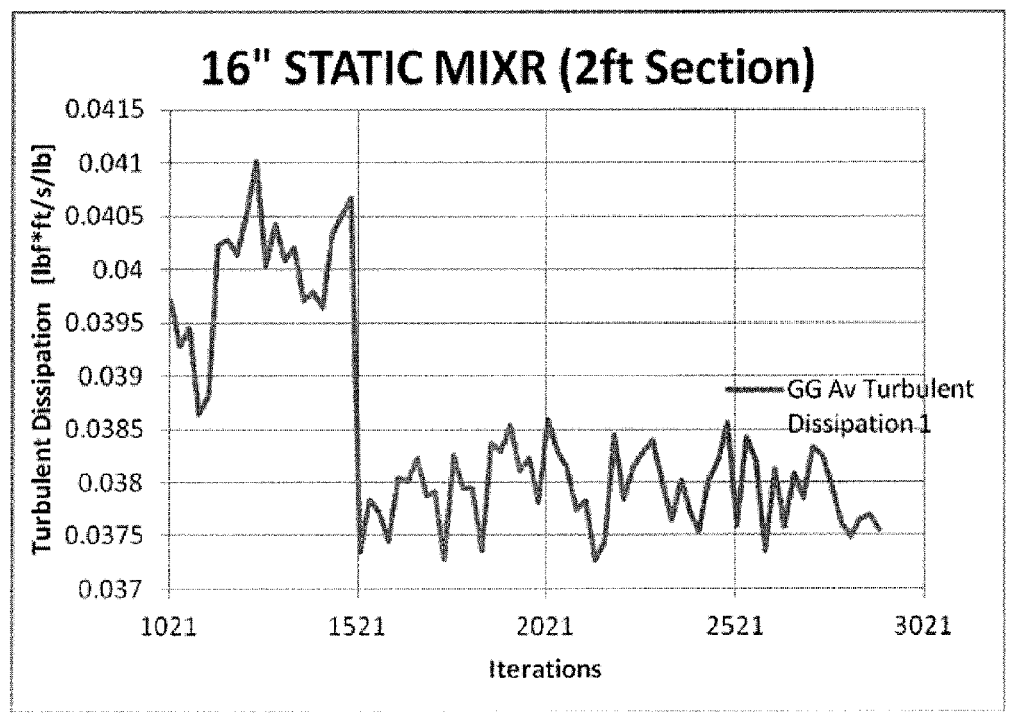
FIG. 27 is a graphical representation of the turbulent dissipation within the sixteen inch static mixer.

Following FIGS. 25 through 27) indicates the variations in the turbulent energy dissipation patterns indicating the generation of cavitation events and subsequent effects of enhanced turbulence and mixing facilitating the ozone-effluent contact and mass transfer.

It is very important to note here that the static mixing elements are present upstream of the main reactor so that the possible hydrodynamic cavitation is occurring earlier to the acoustic cavitation to be induced using the ultrasound irradiations. The cavities generated using hydrodynamic cavitation elements can travel into the influence of the ultrasonic irradiations and collapse more intensely giving beneficial effects for the combination approach.

It might be worthwhile to review some literature illustrations also depicting the use of combination of acoustic cavitation and hydrodynamic cavitation. Jyoti and Pandit (2003) reported the combination of acoustic and hydrodynamic cavitation along with some studies based on the combination of cavitation and ozone. It has been observed that the percentage disinfection obtained for this hybrid process was much higher than that obtained for the individual techniques for all the microorganisms investigated in the work. It has been also established that hydrodynamic cavitation is energy efficient in cavitation generation whereas acoustic cavitation results in a more violent collapse of cavities and the combination of the two processes (hydrodynamic and acoustic cavitation) has been shown to be beneficial for the rate enhancement of microbial disinfection. It has been also reported that the rate constants obtained for the combination of hydrodynamic cavitation and ozone was more than additive in the case of all the microorganisms, indicating the similarity of cavitating action generated acoustically or hydrodynamically. The observed intensification in the combination of hydrodynamic cavitation and ozone or acoustic cavitation, hydrodynamic cavitation and ozone can be explained on the basis of different simultaneously acting mechanisms. The most common explanation for the influence of cavitation induced either using ultrasound or hydrodynamic cavitation is the theory of the disaggregation of flocs of microorganisms. Microbes tend to be present in the form of clumps protecting inner microbes, if these clumps are broken then better disinfection can be achieved, as the exposure of the inner microbes to the disinfectant increases. Another hypothesis is based on the transient rupture of chemical bonds between molecular components of cellular membranes which results in an increase in permeability of substances in general. Also the turbulence generated during the cavitational events leads to enhanced rates of diffusion allowing more rapid penetration of the toxic gas molecule into the microorganism and hence resulting in enhanced rates of disinfection.

Electro-Chemical Oxidation:

Generally speaking electrochemical oxidation, though very capable of degrading the pollutants in a greener way, is not applied as a complete replacement to the conventional processes and is recommended only as a supplement. Using this approach as basis, the design also utilizes the power of electrochemical oxidation as a supplement to the reactor using the ozone in combination with free radicals generated from the cavitational effects. There are 24 rod anodes and 10 disc anodes on reactor. On 10" static pipe mixer there are four disc anodes per pipe releasing DC current in the water. The current density is maintained between 0.6 Amps/in$^2$ to 1.875 Amps/in$^2$ during the process. The turbulent flow through the system aids in efficient electron migration between anode and cathode. These electrodes are non active electrodes where the anode material acts as a catalyst and the oxidation is assisted by hydroxyl radicals that are generated at the electrode surface. The geometric and operational details of the electrochemical oxidation unit are given as follows:

| Rod Anode 0.75" Dia, 7 ft long. | Surface area per Rod = 198 in$^2$ Total Surface area available for 24 Rod = 4752 in$^2$ | Current Density = 0.6315 A/in$^2$ |

| | | |
|---|---|---|
| Disc Anodes on the Reactor | Surface Area per Disc = 50.2 in² Total Surface area available for 10 Discs = 502 in² | Current Density = 1.5 A/in² |
| Disc Anodes on the 10" static mixers | Surface Area per Disc = 50.2 in² Total Surface area available for 16 disc = 803 in² | Current Density = 1.875 A/in² |

Figure 18:
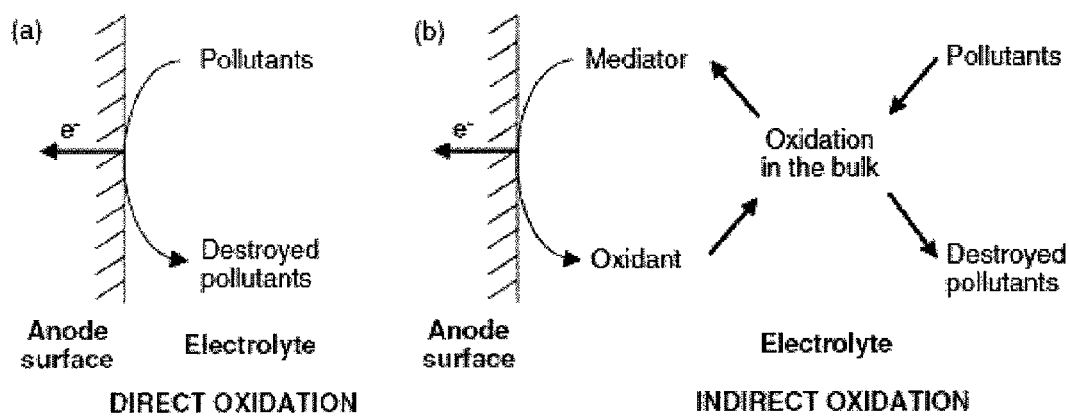
FIG. 18 is a diagrammatic representation of direct and indirect oxidation.

Electrochemical oxidation of pollutants can take place through two different oxidation mechanisms: (1) direct anodic oxidation, where the pollutants are destroyed at the anode surface; (2) indirect oxidation where a mediator is electrochemically generated to carry out the oxidation. It has to be kept in mind that during electro-oxidation of aqueous effluents, both oxidation mechanisms may coexist. As shown in FIG. 18.

During the electrochemical oxidation, hydroxyl radicals can be generated by intrinsic dissociation of water. The platinum electrode, which is used in a electrolysis process, produces hydroxyl radicals by dissociative adsorption of water followed by hydrogen discharge. In the process, as the electric potential is maintained more than 1.23V, which is higher than thermodynamic potential of water decomposition in acidic medium, water discharge occurs, leading to the formation of hydroxyl radicals.

Figure 19:
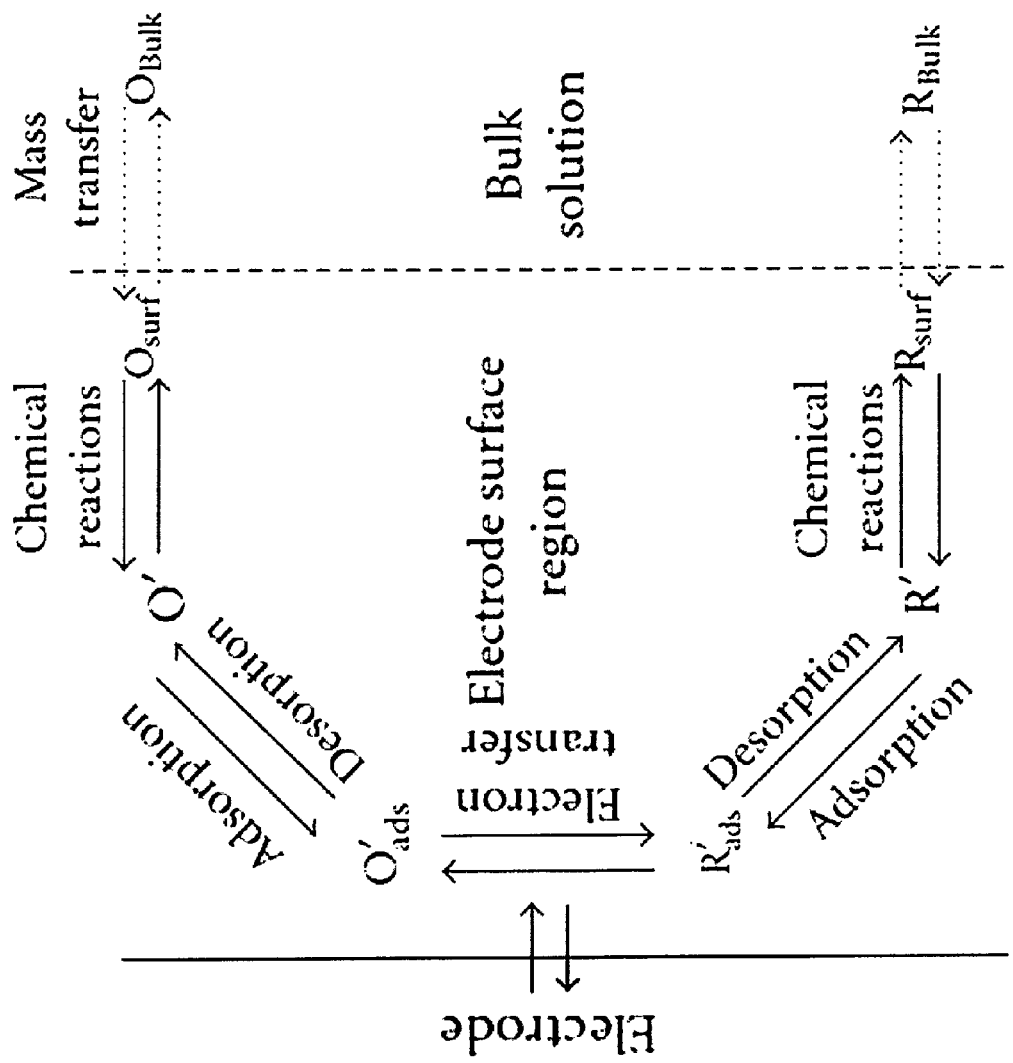
FIG. 19 shows different steps in the electrochemical reaction.

A general electrochemical process can be summarized in five steps as shown in FIG. 19. Firstly; the mass transfer from the bulk solution to the electrode surface takes place. Then, homogeneous or heterogeneous chemical reactions occur at the electrode surface region associated to surface phenomena (adsorption). These reactions are followed by the electronic transfer at the electrode surface. Finally, the mass transfer from the electrode surface to the bulk solution occurs. Consequently, the efficiency of the electrochemical process will depend on the relationship between mass transfer of the substrate and electron transfer at the electrode surface. The rate of electron transfer is determined by the electrode activity and current density whereas the extent of mass transfer will be controlled by the liquid circulation currents and the level of turbulence generated in the reactor. Use of ultrasonic irradiations indeed helps to eliminate the possible mass transfer resistances in this process while the electric current rating and the surface area of the electrodes is maintained in such as way that sufficient electrons and hence the oxidants are generated in the reactor so as to give the required extents of treatment. FIG. 19 shows the different steps in electrochemical reaction.

The electron transfer reaction is influenced by the nature and the structure of the reacting species, the potential, the solvent, the electrode material and the adsorbed layers on the electrode. In order to understand these influences (interactions between reactant and electrode surface), theories have been developed based on two main concepts, which are known as inner sphere and outer sphere electron transfer reactions.

The term outer sphere is used to describe a reaction, in which the activated complex maintains the coordination sphere originally present in the reactant species (Figure below). Among the large outer sphere systems, $Fe(CN)_6^{3-}/Fe(CN)_6^{4-}$ and $IrCl_6^{2-}/IrCl_6^{3-}$ reactions are the most frequently used. During outer sphere reactions, weak interactions between the electrode and the reactant take place. The interaction maintains a distance of at least one solvent layer between the reactant and the electrode surface. In this case, the kinetics of the reaction is not much dependent on the electrode material. Nevertheless, the electrode material could influence the kinetics, even in the case of outer sphere charge transfer, by affecting the electrical double layer and the Helmholtz layer structure. Since outer sphere reactions can be treated in a more general way than inner sphere processes, for which specific chemistry and interactions are important, the theory of outer sphere electron transfer is much more developed.

A reaction is described in terms of inner sphere when the reactants share a ligand in the activated complex (FIG. 20). Therefore, reactants and the product species, as well as the activated complex, are involved in very strong interactions with the electrode surface (specific adsorption). This kind of reaction implies multistep electron-transfer reactions.

Production of Hydroxyl Radicals:

The electrochemical production of hydroxyl radicals and their role in electrochemical oxygen transfer reactions depend on the electrode material used. The mechanism of hydroxyl radical's formation depends also on the electrical potential. These radicals are then more or less strongly adsorbed at the surface. The mechanism of the water activation reaction implies to deal with two different mechanisms depending on the potential; via either the dissociative adsorption of water or the electrochemical water discharge.

Formation of OH Radicals Via the Dissociative Adsorption of Water

Platinum is a typical electro catalytic material. This type of material implies the formation and the breaking of bonds between species and adsorption sites. On this electrode material, the electrochemical oxygen transfer reaction occurs as follows $$RH + H_2O \rightarrow RO + 3H^+ + 3e^-$$

At a potential lower than the thermodynamic one for water discharge to $O_2$, the water activation is described by the following equations. These reactions take place at a low potential (about 0.4 V vs Std. Hydrogen Electrode) and lead to the strong adsorption of hydroxyl radicals on the platinum surface.

Dissociation Adsorption of Water $$(H_2)_{ads} \rightarrow (H\cdot)_{ads} + (HO\cdot)_{ads}$$

Hydrogen Discharge $$(H\cdot)_{ads} \rightarrow H^+ + e^-$$

Once the hydroxyl radicals are produced, the reaction with an organic compound RH can occur via two possible mechanisms:

Eley-Rideal Equation:

$$RH + (HO\cdot)_{ads} \rightarrow RO + 2H^+ + 2e^-$$

Or Langmuir-Hinshelwood Equation $$(RH)_{ads} + (HO\cdot)_{ads} \rightarrow RO + 2H^+ + 2e^-$$

In the first mechanism (Eley-Rideal), only hydroxyl radicals are strongly adsorbed, while for Langmuir-Hinshelwood, both hydroxyl radicals and organic compounds are strongly adsorbed at the electrode surface. The adsorption of the organic compound is performed by the first step of the inner sphere electron transfer anodic reaction $(RH \rightarrow (RH)_{ads})$.

$$Pt + H_2O \rightarrow Pt-(OH)_{ads} + H_{aq}^+ + e^-$$

When the potential is higher than the thermodynamic one for water decomposition, the formation of hydroxyl radicals is performed in one step via the electrochemical water discharge.

Redox Potential of OH Radicals

The formation of free hydroxyl radicals in aqueous solution necessitates a high anodic potential. OH⁻ radicals appear as the strongest oxidant with a potential of 2.65 V vs Std. Hydrogen Electrode in acidic medium. Other references estimated the OH⁻ redox potential between 2.6 and 2.8 V. OH⁻ radicals are highly oxidizing and widely used for water treatment. Following table summarizes the redox potential of some chemical systems known to treat water.

| Oxidant | Redox potential (V vs SHE) |
|---|---|
| $F_2$ | 3.03 |
| HO· | 2.80 |
| O· | 2.42 |
| $O_3$ | 2.07 |
| $H_2O_2$ | 1.78 |
| $Cl_2$ | 1.36 |

Figure 28:
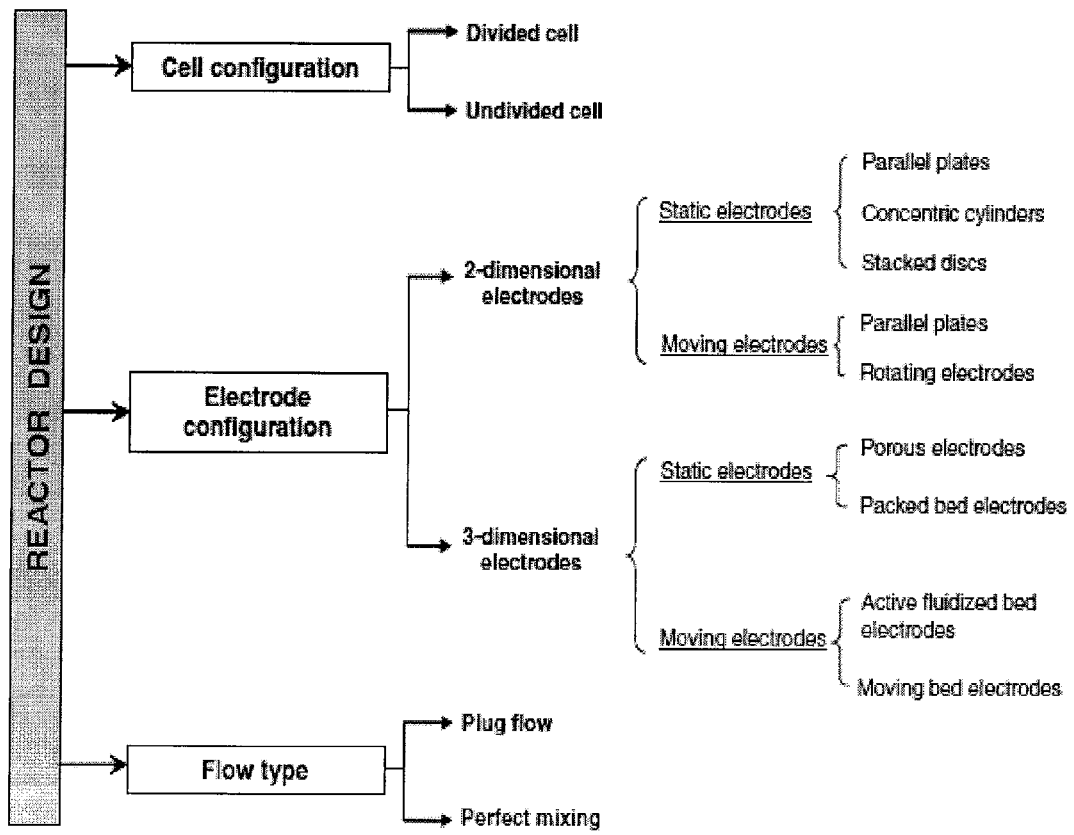
FIG. 28 shows the various aspects to be considered in the design of an electrochemical reactor.

Important Design Considerations for Electrochemical Oxidation Reactors:

One of the most important issues in cell design is to maintain high mass transfer rates as the main reactions that take place in electrochemical oxidation processes take place on electrode surfaces. To improve mass transfer to the surface of the electrode, common methods such as gas sparging, high fluid velocity, use of baffles and incorporation of various types of turbulence promoters are employed. Sono-electrochemical processes have also been tested to enhance mass transfer as illustrated in the current design of treatment device. Besides procuring a high mass transfer rate, cell construction should account for easy access to and exchange of cell components. As shown in FIG. 28, an overview of the various aspects that have to be considered in the design of an electrochemical reactor is shown. Two types of electrodes, mainly of two-dimensional and three-dimensional construction exist. The latter guarantee a high value of electrode surface to cell volume ratio. As can be seen in FIG. 28, both types of electrodes can be classified into static and moving electrodes. The use of moving electrodes leads to increased values of the mass-transport coefficient due to turbulence promotion. Among the two-dimensional electrodes, static parallel and cylindrical electrode cells are used in the major reactor designs in current studies of electrochemical oxidation of waste-waters.

Besides the electrode geometry and configuration, the configuration of the cell (divided and undivided cells) has to be considered in the reactor design. In divided cells, the anolyte and catholyte are separated by a porous diaphragm or an ion conducting membrane. For divided cells the choice of the separating diaphragm or membrane is as important as the appropriate choice of electrode materials for proper functioning of the electrolytic process. Overall, the use of divided cells should be avoided whenever possible, because separators are costly and tightening of a divided cell (reduction of electrode gap) is difficult and encounters a host of mechanical and corrosion problems.

Important Operating Parameters:

Among the variables that are usually modified in electrochemical oxidation processes, the current density (intensity per unit area of electrode) may be the term most frequently referred to because it controls the reaction rate. It should be highlighted that an increase in current density does not necessarily result in an increase in the oxidation efficiency or oxidation rate and that for a given anode material, the effect of current density on the treatment efficiency depends on the characteristics of the effluent to be treated. However, the use of higher current densities usually results in higher operating costs due to the increase in energy consumption. In contrast to current density, the effect of temperature on the overall efficiency of the electro-oxidation process has not been widely studied. It is generally acknowledged that direct oxidation processes remain almost unaffected by temperature whereas mediated oxidation processes do not. An improvement with increasing temperature of the mediated oxidation processes by inorganic electrogenerated reagents (active chlorine, peroxodisulfate) has been reported. Nevertheless, operation at ambient temperature is usually preferred as it provides electrochemical processes with lower temperature requirements than those of the equivalent non-electrochemical counterparts (i.e. incineration, supercritical oxidation).

The physico-chemical characteristics of the waste-water (nature and concentration of electrolyte, pH value and concentration of target pollutants) also affect the electrochemical oxidation process. Although no agreement has been reached on the effect of the nature and concentration of electrolyte on the overall oxidation efficiency, it has to be kept in mind that the higher the concentration of electrolyte, the higher the conductivity and consequently the lower the cell voltage for a given current density. For this reason, electrochemical oxidation treatment is more convenient and cost effective when the waste-waters to be treated already have high salinity. The pH value, like temperature, affects mostly indirect oxidation processes. However, a review of previous publications does not allow a conclusion to be reached on whether increasing or decreasing pH favours pollutant removal in electrochemical oxidation of waste-waters.

Sonolysis of Main Reactor. The sonochemical reactor is based on the principle of generation of cavitation using ultrasound described commonly as acoustic cavitation. In the case of acoustic cavitation, the pressure variations in the liquid are effected using the high frequency sound waves with frequencies in the range of 16 kHz-5 MHz. If a sufficiently large negative pressure is applied to the liquid so that the average distance between the molecules exceeds the critical molecular distance required to hold the liquid intact, cavities or voids are created. Subsequent compression and rarefaction cycles of the sound waves causes the cavity to expand, reach a maximum cavity size (magnitude of which depends on the operating conditions) and then collapse releasing large amount of energy. The magnitude of the pressure pulse or the temperature generated depends on the different operating conditions most important being the intensity of irradiation, frequency of irradiation and the physicochemical properties of the liquid medium which decides the initial size of the nuclei generated in the reactor and the ease of generation of cavitation.

The basic component of the reactor is the transducer capable of converting supplied electrical energy into mechanical energy in terms of vibrations and finally to the sound energy described as ultrasound, which propagates though the water. The dissipation of the sound energy into the medium results in the generation of cavitation field which coupled with the fluid-flow pattern existing in the reactor will decide the degree of expected effects. The transducers operate at a fixed frequency of irradiation emitting radiations through a fixed area of irradiation. The type of transducer coupled with the total area of irradiation and the operating frequency are the key factors in the efficient design of the reactor. The three main types of transducers are a) gas driven, b) liquid driven and c) electromechanical transducers out of which the electromechanical transducers are by far the most versatile and widely used.

The gas-driven transducers are simply whistles with high frequency output. Dog whistles and sirens can be given as examples of gas-driven transducers. These transducers can be used to break down foams and agglomerates of dust and for the acceleration of drying processes. However, these types do not have any significant chemical applications, as it is not possible to achieve a sufficiently high-pressure intensity in airborne ultrasound by this method.

Liquid-driven transducers (i.e. a liquid whistle) can be used to produce efficient homogenization. The majority of the chemical effects observed using whistle-type transducers for the sonication of non-homogeneous reactions can be attributed mainly to the generation of very fine emulsions leading to increase in the interfacial phenomena rather than the ultrasonic irradiation itself.

The two main types of electromechanical transducers used in industrial applications are the piezoelectric and the magnetostrictive transducers. Piezoelectric transducers are constructed using a piezoelectric material, such as quartz, which expands and contracts in an oscillating electric field producing sound waves (pressure waves) from the electric signal. Magnetostrictive transducers are constructed from materials, such as nickel alloys, which expand and contract in an alternating magnetic field.

Mechanism of Oxidation Using Sonochemical Reactors:

Ultrasonic irradiations results in generation of cavitation events in the reactor and can accelerate the degradation of organic compounds. The formation of the transient supercritical water pockets appears to be an important factor for the ultrasonic acceleration of the chemical reactions. At any point of time, approximately 0.15% of the irradiated water is in the supercritical state. Since this bubble interface region is likely to have transient temperatures and pressures in excess of 647 K and 221 bar for periods of microseconds to milliseconds, supercritical water (SCW) provides an additional phase for chemical reactions during ultrasonic irradiation in water. The changing physiochemical properties of water favor substantial increases for rates of most chemical reactions.

Ultrasonic waves can induce the reaction through the chemical process inside the cavitation bubble, or at the interface of the bubble. Solute molecules that cannot diffuse to these two places are likely to undergo attack by hydroxyl radical formed from the dissociation of water. In water, implosion and fragmentation of the bubble are the center of high energy phenomena; where high temperature, high pressure and electrical discharges gives rise to $H_2O$ sonolysis. Hydroxyl radicals are second most powerful oxidizing reagent to fluorine with an oxidation potential of 2.8 V and exhibits faster rates of oxidation as compared that using conventional oxidants like hydrogen peroxide and $KMnO_4$.

In waste-water treatment, cavitation bubble may function as a micro-reactor which destroys volatile organic compounds. When the bubbles implode, it releases large amount of energy, which is sufficient to break the strong bonds in the compounds present in the bubbles as vapors. Cavitation is a source of radical generation, especially .OH which is very strong and non specific oxidizing species which escapes out of the bubble and reacts rapidly with the compound in the solution. Implosion of cavity bubbles in sonicated water containing dissolved gases result in hydrogen and hydroxyl radicals by fragmentation of water molecules. These in turn combine and generate other oxidative species such as peroxy and superoxide radicals as well as hydrogen peroxide, the quantities of each depending on the ambient conditions and the operating parameters. A simplified reaction scheme showing the formation and depletion of radical species and hydrogen peroxide in sonicated water is given below:

$$H_2O \rightarrow ))).OH + .H \qquad (1)$$

$$.OH + .H \rightarrow H_2O \qquad (2)$$

$$2.OH \rightarrow H_2O \qquad (3)$$

$$2.OH \rightarrow H_2O_2 \qquad (4)$$

The two major pathways for mechanisms for the sonolytic degradation of a pollutant are pyrolysis of the molecules evaporated inside the bubble, and secondly, the attack of O., OH. and HOO. radicals produced by the cavitation bubble (out of dissociation of water molecules during transient collapse) on the pollutant molecules in the bulk solution leading to hydroxylated products that are further degraded to the final products, i.e. $CO_2$ and $H_2O$. Ultrasonic degradation of organic pollutants in aqueous solution depends strongly on the nature of the organics. The hydrophobic compounds react with OH. and H. at the hydrophobic gas/liquid interface, while the hydrophilic species react to a greater extent with the OH. radicals in the bulk aqueous phase. Hydrophobic and volatile molecules such as tetra-chloromethane and TCE degrade mainly by direct thermal decomposition in the cavitation bubbles. Hydrophilic compounds with a low vapor pressure such as phenol and chloro-phenol degrade ultrasonically mainly by reaction with .OH radicals in the bulk solution or at the interface between the collapsing cavitation bubble and the bulk solution. Still, pyrolysis also occurs when phenol is sonicated. The efficacy of cavitation can be significantly enhanced by combining cavitation with other oxidation processes or by using catalysts and/or additives. With this intensification, cavitation can be a suitable technology for degradation of wastewater streams or at the minimum it can be used for lowering the toxicity levels of the effluent stream so that conventional biological oxidation can be readily applicable.

Understanding the Cavitational Activity Distribution:

Cavitation is a dynamic phenomenon and there can be a significant variation in the cavitational activity over the entire operating volume. Distribution of the cavitational activity in the sonochemical reactors is a very important issue considering the net overall effects in any processing applications. The cavitational activity is not uniformly distributed in all the conventional designs of the sonochemical reactors and is mostly concentrated nearer the transducers especially in the case of low frequency reactors. There is a strong dependence of the cavitational activity on the operating parameters and geometry of the reactor system including the positions of transducers. It is very important to consider the distribution of cavitational activity in the design of industrial scale cavitational reactors and the optimum design should be such that near uniform activity at all the locations is obtained. Characterization of the cavitational phenomena and its effects in sonochemical reactors are generally described through mapping. Mapping of sonochemical reactor is a stepwise procedure where cavitational activity can be quantified by means of primary effect (temperature or pressure measurement at the time of bubble collapse) and/or secondary effect (quantification of chemical or physical effects in terms of measurable quantities after the bubble collapse) to identify the active and passive zones. The available techniques can be classified into two groups viz., experimental techniques for measurement and theoretical predication of the cavitational activity distribution. Depending on different effects generated by cavitation, experimental techniques can be further classified into techniques based on quantification of primary effects and secondary effects. The effects generated at the same time as the bubble collapse are called as primary effects such as temperature pulse, pressure pulse, generation of free radicals (in the cavity) and micro-circulation in the vicinity of bubble. The effects generated after the bubble collapse are called as secondary effects such as oxidation reactions, intensification of mass transfer coefficients, enhanced electrochemical effects etc. Also it should be noted that, even though generation of free radical is considered as primary effects, they are usually utilized in chemical reaction after bubble collapse. Determination of variation in the cavitational activity by experimental investigation is not always feasible due to the following reasons:

- Experimental techniques are usually quite expensive and time consuming
- Cavitation medium gets disturbed due to the presence of external instrument such as thermocouple, hydrophone, aluminum foil, test tube etc. and hence we may not get a realistic picture of the cavitational activity distribution
- Obtained results may not be reproduced due to the dynamic nature of cavitation phenomena.

Theoretical predication of cavitational activity in terms of pressure field gives an efficient alternative to experimental mapping techniques. Based on theoretical analysis, one can obtain the pressure field distribution in any new sonochemical reactor with different geometries and operating conditions, which can aid in optimization for maximum/uniform cavitational activity. The modeling studies can be extended to quantification of other useful parameters such as distribution of temperature, mass transfer coefficient etc., which can be controlling parameters depending on the type of application.

Taking a lead from this analysis, it was thought very important to perform numerical simulations to understand the cavitational activity distribution in the current reactor using theoretical investigations. The finite element simulation of the sound field in the main reactor was carried out to prediction of the cavitational activity in terms of sound pressure field distribution by solving the wave equation using finite element method. Pressure field distribution is obtained using COMSOL Multiphysics. The wave equation can be given as:

$$\nabla\left(\frac{1}{\rho}\nabla P\right) - \frac{1}{\rho c^2}\frac{\delta^2 P}{\delta t^2} = 0$$

Where
$\rho$=is the density of the liquid medium
c=is the speed of the sound in liquid medium The acoustic pressure P can be expressed as a function of frequency of irradiation as follows:

$$p = p_o \sin(\omega t \pm kx)$$

where $\omega$ is angular frequency and k is wave number

Following assumptions can be made for specific application of the wave equation to the present case of propagation of ultrasound wave in the liquid medium:
1. Linear propagation of sound wave through medium
2. Shear stress is negligible
3. Density and compressibility of liquid medium are constant
4. Pressure is time harmonic i.e. $p(r,t) = p(r)e^{i\omega t}$ Based on these assumptions, we obtain the following equation, which is described as Helmholtz equation:

$$\frac{\nabla^2 p}{\rho} - \frac{\omega^2}{\rho c^2} p = 0$$

The solution of any differential equation requires well defined boundary conditions. In the present case, following boundary conditions can be applied 1. At the tip of transducer, we consider $p=p_o$ (entire ultrasound energy is entering into the reactor through the tip of transducer). For time harmonic analysis, $p_o$ is the initial amplitude of the harmonic source
2. At the wall of reactor, we consider, p=0 (pressure amplitude vanishes near the wall).

The following shows the simulation at 812 μs when all the transducers were assumed to be vibrating at 20 KHz and the maximum amplitude assumed to be 247765 Pa (Approx. 36 psi).

Following important observations can be made from the results of the numerical simulations:
1) The sound field is very well developed in the region in front of the ultrasound irradiating faces of the transducers.
2) The sound field is really developed from 8" to 16" region indication that the areas covered by the transducer face are being irradiated well.
3) Because of the presence of the transducers on four sides, the ultrasonic field is developed from all four sides causing increase in the area of uniform sound field inside the reactor. The central region where ultrasonic waves from all the transducers in that layer meet has higher intensities as represented by very dark blue or red regions. The blue region becomes red regions in the next half cycle of the wave. Hence the blue and the red regions shall both be considered as active zones.
4) The region between the two simultaneous layers having ultrasonic transducers acts as a passive zone where as, where there are no ultrasonic transducers present, the region acts as passive zone.

It is to be understood that while certain forms of the invention is illustrated, it is not to be limited to the specific form or process herein described and shown. It will be apparent to those skilled in the art that various changes may be made without departing from the scope of the invention and the invention is not to be considered limited to what is shown and described in the specification and drawings.

What is claimed is:
1. An apparatus for treating Lake Okeechobee water comprising:
a fluid inlet for introducing fluid into a main reactor,
an ozone injection device for injecting ozone into the fluid, said ozone injector having an inlet and an outlet;
a flash reactor coupled to an outlet of said ozone injection device and in fluid communication with a flash reactor, said flash reactor having an inlet and an outlet, said flash reactor having flow paths creating areas of severe velocity and pressure changes which reduces the size of the ozone bubbles to nano size, the outlet of the flash reactor in fluid communication with an inlet of a hydrodynamic mixing manifold, said hydrodynamic manifold having at least an inlet and an outlet, said outlet of said hydrodynamic manifold having a nozzle positioned within an inlet passageway of said main reactor;

a plurality of ultrasonic transducers assemblies mounted within said main reactor for generating acoustic cavitation of said fluid;

a plurality of anodes and cathodes mounted within said main reactor to create an electrical potential within said fluid; and an outlet segment for conveying the fluid exiting the main reactor to at least one outlet line;

whereby said main reactor is configured to provide degradation/disinfection using a combination of hydrodynamic cavitation, acoustic cavitation, ozone injection and electrolysis to condition fluid drawn from around an algae bloom into a high Oxygen-Reduction Potential (ORP) fluid that is discharged onto the algae bloom for treating of the algae bloom.

2. The apparatus for treating Lake Okeechobee water as set forth in claim 1 further including a plurality of anodes positioned within said at least one outlet line to create an electrical potential within said at least one outlet line.

3. The apparatus for treating Lake Okeechobee water as set forth in claim 1 further including a hydrodynamic cavitation mixer positioned within said at least one outlet line to create hydrodynamic cavitation within said at least one outlet line.

4. The apparatus for treating Lake Okeechobee water as set forth in claim 1 wherein said main reactor has a plurality of inlet passageways.

5. The apparatus for treating Lake Okeechobee water of claim 1 wherein said nozzle is positioned within said inlet passageway of the main reactor so that the fluid exiting therefrom is directed against an interior wall of said main reactor.

6. The apparatus for treating Lake Okeechobee water of claim 1 wherein said main reactor includes a cylindrical housing, said main reactor including a plurality of inlet passageways, each of said inlet passageways including a nozzle that directs the fluid exiting therefrom to impact an interior wall of said main reactor.

7. The apparatus for treating Lake Okeechobee water of claim wherein said pluralities of anodes are mounted on an outer cylindrical surface of said main reactor.

8. The apparatus for treating Lake Okeechobee water of claim 1 wherein said plurality of anodes are mounted on a pair of end plates on said main reactor.

9. The apparatus for treating Lake Okeechobee water of claim 1 further including an oxygen generator that produces oxygen that is fed to an ozone generator that is fed to said ozone injection device.

10. The apparatus for treating Lake Okeechobee water of claim 1 wherein said ozone injection device is a venturi type differential pressure injector which mixes the ozone with the fluid.

11. The apparatus for treating Lake Okeechobee water as set forth in claim 2 further including a hydrodynamic cavitation mixer positioned within said at least one outlet line to create hydrodynamic cavitation within said at least one outlet line.

12. The apparatus for treating Lake Okeechobee water as set forth in claim 1 further including a floating vessel, said floating vessel constructed and arranged to provide a vessel having an intake coupled to said intake and a directional outlet for placement of treated fluid.

* * * * *